(12) United States Patent
Nakamura et al.

(10) Patent No.: US 7,057,631 B2
(45) Date of Patent: Jun. 6, 2006

(54) IMAGE FORMING PROCESS AND IMAGE FORMING APPARATUS, ELECTROPHOTOGRAPHIC IMAGE-RECEIVING SHEET, AND ELECTROPHOTOGRAPHIC PRINT

(75) Inventors: Yoshisada Nakamura, Shizuoka (JP); Yutaka Nogami, Kanagawa (JP)

(73) Assignees: Fuji Photo Film Co., Ltd., Kanagawa (JP); Fuji Xerox Co., Ltd., Tokyo (JP)

( * ) Notice: Subject to any disclaimer, the term of this patent is extended or adjusted under 35 U.S.C. 154(b) by 216 days.

(21) Appl. No.: 10/668,246

(22) Filed: Sep. 24, 2003

(65) Prior Publication Data
US 2004/0131403 A1    Jul. 8, 2004

(30) Foreign Application Priority Data
Sep. 26, 2002  (JP) ............................. 2002-281316
Sep. 27, 2002  (JP) ............................. 2002-283463

(51) Int. Cl.
*G03G 13/00*  (2006.01)
*G03G 15/00*  (2006.01)

(52) U.S. Cl. ..................................... 347/115

(58) Field of Classification Search ........ 347/153–156, 347/262, 264
See application file for complete search history.

(56) References Cited

U.S. PATENT DOCUMENTS 5,146,344 A * 9/1992 Bennett et al. ............. 358/296
5,318,943 A * 6/1994 Ueno et al. ................ 503/227
5,342,671 A * 8/1994 Stephenson .............. 428/195.1
5,484,759 A * 1/1996 Suto et al. .................. 503/227
5,809,369 A   9/1998 Furuya et al.
6,131,010 A  10/2000 Kume et al.
2002/0102118 A1  8/2002 Kosugi et al.

FOREIGN PATENT DOCUMENTS

| EP | 0 817 462 A2 | 1/1998 |
|---|---|---|
| JP | 6-67468 A | 3/1994 |
| JP | 08-022217 | * 1/1996 |
| JP | 09-137082 | * 5/1997 |
| JP | 10 207113 A | 8/1998 |
| JP | 11-84719 A | 3/1999 |
| JP | 2001 013710 A | 1/2001 |
| JP | 2001 117263 A | 4/2001 |
| JP | 2001-117279 A | 4/2001 |
| JP | 2001 127989 A | 5/2001 |
| WO | WO 01/56806 A1 | 8/2001 |

* cited by examiner

*Primary Examiner*—Huan Tran
(74) *Attorney, Agent, or Firm*—Sughrue Mion, PLLC

(57) ABSTRACT

An object is to provide an image forming process, an image forming apparatus, and a color electrophotographic print that can provide a color electrophotograph that has a sufficient density in its dark area, has gloss, has a high glossiness over the entire densities covering bright areas (a white area and a highlight area), areas at intermediate densities, and dark areas (a black area and a shadow area) and can achieve high image quality equivalent to silver halide photographs. An image forming process produces an electrophotographic print which has a black density of 2.0 or more, a black color satisfying the following condition in the CIE 1976 (L*a*b*) color space: $(a^*)^2+(b^*)^2 \leq 9$, and a 20-degree minimum glossiness of 60 or more.

32 Claims, 13 Drawing Sheets

IMAGE FORMING PROCESS AND IMAGE FORMING APPARATUS, ELECTROPHOTOGRAPHIC IMAGE-RECEIVING SHEET, AND ELECTROPHOTOGRAPHIC PRINT

BACKGROUND OF THE INVENTION

1. Field of the Invention

The present invention relates to an image forming process, an image forming apparatus, an electrophotographic image-receiving sheet, and a color electrophotographic print which can produce an image with high quality equivalent to silver halide photographs.

2. Description of the Related Art

Electrophotography is a process in which a latent electrostatic image is formed on a photoconductor as a result of photoconduction and applying colored charged fine particles (a toner) to the latent electrostatic image by action of electrostatic force to thereby form a visible image (toner image).

In electrophotography, many techniques which specify density and glossiness of images have been proposed. For example, Japanese Patent Application Laid-Open (JP-A) No. 06-67468 proposes an image forming process for producing a fixed image having a specular glossiness at an incident angle of 75 degrees of 40% or more, and an optical density of 2.0 or less.

JP-A No. 09-160315 discloses an image processor having image type identifying means based on a density control signal, and process control means for controlling glossiness based on the image type in order to control the glossiness imagewise.

JP-A No. 11-84719 discloses the relationship among an amount of an attached toner, a density, and glossiness. According to this technique, however, a 60-degree glossiness is low of at most 40, and the glossiness may decrease when a toner having a small average particle diameter is used.

JP-A No. 2001-22118 proposes a color toner for electrophotography having a specified relationship between a toner additive and an image density and exhibiting an image density after image-fixing of 1.2 to 2.0.

JP-A No. 2001-305756 proposes an image forming process in which the glossiness of an electrophotographic photoconductor changes 10% or less during continuous printing.

JP-A No. 2002-55495 discloses an electrophotographic two-component developer comprising a carrier and a toner and having a 60-degree glossiness of 15% or more and an image density of 1.4 or more.

However, these conventional technologies do not achieve high density in terms of an optical density exceeding 2.0 and do not yield satisfactory gloss over the entire densities.

JP-A No. 2001-117279 proposes an image forming process in which a toner particle diameter is 7 μm or less, a toner resin has a weight-average molecular weight (Mw) of 19000 or less and a number-average molecular weight (Mn) of 5000 or less, a 75-degree glossiness in a black area is from 90 to 110 and an optical density is from 1.8 to 2.5. According to this technique, however, a sufficient glossiness over the entire densities (particularly at intermediate densities) is not obtained, although the glossiness in the black area is sufficient.

Some of recording media for use in silver halide photographic printing, pictro printing, thermosensitive color printing, sublimation thermal transfer printing, and other printing systems have a logo on the back side. However, these printing techniques can form an image only on one side (i.e., front side) of a recording medium. In contrast, double-sided printing is generally implemented in electrophotography.

Attempts have been made to improve photographic quality such as imparting gloss in image-forming sheets for high quality electrophotography rich in photographic texture. However, electrophotographic prints having two glossy sides invite significant blocking between image-bearing surfaces and cannot yield high photographic quality on both sides.

Such an electrophotographic image-receiving sheet for electrophotography is generally capable of bearing a high-quality print rich in photographic texture on one side (front side) and exhibits different performance on its back side. To obtain photographic quality, the electrophotographic image-receiving sheet must be properly set in a sheet tray after distinguishing between its front side and back side. If the electrophotographic image-receiving sheet is set inversely in a sheet tray by mistake, an intended high-quality print rich in photographic texture is not obtained, troubles in an electrophotographic apparatus such as defective conveying of the sheet, offset, and dust occur, thus significantly adversely affecting other prints.

According to conventional technologies, media (electrophotographic image-receiving sheets), hardware such as a printer and a postprocessing device, and a toner are not optimized, sufficient glossiness over the entire densities covering bright areas (a white area and a highlight area), areas at intermediate densities, and dark areas (a black area and a shadow area) is not obtained, high image quality equivalent to silver halide photographs (photographic quality in its original meaning) is not achieved, and a printing system that can prevent misloading has not yet been provided.

SUMMARY OF THE INVENTION

Accordingly, an object of the present invention is to provide an image forming process, an image forming apparatus, an electrophotographic image-receiving sheet, and a color electrophotographic print for a color electrophotograph that has a sufficient density in its dark area, has gloss, has high glossiness over the entire densities covering bright areas (a white area and a highlight area), areas at intermediate densities, and dark areas (a black area and a shadow area) and can achieve high image quality equivalent to silver halide photographs.

After intensive investigations to achieve the above object, the present inventors have found the following findings. Specifically, four or more color toners are generally used in color electrophotographic printing. A black image area can be formed by using three color toners, i.e., cyan, magenta, and yellow toners, but in this case, an electrophotographic image-receiving sheet must bear large amounts of toners. To avoid this, a black toner is used partially in such a black area, but the resulting black area often exhibits a subtle chromatic color. In regular documents, there is no necessity to set the density at 2.0 or more, and subtle difference in color is trivial. However, to print photographic images, the color of a black area and a sufficiently high density (2.0 or more) thereof are important factors in image quality. A black area can be formed by using a black toner alone, but in this case, a subtle color near to black cannot be significantly reproduced.

In order to increase the density in a black area, it is also effective to reduce the glossiness of the black area, as well as to apply a sufficient amount of a toner to an electrophotographic image-receiving sheet. Such a non-glossy black area is preferred in regular documents but is not preferred, and this technique cannot be employed in photographs. To sufficiently increase the density of a black area and to control its color finely, the amount of a toner on the electrophotographic image-receiving sheet inevitably increases. Thus, a difference in toner amount between an area bearing a larger amount of the toner and another area bearing a smaller amount of the toner or between an area bearing the toner and a white background increases, and the toner cannot be sufficiently embedded in the electrophotographic image-receiving sheet. In particular, unevenness due to the difference in toner amount often occurs in areas at intermediate densities, thus inviting reduced glossiness. However, the glossiness of a print is an important quality in photographic images and must be uniform over the entire densities covering bright areas, areas at intermediate densities, and dark areas. To maintain sufficient glossiness in areas at intermediate densities to black areas and to control subtle colors, it is important that the toner has sufficiently small and uniform particle diameter. Thus, toner images can be smoothened and glossed to thereby achieve desired quality.

The present inventors have also found that an electrophotographic image-receiving sheet mainly including a thermoplastic resin capable of receiving an embedded toner should be used to achieve sufficient gloss, and that the sheet must be sufficiently thick to achieve sufficient gloss over the entire densities. If the electrophotographic image-receiving sheet has an insufficient thickness and a large amount of a toner is embedded therein, the sheet cannot significantly eliminate unevenness of the toner. In addition, the toner layer in such a large amount occupies a larger portion of the total thickness of the sheet, and, as a whole, unevenness in thickness due to the toner is visually observed.

The present inventors made further investigations based on these findings and have found that a medium (electrophotographic image-receiving sheet), hardware such as a printer and a postprocessing device, and a toner must be optimized to obtain high quality in electrophotography equivalent to silver halide photographs. More specifically, they have found that by optimizing a combination of (i) a polymeric toner which has small and uniform particle diameters and can be applied to an oilless image-fixing process, (ii) a printer that can produce highly precise images and can be applied to thick paper, such as DCC-400 and DCC-500 (trade names, available from Fuji Xerox Co., Ltd., Japan), (iii) an electrophotographic image-receiving sheet specialized and optimized for photographs, and (iv) a postprocessing, a high-quality image can be obtained. Namely, the resulting image has image quality equivalent to silver halide photographs, has high glossiness over the entire densities covering bright areas (a white area and a highlight area), areas at intermediate densities, and dark areas (a black area and a shadow area) and has excellent graininess and a photo-like texture on hand.

Specifically, the present invention provides an image forming process including producing an electrophotographic print, the electrophotographic print having a black density of 2.0 or more, a black color satisfying the following condition in the CIE 1976 (L*a*b*) color space: $(a^*)^2+(b^*)^2 \leq 9$, and a 20-degree minimum glossiness of 60 or more. The image forming process of the present invention preferably includes:

a digital image processing and output control step for capturing digital image data and subjecting the digital image data to image processing and image output control to thereby form a digital image;

a rendering and developing step for rendering and developing a toner image from the digital image using four or more color toners including at least a yellow (Y) toner, a magenta (M) toner, a cyan (C) toner, and a black (K) toner, each of the toners having a volume-average particle diameter of 7 μm or less and an average of shape factors represented by the following equation of from 1 to 1.5:

$$\text{Shape factor}=(\pi \times L^2)/(4 \times S)$$

wherein L is a maximum length of a toner particle; and S is a projection area of the toner particle; a toner image-fixing step for fixing the toner image on an electrophotographic image-receiving sheet to thereby form a toner image, the electrophotographic image-receiving sheet comprising a support, and a toner-image-receiving layer comprising at least a thermoplastic resin and being arranged on the support; and a postprocessing step for smoothing and glossing the toner image formed on the electrophotographic image-receiving sheet.

According to the image forming process of the present invention, a medium (electrophotographic image-receiving sheet), hardware such as a printer and a postprocessing device, and a toner can be optimized, sufficient glossiness can be obtained over the entire densities covering bright areas (a white area and a highlight area), areas at intermediate densities, and dark areas (a black area and a shadow area), and high image quality equivalent to silver halide photographs (photographic quality in its original meaning) can be achieved.

To distinguish between its front side and back side and to avoid printing on the back side before or after printing on the front side, an electrophotographic image-receiving sheet of the present invention has, on its back side, an indicator such as a logo, a price, performance, a catch phrase, a company name, a trade name, a trade mark, a diagram, a picture, a pattern, information (exchangeable image file format information; EXIF information) on the image, information on the copyright of the image, names of a photographic machine used and/or a photographer, and information on image processing. The front side and the back side of the electrophotographic image-receiving sheet can be easily distinguished to thereby avoid misleading of the electrophotographic image-receiving sheet on a sheet tray in an apparatus. Thus, troubles in the apparatus such as defective conveying of the sheet, offset, and dust can be avoided and adverse effects on other prints can be prevented. High-quality images having excellent gloss and smoothness and being rich in photographic texture can be obtained.

Further objects, features and advantages of the present invention will become apparent from the following description of the preferred embodiments with reference to the attached drawing.

DESCRIPTION OF THE PREFERRED EMBODIMENTS

Image Forming Process for Electrophotography and Color Electrophotographic Prints The image forming process of the present invention can produce an electrophotographic print which photographic image quality, which electrophotographic print has a black density of 2.0 or more, a black color satisfying the following condition in the CIE 1976 (L*a*b*) color space: $(a*)^2+(b*)^2 \leq 9$, and a 20-degree minimum glossiness of 60 or more.

The image forming process preferably comprises an image processing output control process, an image rendering and developing process, an image-fixing process using an electrophotographic image-receiving sheet, and a postprocessing process (or image-fixing and glossing process) and may further comprise one or more additional processes selected according to the purpose.

Figure 1:
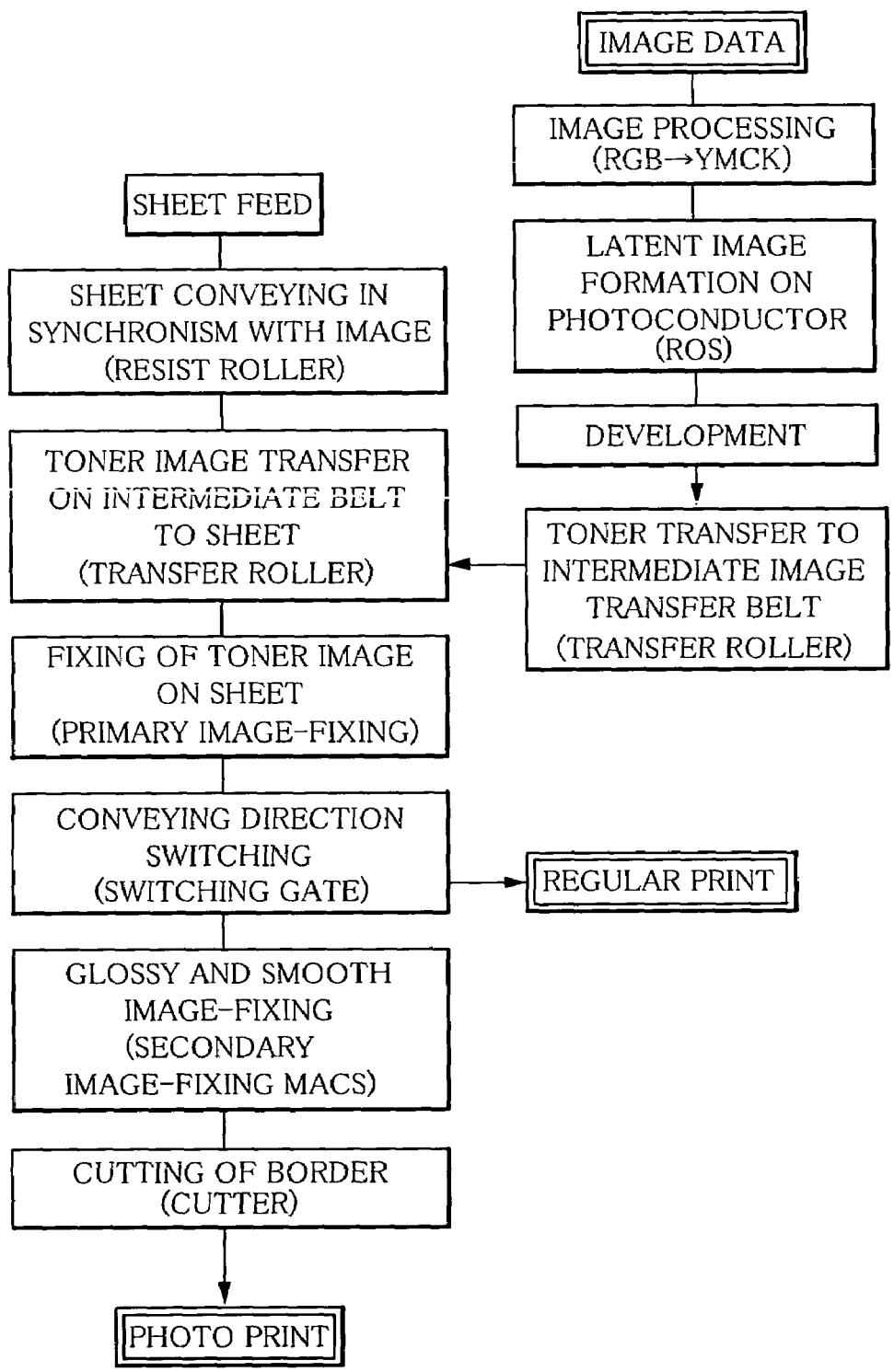
FIG. 1 is a system flow chart of an example of an image forming process for producing a color electrophotographic print according to the present invention.

According to, for example, the system flow shown in FIG. 1, the image forming process can produce images having high glossiness over the entire densities covering bright areas (a white area and a highlight area), areas at intermediate densities, and dark areas (a black area and a shadow area) with satisfactory image quality equivalent to silver halide photographs.

<Image Processing Output Control Process>

The image processing output control process is for capturing digital image data and subjecting the data to image processing and image output control.

The digital image data are not specifically limited, may be selected according to the purpose and include, for example, photographed data, and data obtained by subjecting the photographed data to additional processing.

Examples of the digital image data are (1) data photographed with a digital still camera (DSC), (2) data captured from a digital video (DV), and (3) data scanned from a silver halide photographic film or print. Each of these data can be used alone or in combination.

The image data (1) photographed with a DSC can reduce grains on a print due to a negative image and can thereby produce a desirable color electrophotographic print.

The data (2) captured from a digital video (DV) enables continuous shooting and printing and can produce continuous shooting prints and index prints.

An apparatus for the image processing and image output control is not specifically limited, may be selected according to the purpose and includes, for example, (1) an apparatus capable of capturing any image data from a portable memory on which image data are recorded, (2) an apparatus capable of accessing a network and capable of capturing image data accumulated in a server connected to the network, (3) an apparatus capable of scanning an analogue image and capturing the image as a digital image, (4) an apparatus capable of connecting to a mobile data terminal and capable of capturing image data in the mobile data terminal, (5) an apparatus capable of selectively performing any additional image processing, (6) an apparatus capable of distinguishing between characters and images and capable of performing a specific image processing, and (7) an apparatus using a three-dimensional look-up table (LUT). Each of these apparatus can be used alone or in combination.

Examples of the apparatus (1) capable of capturing any image data from a portable memory on which image data are recorded are CompactFlash Card readers, SmartMedia readers, Memory Stick readers, xD-Picture Card readers, CD-ROM readers, DVD-R readers, DVD-ROM readers, ZIP disk readers, and MO readers.

Examples of the apparatus (2) capable of accessing a network and capable of capturing accumulated image data from a server connected to the network are modems for analogue telephone lines, integrated services digital network (ISDN) terminal adapters, asymmetrical digital subscriber line (ADSL) modems, optical fiber communication modems, Ethernet adapters, local area wireless network (wireless LAN) adapters, and Bluetooth adapters.

Examples of the apparatus (3) capable of scanning an analogue image and capturing the image as a digital image are flatbed scanners, and drum scanners. Examples of shooting devices for use herein are charge-coupled device (CCD) image sensors, and complementary metal-oxide semiconductor (C-MOS) image sensors.

Examples of the apparatus (4) capable of connecting to a mobile data terminal and capable of capturing image data therefrom are cellular phone access units, microcellular phone access units, USB access units, wireless LAN adapters, Bluetooth adapters, CompactFlash Card type access units, and Memory Stick type access units. Examples of the mobile data terminal are cellular phones, microcellular phones, notebook computers, and personal data assistants (PDAs). These mobile data terminals are compact, lightweight and portable and can be connected to a network in various places.

Examples of the additional image processing in the apparatus (5) capable of selectively performing any additional image processing are framing, printing of a name, printing of date, sepia tone processing, monochrome tone processing, splitting, and close-up.

The three-dimensional look-up table (LUT) for use in the apparatus (7) is used to reproduce image data desirably on a print and can freely correct, without mixing, an image produced by digitized CCD signals derived from original image data as in a "gamma table".

<Rendering and Developing Process>

The rendering and developing process is for rendering and developing a toner image from a digital image using color toners.

The color toners preferably comprise four or more colors and include a yellow (Y) toner, a magenta (M) toner, a cyan (C) toner, and a black (K) toner. The color toners more preferably comprise six or more colors and include a yellow (Y) toner, a magenta (M) toner, a cyan (C) toner, a black (K) toner, a light magenta (LM) toner, and a light cyan (LC) toner.

—Color Toners—

Fine particles for use in the color toners are not specifically limited and may be selected according to the purpose. Preferred examples of the fine particles are those prepared by the following process. Initially, a toner material containing at least a binder resin and a coloring agent is added to an organic solvent and thereby yields a solution mixture (an oil phase) containing the dissolved binder resin and the dispersed coloring agent. The oil phase is suspended in an aqueous medium, and the organic solvent is removed from the suspension, and the residue is granulated to thereby yield the fine particles.

—Toner Binder Resins—

A binder resin for use in the toners is not specifically limited, may be selected according to the purpose, but is preferably a polyester resin. The acid value of the polyester resin of preferably 1 mgKOH/g to 50 mgKOH/g, and more preferably 3 mgKOH/g to 30 mgKOH/g as determined according to Japanese Industrial Standards (JIS) K 0070. If the acid value is less than 1 mgKOH/g, a stable aqueous dispersion may not be obtained. If it exceeds 50 mgKOH/g, the toners may absorb excess amounts of water. The acid value of the polyester resin can be controlled by changing the proportional ratio of an acid component to an alcohol component or by neutralizing the acid with the alcohol.

The polyester resin for use herein preferably has a glass transition point Tg as determined with a differential scanning calorimeter of from 20° C. to 120° C. The glass transition point can be controlled by changing the compositional ratios of constitutional monomers. The polyester resin preferably has a number-average molecular weight (Mn) of from 2000 to 90000. If the number-average molecular weight (Mn) is less than 2000, fine particles may not be obtained by drying. If it exceeds 90000, the oil phase may become highly viscous.

Fine particles for use in the present invention may be produced by using the polyester resin having the above-specified acid value or glass transition point Tg in the following manner. Initially, a pigment is dispersed in, and the polyester resin is dissolved in an appropriate organic solvent to thereby yield an oil phase. A neutralizing agent is added to the oil phase to thereby ionize carboxyl groups of the polyester resin. Next, the oil phase is added to an aqueous medium to invert the phase, and the solvent is removed by distillation to thereby yield the fine particles. The oil phase may further comprise dispersed internal additives such as waxes and charge control agents. The resulting fine particles comprise an ionic polyester with a high acid value preferentially gathered on their surfaces and a wax and a polyester with a low acid value positioned in their cores.

While depending on the average particle diameter of the resulting toner, the average particle diameter of the fine particles is preferably from 0.05 μm to 3 μm, and more preferably from 0.1 μm to 1 μm. If the average particle diameter exceeds 3 μm, a toner of a small particle diameter having a final average particle diameter of about 5 μm may not be obtained. If it is less than 0.05 μm, the particles may not be stably dispersed, and/or component waxes and pigments may not be satisfactorily dispersed.

The polyester resin for use as the binder resin may be produced by subjecting a polyhydric alcohol component and a polyvalent carboxylic acid component as polymerizable monomers to polycondensation, where necessary, in the presence of a catalyst.

Examples of the polyhydric alcohol component as the polymerizable monomer are diols such as polyoxypropylene (2.2)-2,2-bis(4-hydroxyphenyl)propane, polyoxypropylene (3.3)-2,2-bis(4-hydroxyphenyl)propane, polyoxyethylene (2.0)-2,2-bis(4-hydroxyphenyl)propane, polyoxypropylene (2.0)-polyoxyethylene(2.0)-2,2-bis(4-hydroxyphenyl) propane, and polyoxypropylene(2.0)-polyoxyethylene(2.0)-2,2-bis(4-hydroxyphenyl)propane; as well as ethylene glycol, diethylene glycol, triethylene glycol, polyethylene glycol, propylene glycol, dipropylene glycol, isopentyl glycol, hydrogenated bisphenol A, 1,3-butane diol, 1,4-butane diol, neopentyl glycol, xylylene glycol, 1,4-cyclohexanedimethanol, glycerol, trimethylolethane, trimethylolpropane, pentaerythritol, bis-(β-hydroxyethyl) terephthalate, tris-(β-hydroxyethyl) isocyanurate, and 2,2,4-trimethylolpentane-1,3-diol. Hydroxycarboxylic acid components, such as p-hydroxybenzoic acid, vanillic acid, dimethylolpropionic acid, malic acid, tartaric acid, and 5-hydroxyisophthalic acid, can also be used herein.

Examples of the polyvalent carboxylic acid component are malonic acid, succinic acid, glutaric acid, dimer acid, phthalic acid, isophthalic acid, terephthalic acid, dimethyl isophthalate, dimethyl terephthalate, monomethyl terephthalate, tetrahydroterephthalic acid, methyltetrahydrophthalic acid, hexahydrophthalic acid, dimethyltetrahydrophthalic acid, endomethylene hexahydrophthalic acid, naphthalenetetracarbuxylic acid, diphenolic acid, trimellitic acid, pyromellitic acid, trimesic acid, cyclopentanedicarboxylic acid, 3,3',4,4'-benzophenonetetracarboxylic acid, 1,2,3,4-butanetetracarboxylic acid, 2,2-bis-(4-carboxyphenyl)propane, diimidocarboxylic acid produced from trimellitic acid anhydride and 4,4-diaminophenylmethane, tris(β-carboxyethyl)isocyanurate, polyimidocarboxylic acid containing an isocyanurate ring, and polyimidocarboxylic acid containing an isocyanate ring produced from a trimer reactant of tolylene diisocyanate, xylylene diisocyanate, or isophorone diisocyanate and trimellitic acid anhydride. Each of these compounds can be used alone or in combination. Among them, trivalent or higher polycarboxylic acids and trihydric and higher alcohols are preferred. Thus, a cross-linked polyester which is desirable in view of the fixing strength and stability such as anti-offset properties can be produced.

A desired polyester resin can be easily produced by subjecting these raw materials to polycondensation according to a conventional procedure. The binder resin preferably comprises a color toner resin having excellent transparency and color development properties and more preferably comprises two or more of the polyester resins obtained by the aforementioned process and having different glass transition points (Tgs) or different acid values for better toner image-fixing and better formation of particles.

Typical examples of the polyester resin for use as the binder and the physical properties thereof resin are shown in Table 1 and Table 2, respectively.

TABLE 1

|  |  | Polyester resin | | | |
| --- | --- | --- | --- | --- | --- |
|  |  | R-1 | R-2 | R-3 | R-4 |
| Alcohol component | Polyoxypropylene(2.2)-2,2-bis(4-hydroxyphenyl)propane | 100 | 100 | 100 | 100 |
|  | Ethylene glycol |  |  |  | 80 |
| Acid component | Terephthalic acid | 100 | 20 | 80 | 10 |
|  | Isophthalic acid |  | 20 |  |  |
|  | Maleic anhydride |  |  | 20 |  |
|  | Trimellitic anhydride |  |  |  | 10 |
|  | Dodecenylsuccinic acid |  | 60 |  |  |
| Catalyst | Dibutyltin oxide | 0.1 | 0.1 | 0.1 | 0.1 |

TABLE 2

| Polyester resin | Molecular weight (Mw) | Acid value | Tg (° C.) | Tm (° C.) |
| --- | --- | --- | --- | --- |
| R-1 | 9000 | 25 | 65 | 102 |
| R-2 | 5000 | 8 | 50 | 85 |
| R-3 | 8000 | 31 | 68 | 110 |
| R-4 | 6000 | 6 | 49 | 75 |

The binder resin may further comprise another resin in addition to the polyester resin. Such other resins include, but are not limited to, styrene resins, acrylic resins, styrene-acrylic resins, silicone resins, epoxy resins, diene resins, phenolic resins, terpene resins, coumarin resins, amide resins, amide-imide resins, butyral resins, urethane resins, and ethylene-vinyl acetate resins.

The binder resin mainly comprises the polyester resin and comprises another resin in an amount of preferably from 0 part by mass to 30 parts by mass, relative to 100 parts by mass of the binder resin.

The polyester resin in the toner material is dissolved in an organic solvent capable of dissolving the polyester resin. While depending on the constitutional components of the polyester, the organic solvent can be selected from, for example, toluene, xylenes, hexane, and other hydrocarbons; methylene chloride, chloroform, dichloroethanes, and other halogenated hydrocarbons; ethanol, butanol, benzyl alcohol, tetrahydrofuran, and other alcohols and ethers; methyl acetate, ethyl acetate, butyl acetate, isopropyl acetate, and other esters; acetone, methyl ethyl ketone, diisobutyl ketone, cyclohexanone, methylcyclohexanone, and other ketones. These organic solvents are capable of dissolving the polyester resin but may not dissolve the coloring agent and other additives. The mass ratio of the toner material to the organic solvent is preferably from 10:90 to 80:20, more preferably from 30:70 to 70:30, and further preferably from 40:60 to 60:40 for better formation of fine particles by suspension granulation and for better yield of toner particles by aggregation.

Examples of the neutralizing agent for neutralizing the polyester resin are aqueous ammonia, aqueous solution of sodium hydroxide, and other basic aqueous solutions; allylamine, isopropylamine, diisopropylamine, ethylamine, diethylamine, triethylamine, 2-ethylhexylamine, and other amines. The amount of the neutralizing agent is as enough as to neutralize the acid value of the polyester resin.

—Toner Coloring Agents—

The coloring agent is added together with the binder resin to a toner material composition and is dispersed in the fine particles. The coloring agent may further be incorporated into the fine particles by heteroaggregation during growth of the particles. Examples of the coloring agent are known or conventional organic pigments, inorganic pigments, and dyes such as Color Index (C.I.) Pigment Red 48:1, C.I. Pigment Red 57:1, C.I. Pigment Red 122, C.I. Pigment Yellow 17, C.I. Pigment Yellow 97, C.I. Pigment Yellow 12, C.I. Pigment Blue 15:1, C.I. Pigment Blue 15:3, lamp black (C.I. No. 77266), rose bengal (C.I. No.45432), carbon black, nigrosine dye (C.I. No. 50415B), metal complex salt dyes, derivatives of metal complex salt dyes, and mixtures of these substances. Examples of the coloring agent also include silica, aluminum oxide, magnetite and ferrites, cupric oxide, nickel oxide, zinc oxide, zirconium oxide, titanium oxide, magnesium oxide, and other metal oxides, and mixtures of these substances.

The content of the coloring agent in the toner is preferably such that a visible image with sufficient density can be formed and is preferably from 1 part by mass to 100 parts by mass, and more preferably from 2 parts by mass to 20 parts by mass, relative to 100 parts by mass of the toner, although it varies depending on the particle diameter and amount of the toner.

—Toner Wax(Releasing Agent)—

A wax(releasing agent) may be added to the toner material and/or may be incorporated into the toner by heteroaggregation during growth of the toner particles. The wax for use herein is preferably low-melting point wax having a melting point of 110° C. or lower or a latent heat of fusion of 230 mJ/mg or less. Such a low-melting point wax effectively serves as a relating member between a fixing roller and a toner interface to thereby prevent offset at high temperatures. Waxes having a melting point exceeding 110° C. or a latent heat of fusion exceeding 230 mJ/mg may not effectively serve as a releasing member. Those having a melting point of 30° C. or lower may not exhibit sufficient anti-blocking properties and storage stability of the toner and are not desirable. The melting point is determined from a maximum endothermic peak in differential scanning calorimetry (DSC).

The wax for use herein is not specifically limited and may be selected according to the purpose, as long as it has releasing properties. Examples of the wax are naturally occurring waxes such as carnauba wax, cotton wax, Japan wax, rice bran wax, and other vegetable waxes; beeswax, lanolin, and other animal waxes; ozokerite, ceresine, and other mineral waxes: paraffin wax, microcrystalline wax, petrolatum, and other petroleum waxes, as well as synthetic waxes such as Fischer-Tropsch wax, polyethylene wax, and other synthetic hydrocarbon waxes; 12-hydroxystearamide, stearamide, anhydrous phthalimide, and other fatty acid amides; chlorinated hydrocarbons; and esters, ketones, and ethers. In addition to the above materials, homopolymers or copolymers (for example, a copolymer of n-stearyl acrylate-ethyl methacrylate) of polyacrylates such as poly(n-stearyl methacrylate) and poly(n-lauryl methacrylate), and other crystalline polymers having a long alkyl group at the side chain and having a relatively low molecular weight are given as examples of the releasing agent. Among these materials, petroleum waxes or synthetic waxes such as paraffin wax and microcrystalline wax are preferred.

The micronization of the wax (releasing agent) can be performed by any one of conventionally known processes using, for example, an emulsifying and dispersing apparatus as described in Report-1 of Research Group on Reaction Engineering, "Emulsion Dispersion Technology and Particle Size Control of Polymer Fine Particles, Chapter 3" (published by The Society of Polymer Science, Japan, March, 1995). A process (dissolution/precipitation process) may be also used in which, using a suitable solvent which is compatible or miscible with an organic solvent used for producing a toner and does not dissolve a releasing agent at room temperature, a releasing agent is added to this solvent and dissolved under heat, followed by gradually cooling the resulting solution to room temperature to precipitate a micronized releasing agent. In addition, a process (vapor phase vaporizing process) may be used in which a releasing agent is heated and vaporized in an inert gas such as helium gas to prepare particles of the releasing agent in a vapor phase, in succession the particles are adsorbed by, for example, a cooled film to recover these particles, and the recovered particles are dispersed in a solvent. Further, each of these processes may preferably be combined with a mechanical milling process using a medium, which is more effective for micronization.

The amount of the wax(releasing agent) is preferably from 2% by mass to 20% by mass, and more preferably from 2% by mass to 10% by mass of the binder resin.

—Toner Other Components—

The toner of the present invention may also contain other components such as internal additives, charge control agents and inorganic particles. Examples of the internal additives are metals such as ferrite, magnetite, reduced iron, cobalt, nickel and manganese, alloys or magnetic bodies such as compounds containing these metals.

As the charge control agent, a compound for use in a powdery toner selected from metal salts of benzoic acid, metal salts of salicylic acid, metal salts of alkylsalicylic acid, metal salts of catechol, metal-containing bisazo dyes, tetraphenyl borate derivatives, quaternary ammonium salts, and alkylpyridinium salts and optional combinations of these compounds can be desirably used.

The amount of the charge control agent is preferably from 0.1% by mass to 10% by mass, and more preferably from 0.5% by mass to 8% by mass of the toner. If the amount is less than 0.1% by mass, the charge control agent may not sufficiently exhibit its charge control function. If it exceeds 10% by mass, the toner may have an excessively low resistance and may not be used in practice.

In addition, a metallic soap and an inorganic or organic metal salt may be used in combination with the above charge control agent. Examples of such a metallic soap include aluminum tristearate, aluminum distearate; stearates of barium, calcium, lead, and zinc; linolenic acid salts of cobalt, manganese, lead, and zinc; octanoates of aluminum, calcium, and cobalt; oleates of calcium and cobalt; zinc palmitate; naphthenates of calcium, cobalt, manganese, lead, and zinc; and resinates of calcium, cobalt, manganese, lead, and zinc. The inorganic or organic metal salts are, for example, salts in which a cationic moiety in the metal salt is selected from the group consisting of metals of Group Ia, Group IIa, and Group IIIa of the Periodic Table of Elements.

The amount of each of these charge control agents or cleaning aids is generally preferably from 0.1 part by mass to 10 parts by mass and more preferably from 0.1 part by mass to 5 parts by mass, relative to 100 parts by mass of the toner. If the amount is less than 0.1 part by mass, a desired effect may not be obtained sufficiently. In contrast, an amount exceeding 10 parts by mass may cause a reduction in the powder fluidity of the toner, which makes it difficult to use the resulting toner.

As the surfactant, ionic and nonionic surfactants can be used. Specific examples of anionic surfactants include alkylbenzenesulfonates, alkylnaphthalenesulfonates, higher fatty acid salts, sulfates of higher fatty acid esters, and sulfonates of higher fatty acid esters. Examples of the cationic surfactants are primary, secondary, and tertiary amine salts, and quaternary ammonium salts. Examples of the nonionic surfactants are polyoxyethylene nonyl phenyl ether, polyoxyethylene octyl phenyl ether, polyoxyethylene dodecyl phenyl ether, polyoxyethylene alkyl ethers, polyoxyethylene fatty acid esters, sorbitan fatty acid esters, polyoxyethylene sorbitan fatty acid esters, and fatty acid alkylolamides. Each of these surfactants can be used alone or in combination. Preferably the surfactant is used in an amount ranging from 0.001 part by mass to 5 parts by mass relative to the aqueous medium in the aqueous phase.

Next, a process for producing a toner by aggregation of fine particles will be described, which fine particles have been formed by suspension granulation from the mixture solution of the toner materials. The fine particles having a polyester resin with a carboxylic salt on their surfaces are finely dispersed in the aqueous medium by action of an electric double layer. The zeta potential of the fine particles is preferably controlled within a range from 20 mV to 70 mV. By adding an electrolyte to the aqueous medium containing the dispersed fine particles under conditions such as to allow the polyester resin to be plasticized, the fine particles can grow to a desired toner particle diameter.

Examples of the electrolyte are sodium sulfate, ammonium sulfate, potassium sulfate, magnesium sulfate, sodium phosphate, sodium dihydrogen phosphate, ammonium chloride, calcium chloride, sodium acetate, and other inorganic and organic water-soluble salts. The amount of the electrolyte is generally preferably 0.01 moles per liter to 2 moles per liter of an aqueous solution. The aqueous medium may be distilled water, ion-exchanged water, and other pure water but may further contain a known inorganic dispersing agent, a polymeric flocculating agent, and other components.

Preferably the fine particles are granulated in the aqueous medium under a high shearing condition. To produce toner particles having small particle diameters, a dispersing machine having a high speed shearing mechanism is preferably used. Among these dispersing machines, high-speed blade rotation type and forced gap-passing type homogenizers such as various homomixers, homogenizers, and colloid mills are more preferred.

During or after the process for granulating the fine particles, the organic solvent may be removed. The removal of the organic solvent may be performed at elevated temperatures or under reduced pressure. To remove the organic solvent at elevated temperatures, the organic solvent is preferably removed at a temperature in a range of which is lower than the boiling point of the organic solvent and does not largely exceed the glass transition point Tg of the binder resin. When the temperature for the removal of the solvent largely exceeds Tg of the binder resin, toners are probably fused each other, which is undesirable. Though a desirable temperature range depends on the boiling point of the organic solvent and Tg of the used binder resin, the organic solvent is preferably removed with stirring at a temperature around 40° C. for 3 hours to 24 hours. When the removal is performed under reduced pressure, it is preferred to perform at a pressure of 20 mmHg to 150 mmHg.

To control the internal structure of the toner obtained by growth of the fine particles by aggregation, it is preferred that particles of another polyester having a different composition from that of the polyester in the fine particles are sequentially added. Thus, the fine particles are incorporated into the core of the toner at early stages of particle aggregation, and the polyester particles added thereafter cover the surface of the toner.

Preferably the resulting toner is washed to remove an inorganic dispersion stabilizer remained on the surfaces of the toner particles. For the washing, acids such as hydrochloric acid, nitric acid, formic acid, and acetic acid, which allows the inorganic dispersion stabilizer to be water-soluble, can be used. When these inorganic stabilizers and the aforementioned surfactants are hygroscopic and remain at the surface of the toner particles, the chargeability of the toners may vary depending on humidity and other surrounding conditions. It is therefore desirable that the inorganic dispersion stabilizer is removed from the surface of the toner by washing in order to eliminate an adverse influence on the chargeability and powder fluidity of the toner.

The toner washed with an acid or a base may be again washed with a basic aqueous solution such as sodium hydroxide as required. Thus, a part of ionic substances, which remains on the surface of the toner and is insolubilized under acidic conditions, is again solubilized by the basic aqueous solution and removed, with the result that the chargeability and the powder fluidity of the toner is improved. Furthermore, these washing treatments using an acid or a basic aqueous solution effectively remove free releasing agents (waxes) adhering to the surface of the toner. The washing treatment can be more efficiently carried out by appropriately selecting a stirrer and an ultrasonic dispersing apparatus used in the washing treatment as well as by controlling conditions of the pH of the washing liquid, number of washings, and washing temperature. After the washing, processes such as filtration, decantation, and centrifugation are performed, followed by drying to obtain a toner for electrophotography.

Known external additives may be added to the toner for use in the present invention to control the fluidity and the developing properties. Examples of the external additives are various inorganic oxide fine particles such as silica, alumina, titania, and cerium oxide, those produced by subjecting these fine particles to hydrophobic treatment as required, as well as vinyl polymers, and zinc stearate. The amount of the external additives is preferably in a range from 0.05 parts by mass to 5 parts by mass to 100 parts by mass of the toner particles before addition of the external additives.

The toner can be used in a known dry electrostatic charge developing process without any limitation. It can be adapted to, for example, a two-component developing process such as a cascade process, magnetic brush process, and microtoning process and a one-component developing process such as an electroconductive one-component developing process and an insulating one-component developing process as well as a non-magnetic one component developing process. It is possible to design a unique process which effectively utilizes the low adhesion of the toner which is caused by its spherical shape.

The toner for electrophotography for use in the present invention mainly comprises, as a binder resin, a polyester resin that cannot be produced by a conventional dispersion polymerization and suspension polymerization and comprises low-melting-point resins in the core and surface thereof in a preferred proportion. The toner thereby has improved image-fixing properties at low temperatures and can avoid thermal blocking due to heating in an image-fixing process. The process for producing the toner for electrophotography can disperse a low-melting-point resin into a polyester resin by a specific granulation process and can thereby easily produce a toner having satisfactory properties as powder. In addition, the process can uniformly disperse a releasing agent and other additives as fine particles into the toner particles. Such a low-melting-point resin is not used in conventional kneading and pulverization processes.

The toner may also contain an external additive if necessary. Examples of this additive are inorganic powders and organic particles. Examples of inorganic particles are $SiO_2$, $TiO_2$, $Al_2O_3$, CuO, ZnO, $SnO_2$, $Fe_2O_3$, MgO, BaO, CaO, $K_2O$, $Na_2O$, $ZrO_2$, $CaO$—$SiO_2$, $K_2O$—($TiO_2$), $Al_2O_3$-$2SiO_2$, $CaCO_3$, $MgCO_3$, $BaSO_4$ and $MgSO_4$. Examples of organic particles are fatty acids and their derivatives, powdered metal salts thereof, and resin powders of fluorine resins, polyethylene resin and acrylic resins. The average particle diameter of these powders may for example be 0.01 μm to 5 μm, but is preferably 0.1 μm to 2μm.

There is no particular limitation on the process of manufacturing the toner, but it is preferably manufactured by a process comprising the steps of (i) forming cohesive particles in a dispersion of resin particles to manufacture a cohesive particle dispersion, (ii) adding a fine particle dispersion to the above cohesive particle dispersion so that the fine particles adhere to the cohesive particles, thus forming adhesion particles, and (iii) heating the above adhesion particles which melt to form toner particles.

—Physical Properties of the Toner—

The toner according to the present invention has a volume-average particle diameter of preferably 7 μm or less and more preferably 5.5 μm or less.

If the volume average particle diameter of the toner is too small, it may have an adverse effect on handling of the toner (supplementation, cleaning properties and flow properties), and particle productivity may decline. On the other hand, if the volume average particle damage is too large, it may have an adverse effect on image quality and resolution due to granularity and transfer properties.

It is preferred that the toner according to the present invention satisfies the above toner volume average particle diameter range, and that the volume average particle distribution index (GSDv) is 1.3 or less.

It is preferred that the ratio (GSDv/GSDn) of the volume average polymer distribution index (GSDv) and number average particle distribution index (GSDn) is 0.95 or more.

The toner preferably has a volume-average particle diameter distribution coefficient within the above-specified range and has an average of shape factors represented by the following equation of from 1.0 to 1.5 and more preferably from 1.05 to 1.4.

$$\text{Shape coefficient}=(\pi \times L^2)/(4 \times S)$$

(where, L is the maximum length of the toner particles, and S is the projection surface area of a toner particle).

When the toner has a volume-average particle diameter and a shape factor within the above-specified ranges, the toner serves to improve image quality such as graininess and resolution, is resistant to missing and/or blur accompanied with image transfer and does not invite deteriorated handleability even if the toner does not have a small average particle diameter.

The storage modulus G' (measured at an angular frequency of 10 rad/sec) of the toner itself at 150° C. is 10 Pa to 200 Pa, which is convenient for improving image quality and preventing offset in the fixing step.

The resolution of rendering a toner image from the digital image using color toners in the rendering and developing process is preferably 12000 dpi or higher and more preferably 2400 dpi or higher.

If the resolution is less than 1200 dpi, the resulting image may become rough.

A device for use in the rendering and developing process is not specifically limited, may be selected according to the purpose and includes, for example, (1) a multiple tandem development and image transfer device, and (2) an apparatus capable of rendering plural images and capable of automatically cutting a print.

Figure 2:
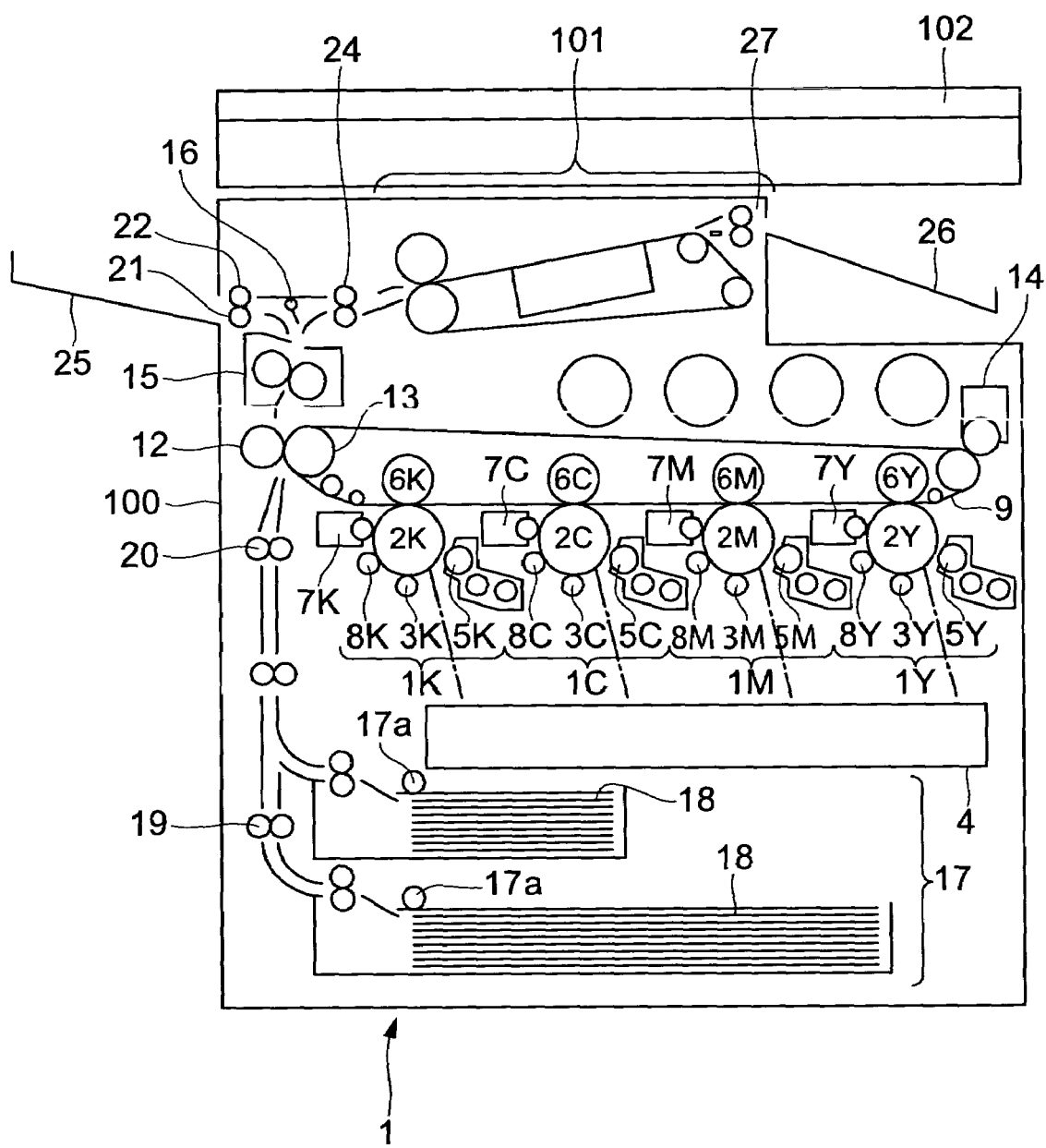
FIG. 2 is a schematic sectional view of an example of an image forming apparatus according to the present invention.
Figure 3:
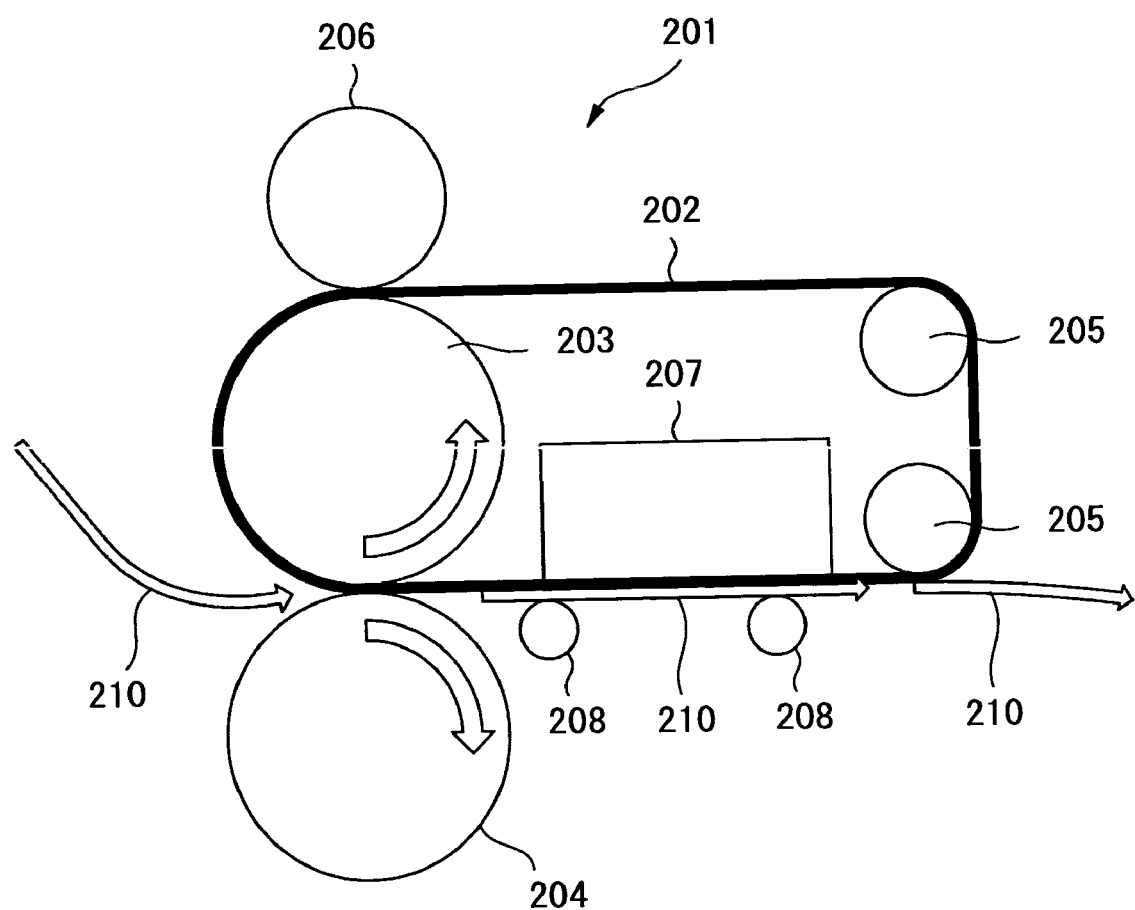
FIG. 3 is a schematic diagram of an example of a cooling and releasing procedure in a belt postprocessing device (endless press) for use in the present invention.
Figure 4:
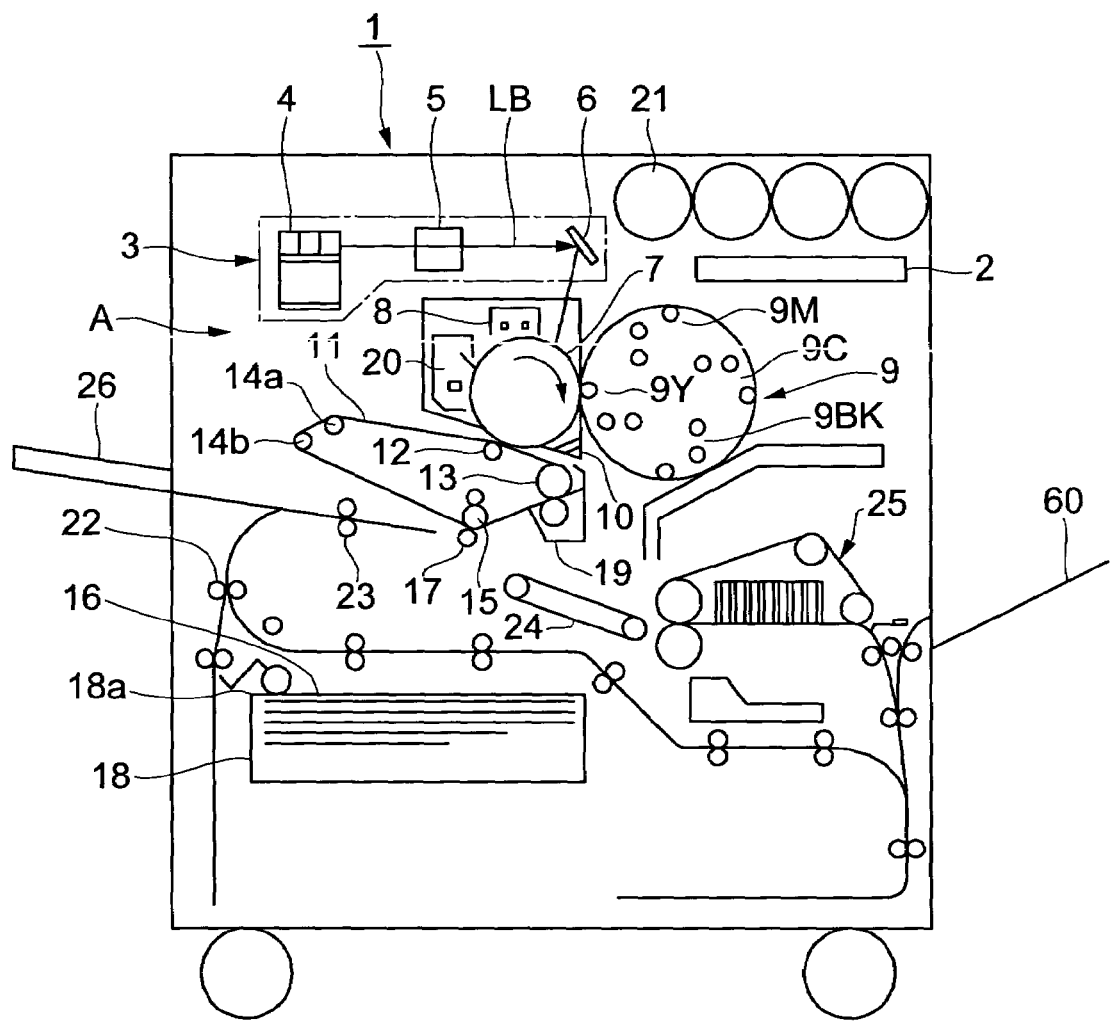
FIG. 4 is a schematic diagram of an example of an image forming apparatus using a belt image-fixing member.
Figure 5:
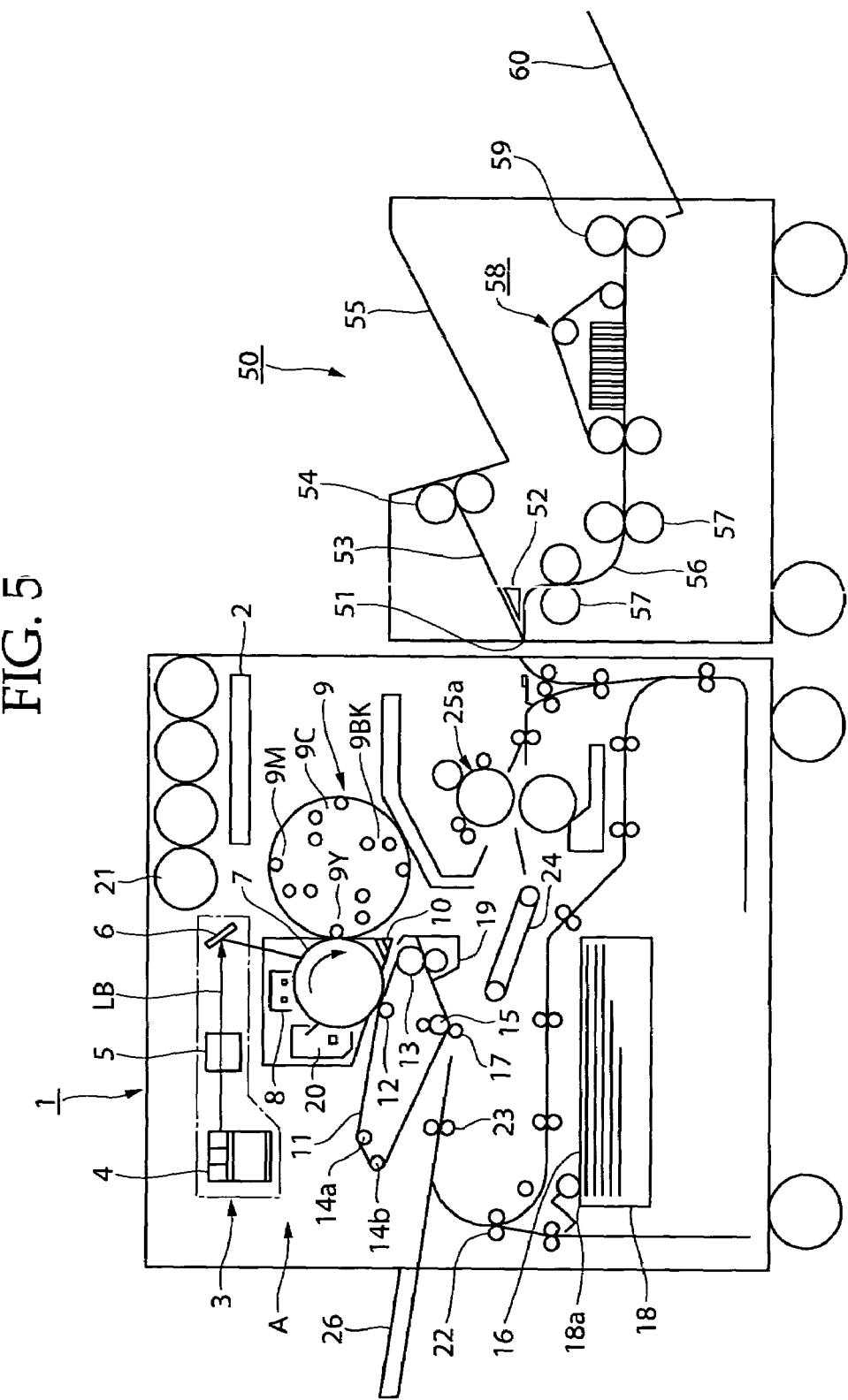
FIG. 5 is a schematic diagram of another example of an image forming apparatus using a belt image-fixing member.
Figure 6:
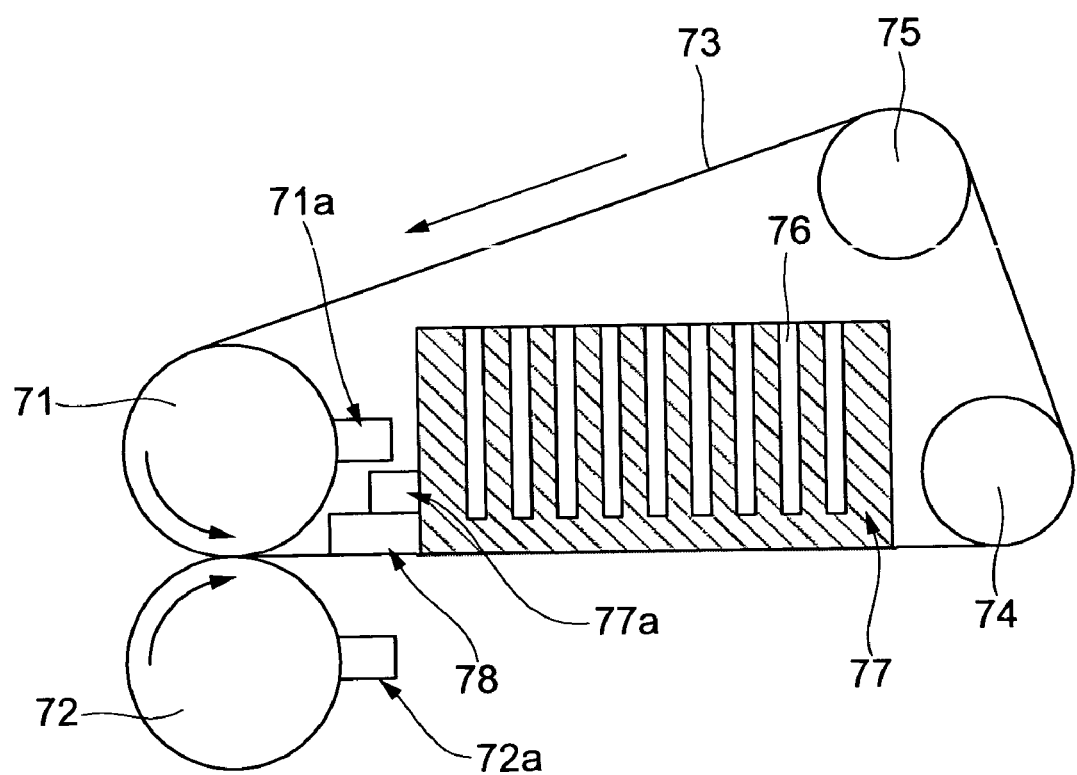
FIG. 6 is a schematic diagram of an example of an image-fixing unit using a belt image-fixing member.

The multiple tandem development and image transfer device (1) may have, for example, a configuration used in DCC400 (trade name, available from Fuji Xerox Co., Ltd., Japan) shown in FIG. 2. This device can produce color printed output at a high speed.

An example of the apparatus (2) capable of rendering plural images and capable of automatically cutting a print is a Docucutter DC 545 (trade name, available from Xerox Corporation, Conn.).

<Electrophotographic Image-Receiving Sheet>

The electrophotographic image-receiving sheet of the present invention comprises a support and at least a toner-image-receiving layer comprising a thermoplastic resin and being arranged on the support. It may further comprise at least one of additional layers appropriately selected according to necessity. Such additional layers include, for example, surface protective layers, interlayers, undercoat layers, cushioning layers, charge-control or antistatic layers, reflective layers, color-control layers, storage-stability improving layers, adhesion preventing layers, anticurling layers, and smoothing layers. Each of these layers can be a single layer or a multilayer.

The electrophotographic image-receiving sheet has an indicator on its back side. The term "back side" of the electrophotographic image-receiving sheet used herein means a side of a support on which a toner-image-receiving layer is not arranged when the toner-image-receiving layer is arranged on only one side of the support.

When toner-image-receiving layers are arranged on both sides of the support, the "back side" can be whichever side. However, such an electrophotographic image-receiving sheet has a front side and a back side having different properties to avoid blocking and to achieve high photographic quality. Thus, the indicator is arranged on the back side as specified during its production to have different properties or functions, regardless of the presence or absence of a toner-image-receiving layer.

The "indicator" as used herein means an indication which is arranged to distinguish between the front side and the back side of the electrophotographic image-receiving sheet and to avoid printing on the back side by mistake before or after printing on the front side.

Certain electrophotographic image-receiving sheets having a printed character or image such as postal code section on their back side have been provided. However, these electrophotographic image-receiving sheets are intended to print on both sides thereof, and the printed character or image is not provided for distinguishing between the front side and the back side. Accordingly, these conventional electrophotographic image-receiving sheets can be clearly distinguished from the electrophotographic image-receiving sheet of the present invention.

It is preferred that the indicator on the back side has been printed in a production process of the electrophotographic image-receiving sheet.

Alternatively, it is preferred that the indicator on the back side is printed on the electrophotographic image-receiving sheet during an image forming process. This is, for example, in the case of New Year greeting postcards. In this case, an apparatus capable of printing on both sides of the sheet is preferably used in the image forming process.

The indicator is not specifically limited, as long as it plays a role to distinguish between the front side and the back side based on visual observation of a user, and includes, for example, a logo, a price, performance, a catch phrase, a company name, a trade name, a trade mark, a diagram, a picture, a pattern, information (exchangeable image file format information; EXIF information) on the image, information on the copyright of the image, names of a photographic machine used and/or a photographer, and information on image processing. Among them, a logo, a company name, and a trade name are preferred as the indicator for imparting a promotional effect and a design to the electrophotographic image-receiving sheet and increasing its commercial value.

The EXIF information means a file format for digital still cameras, which is specified as a Standard of Japanese Electronic Industry Development Association (JEIDA) and has been developed by Fuji Photo Film Co., Ltd., Japan. Digital still cameras in Japan often employ this file format on a JPEG image format which is capable of including, for example, information on shooting and images such as shooting date as well as thumbnail-size images.

The indicator can be arranged in any region on the back side of the electrophotographic image-receiving sheet and is preferably arranged over the entire back side of the electrophotographic image-receiving sheet for further clearly distinguishing between the front side and the back side.

[Support]

Examples of the support are raw paper, synthetic paper, a synthetic resin sheet, coated paper, and laminated paper. Each of these supports can have a single layer structure or a multilayer structure.

—Raw Paper—

Materials for the raw paper are not specifically limited and can be selected from those used for known raw paper for use as supports and include, for example, natural pulp such as softwood pulp and hardwood pulp; synthetic pulp such as those made from plastic materials such as polyethylenes and polypropylenes; and mixtures of natural pulp and synthetic pulp.

The pulp for use as the material for the raw paper is preferably latifoliate tree bleached kraft pulp (LBKP) for satisfactorily balanced surface smoothness, rigidity and dimensional stability (anti-curling properties) at sufficient level. Needle-leafs tree bleached kraft pulp (NBKP), latifoliate tree sulfite pulp(LBSP), and other pulp can also be used as the pulp.

The pulp preferably mainly comprises latifoliate tree pulp inherently having shorter fibers.

The pulp can be beaten with a beater or refiner. A pulp slurry (hereinafter referred to as "pulp stock") obtained by beating the pulp may further comprise various additives. Such additives include, but are not limited to, fillers, agents for enhancing dry strength of paper, sizing agents, agents for enhancing wet strength of paper, bonding agents, pH adjusters, and other agents.

The fillers include, but are not limited to, calcium carbonate, clay, kaolin, China clay, talc, titanium dioxide, diatomaceous earth, barium sulfate, aluminum hydroxide, and magnesium hydroxide.

The agents for enhancing dry strength of paper include, but are not limited to, cationized starch, cationic polyacrylamides, anionic polyacrylamides, amphoteric polyacrylamides, and carboxy-modified poly(vinyl alcohol)s.

The sizing agents include, but are not limited to, fatty acid salts, rosin, maleic acid-added rosin, and other rosin derivatives, paraffin waxes, alkyl ketene dimers, alkenyl succinic anhydrides (ASAs); and compounds containing higher fatty acids such as epoxidized fatty acid amides.

The agents for enhancing wet strength of paper include, but are not limited to, polyamine-polyamide-epichlorohydrin, melamine resins, urea resins, and epoxidized polyamide resins.

The bonding agents (fixing agents) include, but are not limited to, aluminum sulfate, aluminum chloride, and other polyvalent metallic salts; cationized starch and other cationic polymers.

The pH adjusters include, but are not limited to, sodium hydroxide, and sodium carbonate. The other agents include, but are not limited to, antifoaming agents, dyes, slime control agents, and fluorescent brightening agents (fluorescent whitening agents).

The pulp stock may further comprise a softening agent. Examples of the softening agent can be found in, for example, New Paper Processing Handbook (Shigyo Taimususha Ltd., Japan) p. 554–555 (1980).

A composition for use in surface sizing may comprise, for example, a water-soluble polymer, a sizing agent, a water-resistant substance, a pigment, a pH adjuster, a dye, and/or a fluorescent brightening agent. Such water-soluble polymers include, but are not limited to, cationized starch, poly(vinyl alcohol)s, carboxy-modified poly(vinyl alcohol)s, carboxymethylcellulose, hydroxyethylcellulose, cellulose sulfate, gelatin, casein, poly(sodium acrylate)s, sodium salt of styrene-maleic anhydride copolymers, and poly(sodium styrenesulfonate)s.

Examples of the water-resistant substance are latices and emulsions of, for example, styrene-butadiene copolymers, ethylene-vinyl acetate copolymers, polyethylenes, vinylidene chloride copolymers, and polyamide-polyamine-epichlorohydrin.

Examples of the pigment are calcium carbonate, clay, kaolin, talc, barium sulfate, and titanium dioxide.

Examples of the materials for the raw paper also include synthetic pulp paper, mixed paper of naturally occurring pulp and synthetic pulp and a variety of combination paper, in addition to the naturally occurring pulp paper.

To improve the rigidity (stiffness) and dimensional stability (anti-curling properties) of the electrophotographic image-receiving sheet, the raw paper preferably has the ratio (Ea/Eb) of a longitudinal Young's modulus Ea to a transverse Young's modulus Eb of from 1.5 to 2.0. If the ratio Ea/Eb is less than 1.5 or exceeds 2.0, the rigidity and anti-curling properties of the electrophotographic image-receiving sheet may apt to decrease, thus the resulting electrophotographic image-receiving sheet may not be carried or conveyed satisfactorily.

The Oken type smoothness of the raw paper on the image forming layer side is preferably 210 seconds or more, and more preferably 250 seconds or more. If the Oken type smoothness is less than 210 seconds, the resulting toner image may have deteriorated quality. Although the upper limit of the Oken type smoothness is not specifically limited, it is actually about 600 seconds, and preferably about 500 seconds.

The Oken type smoothness used herein means a smoothness specified in No. 5, process B by Japan Technical Association of the Pulp and Paper Industry (JAPAN TAPPI).

It has been found that in general, the "tone" of the paper differs based on differences in the way the paper is beaten, and the elasticity (modulus) of paper from paper-making after beating can be used as an important indication of the "tone" of the paper. The elastic modulus of the paper may be calculated from the following equation by using the relation of the dynamic modulus which shows the physical properties of a viscoelastic object and density, and measuring the velocity of sound propagation in the paper using an ultrasonic oscillator.

$$E=\rho c^2(1-n^2)$$

In equation, E is a dynamic modulus of elasticity; $\rho$ is a density; c is a sonic velocity in the paper; and n is a Poisson's ratio.

As n=0.2 in the case of ordinary paper, there is not much difference in the calculation if the calculation is performed by the following equation:

$$E=\rho c^2$$

That is, if the density of the paper and acoustic velocity can be measured, the elastic modulus can easily be calculated. In the above equation, when measuring acoustic velocity, various instruments known in the art may be used, such as a Sonic Tester SST-110 (Nomura Shoji Co., Ltd.).

The thickness of the raw paper is preferably from 30 μm to 500 μm, more preferably from 50 μm to 300 μm, and further preferably from 100 μm to 250 μm. The basis weight of the raw paper is, for example, preferably from 50 g/m² to 250 g/m², and more preferably from 100 g/m² to 200 g/m².

Preferred examples of the raw paper are woodfree paper and paper described in "Basis of Photographic Technology—silver halide photography—" edited by The Society of Photographic Science and Technology of Japan, Corona Publishing Co., Ltd., Japan, pp. 223–240 (1979).

In the above raw paper, it is preferred to use pulp fibers having a fiber length distribution as disclosed for example by Japanese Patent Application Laid-Open (JP-A) No. 58-68037 (e.g., the sum of 24-mesh screen residue and 42-mesh screen residue is 20% by mass to 45% by mass, and 24-mesh screen residue is 5% by mass or less) in order to give the desired center line average roughness to the surface. Moreover, the center line average roughness can be adjusted by giving a surface treatment of heat and pressure in a machine calender, super calender, etc.

—Synthetic Paper—

The synthetic paper is paper mainly comprising polymer fibers other than cellulose fibers. Such polymer fibers include, for example, fibers of polyolefins such as polyethylenes and polypropylenes.

—Synthetic Resin Sheet (Film)—

The synthetic resin sheet (film) includes, for example, sheets molded from a synthetic resin. Examples of such sheets are polypropylene sheets, oriented polyethylene sheets, oriented polypropylene sheet, polyester films, oriented polyester films, nylon films, films which has become white by drawing, and white films containing a white pigment.

—Coated Paper—

The coated paper is paper having a coat of a resin, a rubber latex, or a polymer material at least on one side thereof. The amount of the coat varies depending on the use. Such coated paper includes, for example, art paper, cast coated paper, and Yankee paper.

The resin to be applied to the surface of the raw paper or other material is preferably a thermoplastic resin. Examples of such thermoplastic resins are the following thermoplastic resins (i) through (viii).

(i) Polyethylene resins, polypropylene resins, and other polyolefin resins; copolymer resins comprising an olefin such as ethylene or propylene with another vinyl monomer; and acrylic resins.

(ii) Thermoplastic resins having an ester bond such as polyester resins obtained by the condensation of a dicarboxylic acid component which may be substituted with, for example, a sulfone group, or a carboxyl group, with an alcohol component which may be substituted with, for example, a hydroxyl group; polyacrylate or polymethacrylate resins such as poly(methyl methacrylate)s, poly(butyl methacrylate)s, poly(methyl acrylate)s, and poly(butyl acrylate)s; polycarbonate resins; poly(vinyl acetate) resins; styrene-acrylate resins; styrene-methacrylate resins; and vinyl-toluene-acrylate resins.

Typical disclosure of the resins (i) can be found in, for example, JP-A No. 59-101395, JP-A No. 63-7971, JP-A No. 63-7972, JP-A No. 63-7973, and JP-A No. 60-294862.

Such polyester resins are commercially available under the trade names of, for example, Vylon 290, Vylon 200, Vylon 280, Vylon 300, Vylon 103, Vylon GK-140, and Vylon GK-130 from Toyobo Co., Ltd.; Tuftone NE-382, Tuftone U-5, ATR-2009, and ATR-2010 from Kao Corporation; Elitel UE 3500, UE 3210, XA-8153, KZA-7049, and KZA-1449 from Unitika Ltd.; and Polyestar TP-220, and R-188 from Nippon Synthetic Chemical Industry Co., Ltd.; Hiros series products available from Seiko Chemical Industries Co., Ltd., Japan, and other thermoplastic resins.

(iii) Polyurethane resins.

(iv) Polyamide resins and urea resins.

(v) Polysulfone resins.

(vi) Polyvinyl chloride resin, polyvinylidence chloride resin, vinyl chloride-vinyl acetate-copolymer resin and vinyl chloride-vinyl propionate copolymer resin.

(vii) Polyol resins such as polyvinyl butyral, and cellulose resins such as ethyl cellulose resin and cellulose acetate resin.

(viii) Polycaprolactone resin, styrene-maleic anhydride resin, polyacrylonitrile resin, polyether resins, epoxy resins and phenol resins.

Each of these thermoplastic resins can be used alone or in combination.

Where necessary, the resin may further comprise any of additives such as brightening agents (whitening agents), conductant agents, fillers, and pigments and dyes such as titanium oxide, ultramarine blue, and carbon black.

—Laminated Paper—

The laminated paper is paper comprising a sheet such as raw paper, and a sheet or film laminated on the base sheet. As the laminate layer, various resins, rubber latex and polymer material may be used. Specific example of the materials useable for the lamination include polyolefins, poly(vinyl chloride)s, poly(ethylene terephthalate)s, polystyrenes, polymethacrylates, polycarbonates, polyimides and triacetylcellulose. Each of these resins can be used alone or in combination.

Generally, a low-density polyethylene is used as the polyolefin. However, for improving the thermal resistance of the support, it is preferred to use polypropylene, a blend of polypropylene and polyethylene, a high-density polyethylene, or a blend of the high-density polyethylene and a low-density polyethylene. From the viewpoint of cost and its suitableness for the lamination, it is preferred to use the blend of the high-density polyethylene and the low-density polyethylene The blend of the high-density polyethylene and the low-density polyethylene is used in a blend ratio (a mass ratio) of, for example, 1:9 to 9:1, preferably 2:8 to 8:2, and more preferably 3:7 to 7:3. When the polyethylene is applied to both surfaces of the support, the polyolefin to be applied to the back side of the support is, for example, preferably the high-density polyethylene or a blend of the high-density polyethylene and the low-density polyethylene. The molecular weight of the polyethylenes is not particularly limited. Desirably, both of the high-density polyethylene and the low-density polyethylene have a melt index of 1.0 g/10 min to 40 g/10 min. and a high extrudability.

The sheet or film to be laminated may be subjected to a treatment to impart white reflection thereto. For example, a pigment such as titanium dioxide is incorporated into the sheet or film.

The thickness of the support is preferably from 25 μm to 300 μm, more preferably from 50 μm to 260 μm, and further preferably from 75 μm to 220 μm. The support can have any rigidity according to the purpose. When it is used as a support for electrophotographic image-receiving sheet of photographic image quality, the rigidity thereof is preferably near to that in a support for use in color silver halide photography.

[Toner-image-receiving Layer]

The toner-image-receiving layer is a toner-image-receiving layer for receiving a color or black toner to form an image. The toner-image-receiving layer receives a toner for image formation from a development drum or an intermediate transfer member by action of (static) electricity or pressure in a transfer process and fixes the toner as an image by action of, for example, heat and/or pressure in an image-fixing process.

To impart photographic texture to the electrophotographic image-receiving sheet, the toner-image-receiving layer is preferably has low optical transparency in terms of an optical transmittance of 78% or less, more preferably 73% or less, and further preferably 72% or less.

The optical transmittance can be determined by forming a coated film having the same thickness as the toner-image-receiving layer on a polyethylene terephthalate film (100 μm thick), and measuring the optical transmittance of the coated film with a direct-reading haze mater HGM-2DP (trade name, available from Suga Test Instruments, Japan).

The toner-image-receiving layer comprises at least a thermoplastic resin and may further comprise other components.

—Thermoplastic Resins—

Thermoplastic resins for use in the present invention are not specifically limited as long as they can deform at temperatures during, for example, image-fixing and can receive the toner. They can be appropriately selected depending on an intended purpose and are preferably similar or the same resin as the binder resin of the toner. Polyester resins, styrene resins, styrene-butyl acrylate, and other copolymer resins are often used in most of such toners, and the image-receiving sheet preferably comprise any of these polyester resins, styrene resins, styrene-butyl acrylate, and other copolymer resins more preferably in an amount of 20% by mass or more. As the thermoplastic resins, styrene-acrylic ester copolymers and styrene-methacrylic ester copolymers are also preferred.

Examples of the thermoplastic resins are (i) resins each having an ester bond, (ii) polyurethane resins and similar resins, (iii) polyamide resins and similar resins, (iv) polysulfone resins and similar resins, (v) poly(vinyl chloride) resins and similar resins, (vi) poly(vinyl butyral) and similar resins, (vii) polycaprolactone resins and similar resins, and (viii) polyolefin resins and similar resins.

The resins (i) having an ester bond include, for example, polyester resins obtained by condensation of a dicarboxylic acid component with an alcohol component. Such dicarboxylic acid components include, but are not limited to, terephthalic acid, isophthalic acid, maleic acid, fumaric acid, phthalic acid, adipic acid, sebacic acid, azelaic acid, abietic acid, succinic acid, trimellitic acid, pyromellitic acid, and other dicarboxylic acids. Each of these dicarboxylic acid components may have a sulfonic acid group, a carboxyl group, or another group substituted thereon. The alcohol components include, but are not limited to, ethylene glycol, diethylene glycol, propylene glycol, bisphenol A, diether derivatives of bisphenol A (e.g., an ethylene oxide diadduct of bisphenol A, and a propylene oxide diadduct of bisphenol A), bisphenol S, 2-ethylcyclohexyldimethanol, neopentyl glycol, cyclohexyldimethanol, glycerol, and other alcohols. Each of these alcohol components may have a hydroxyl group or another group substituted thereon. The resins (i) also include poly(methyl methacrylate), poly(butyl methacrylate), poly(methyl acrylate), poly(butyl acrylate), and other polyacrylic ester resins and polymethacrylic ester resins, polycarbonate resins, poly(vinyl acetate) resins, styrene-acrylate resins; styrene-methacrylate copolymer resins, and vinyltoluene-acrylate resins.

Typical disclosure of the resins (i) can be found in, for example, JP-A No. 59-101395, JP-A No. 63-7971, JP-A No. 63-7972, JP-A No. 63-7973, and JP-A No. 60-294862.

Such polyester resins are commercially available under the trade names of, for example, Vylon 290, Vylon 200, Vylon 280, Vylon 300, Vylon 103, Vylon GK-140, and Vylon GK-130 from Toyobo Co., Ltd.; Tuftone NE-382, Tuftone U-5, ATR-2009, and ATR-2010 from Kao Corporation; Elitel UE 3500, UE 3210, and XA-8153 from Unitika Ltd.; and Polyestar TP-220, and R-188 from Nippon Synthetic Chemical Industry Co., Ltd.

The acrylic resins are commercially available under the trade names of, for example, Dianal SE-5437, SE-5102, SE-5377, SE-5649, SE-5466, SE-5482, HR-169, HR-124, HR-1127, HR-116, HR-113, HR-148, HR-131, HR-470, HR-634, HR-606, HR-607, LR-1065, LR-574, LR-143, LR-396, LR-637, LR-162, LR469, LR-216, BR-50, BR-52, BR-60, BR-64, BR-73, BR-75, BR-77, BR-79, BR-80, BR-83, BR-85, BR-87, BR-88, BR-90, BR-93, BR-95, BR-100, BR-101, BR-102, BR-105, BR-106, BR-107, BR-108, BR-112, BR-113, BR-115, BR-116, and BR-117 from Mitsubishi Ravon Co., Ltd.; Eslec P SE-0020, SE-0040, SE-0070, SE-0100, SE-1010, and SE-1035 from Sekisui Chemical Co., Ltd.; Himer ST 95, and ST 120 from Sanyo Chemical Industries, Ltd.; and FM 601 from Mitsui Chemicals, Inc.

The poly(vinyl chloride) resins and similar resins (v) include, for example, poly(vinyl chloride) resins, poly(vinylidene chloride) resins, vinyl chloride-vinyl acetate copolymer resins, and vinyl chloride-vinyl propionate copolymer resins.

The poly(vinyl butyral) and similar resins (vi) include, for example, poly(vinyl butyral), polyol resins, as well as ethylcellulose resins, cellulose acetate resins, and other cellulosic resins. These resins (f) are also commercially available from, for example, Denki Kagaku Kogyo Kabushiki Kaisha and Sekisui Chemical Co., Ltd. The poly(vinyl butyral) for use herein preferably comprises vinyl butyral in a content of 70% by mass or more and has an average polymerization degree of preferably 500 or more and more preferably 1000 or more. Such poly(vinyl butyral) is commercially available under the trade names of, for example, Denka Butyral 3000-1, 4000-2, 5000A, and 6000C from Denki Kagaku Kogyo Kabushiki Kaisha; and Eslec BL-1, BL-2, BL-3, BL-S, BX-L, BM-1, BM-2, BM-5, BM-S, BH-3, BX-1, and BX-7 from Sekisui Chemical Co., Ltd.

The polycaprolactone resins and similar resins (vii) further include, for example, styrene-maleic anhydride resins, polyacrylonitrile resins, polyether resins, epoxy resins, and phenol resins.

The polyolefin resins and similar resins (viii) include, for example, polyethylene resins, polypropylene resins, copolymer resins of an olefin such as ethylene or propylene with another vinyl monomer, and acrylic resins.

Each of these thermoplastic resins can be used alone or in combination. Mixtures of these thermoplastic resins and copolymers of monomers constituting the same can also be used.

The thermoplastic resin is preferably such a thermoplastic resin as to satisfy the requirements in the physical properties of a toner image receiving layer comprising the thermoplastic resin in question and is more preferably such a thermoplastic resin that can satisfy, by itself, the requirements. It is also preferred that two or more resins exhibiting different physical properties as the toner image receiving layer are used in combination.

The thermoplastic resin preferably has a molecular weight larger than that of a thermoplastic resin used in the toner. However, this relationship in molecular weight between two thermoplastic resins may not be applied to some cases. For example, when the thermoplastic resin used in the toner image receiving layer has a softening point higher than that of the thermoplastic resin used in the toner, the former thermoplastic resin may preferably have a molecular weight equivalent to or lower than that of the latter thermoplastic resin.

A mixture of resins having the same composition but different average molecular weights is also preferably used as the thermoplastic resin. The relationship in molecular weight between the thermoplastic resin used in the toner image receiving layer and that used in the toner is preferably one disclosed in JP-A No. 08-334915.

The thermoplastic resin preferably has a particle size distribution larger than that of the thermoplastic resin used in the toner.

The thermoplastic resin preferably satisfies the requirements in physical properties as disclosed in, for example, JP-A No. 05-127413, No. 08-194394, No. 08-334915, No. 08-334916, No. 09-171265, and No. 10-221877.

The thermoplastic resin for use in the toner-image-receiving layer is typically preferably at least one of water-soluble resins, water-dispersible resins, and other aqueous resins for the following reasons (i) and (ii).

(i) These aqueous resins do not invite exhaustion of an organic solvent in a coating and drying process and are thereby environment friendly and have good workability.

(ii) Most of waxes and other releasing agents cannot be significantly dissolved in solvents at room temperature and are often dispersed in a medium (water or an organic solvent) before use. Such aqueous dispersions are more stable and suitable in production processes. When an aqueous composition containing the thermoplastic resin and a wax is applied, the wax readily bleeds out on the surface of a coated layer, thus yielding the effects of the releasing agent (anti-offset properties and adhesion resistance) more satisfactorily.

The aqueous resins are not specifically limited in their compositions, bonding configurations, molecular structures, molecular weights, molecular weight distributions, shapes, and other factors and can be appropriately selected depending on an intended purpose, as long as they are water-soluble or water-dispersible resins. Examples of groups that impart hydrophilicity to polymers are sulfonic acid groups, hydroxyl groups, carboxyl groups, amino groups, amide groups, and ether groups.

Typical disclosure of the aqueous resins can be found in, for example, Research Disclosure No. 17,643, pp. 26; Research Disclosure No. 18,716, pp. 651; Research Disclosure No. 307,105, pp. 873–874; and JP-A No. 64-13546, pp. 71–75 (in Japanese).

Examples of such aqueous resins are vinylpyrrolidone-vinyl acetate copolymers, styrene-vinylpyrrolidone copolymers, styrene-maleic anhydride copolymers, water-soluble polyesters, water-soluble acrylics, water-soluble polyurethanes, water-soluble nylons (water-soluble polyamides), and water-soluble epoxy resins. Moreover, various types of gelatins may be selected according to the purpose from among liming gelatin, acid-treated gelatin and deliming gelatin wherein the content of calcium, etc., is reduced, and it is also preferable to use these in combination. Examples of water-soluble polyesters are various Pluscoats from Goo Chemical Co., Ltd. and the Finetex ES series from Dainippon Ink & Chemicals In. Examples of water-soluble acrylics are the Jurymer AT series from Nihon Junyaku Co., Ltd., Finetex 6161 and K-96 from Dainippon Ink & Chemicals Inc., and Hiros NL-1189 and BH-997L from Seiko Chemical Industries Co., Ltd.

Examples of water dispersible resins are water-dispersible type resins such as water-dispersible acrylate resin, water-dispersible polyester resin, water-dispersible polystyrene resin and water-dispersible urethane resin; and emulsions such as acrylate resin emulsion, polyvinyl acetate emulsion and SBR (styrene butadiene) emulsion. The resin can be conveniently selected from an aqueous dispersion of the above thermoplastic resins (i) to (viii), their emulsions, or their copolymers, mixtures and cation-modified derivatives, and two or more sorts can be combined.

Examples of the above water-dispersible resins in the polyester class are the Vylonal Series from Toyobo Co., Ltd, the Pesresin A Series from Takamatsu Oil & Fat Co., Ltd., the Tuftone UE Series from Kao Corporation, the WR Series from Nippon Synthetic Chemical Industry Co., Ltd., and the Elitel Series from Unitika Ltd., and in the acrylic class are the Hiros XE, KE and PE series from Seiko Chemical Industries Co., Ltd., and the Jurymer ET series from Nihon Junyaku Co., Ltd.

It is preferred that the film-forming temperature (MFT) of the polymer is above room temperature for storage before printing, and is less than 100° C. for fixing of toner particles.

The thermoplastic resin for use in the present invention is preferably a self-dispersible polyester resin emulsion satisfying the following conditions (1) to (4). This type of polyester resin emulsion is self-dispersible requiring no surfactant, is low in moisture absorbency even in an atmosphere at high humidity, exhibits less decrease in its softening point due to moisture and can thereby avoid offset in image-fixing and failures due to adhesion between sheets during storage. The emulsion is water-based and is environmentally friendly and excellent in workability. In addition, the polyester resin used herein readily takes a molecular structure with high cohesive energy. Accordingly, the resin has sufficient hardness (rigidity) during its storage but is melted with low elasticity and low viscosity during an image-fixing process for electrophotography, and the toner is sufficiently embedded in the toner-image-receiving layer to thereby form images having sufficiently high quality.

(1) The number-average molecular weight Mn is preferably from 5000 to 10000 and more preferably from 5000 to 7000.

(2) The molecular weight distribution (Mw/Mn) is preferably 4 or less, and more preferably 3 or less, wherein Mw is the weight-average molecular weight.

(3) The glass transition temperature Tg is preferably from 40° C. to 100° C. and more preferably from 50° C. to 80° C.

(4) The volume average particle diameter is preferably from 20 nm to 200 nm and more preferably from 40 nm to 150 nm.

The amount of the thermoplastic resin is generally preferably 20% by mass or more, and more preferably 30% by mass to 100% by mass of the toner-image-receiving layer.

The thickness of the toner-image-receiving layer is preferably one half or more, and more preferably one to three times the average particle diameter of the toner. The thickness of the toner-image-receiving layer is preferably those disclosed in JP-A No. 05-216322 and JP-A No. 07-301939 and is, for example, preferably from 1 μm to 50 μm, and more preferably from 5 μm to 15 μm.

The toner-image-receiving layer may further comprise other additives for improving its thermodynamic properties. The other additives include, for example, plasticizers, releasing agents, coloring agents, fillers, crosslinking agents, charge control agents, emulsions, and dispersions.

The plasticizers can be any of known plasticizers for resins. The plasticizers serve to control fluidizing or softening of the toner image receiving layer by action of heat and/or pressure when the toner is fixed.

Typical disclosures of the plasticizers can be found in, for example, Kagaku Binran (Chemical Handbook), ed. by The Chemical Society of Japan, Maruzen Co., Ltd. Tokyo; Plasticizer, Theory and Application, edited and written by Koichi Murai and published by Saiwai Shobo; Volumes 1 and 2 of Studies on Plasticizer; edited by Polymer Chemistry Association; and Handbook on Compounding Ingredients for Rubbers and Plastics, edited by Rubber Digest Co.

Examples of the plasticizers include, for example, esters of the following acids; phthalic, phosphoric, fatty acids, abietic, adipic, sebacic, azelaic, benzoic, butyric, epoxidized fatty acids, glycolic, propionic, trimellitic, citric, sulfonic, carboxylic, succinic, maleic, fumaric, and stearic acid; amides including aliphatic amides and sulfonamides, ethers, alcohols, lactones, poly (ethylene oxide)s (refer to JP-A No. 59-83154, No. 59-178451, No. 59-178453, No. 59-178454, No. 59-178455, No. 59-178457, No. 62-174754, No. 62-245253, No. 61-209444, No. 61-200538, No. 62-8145, No. 62-9348, No. 62-30247, No. 62-136646, and No. 2-235694). The plasticizers can be used by mixing with the resins.

Polymer plasticizers having a relatively low molecular weight can also be used herein. The molecular weight of such a plasticizer is preferably lower than that of a resin to be plasticized and is preferably 15000 or less, and more preferably 5000 or less. When these polymer plasticizers are used, those of the same kind with the resin to be plasticized are preferred. For example, low-molecular-weight polyesters are preferably used for plasticizing a polyester resin. In addition, oligomers can be used as the plasticizers. In addition to the aforementioned compounds, the plasticizers are also commercially available under the trade names of, for example, Adekacizer PN-170 and PN-1430 from Asahi Denka Kogyo Co., Ltd.; PARAPLEX G-25, G-30 and G40 from C. P. Hall Co.; Ester Gum 8L-JA, Ester R-95, Pentalin 4851, FK 115, 4820 and 830, Luisol 28-JA, Picolastic A75, Picotex LC and Crystalex 3085 from Rika Hercules Co.

The plasticizer can be freely used so as to mitigate stress and/or strain when the toner particles are embedded in the toner-image-receiving layer. Such strain includes, for example, physical strain such as elastic force and viscosity, and strain due to material balance in, for example, molecules, principle chains and/or pendant moieties of the binder.

The plasticizer may be finely dispersed, may undergo micro-phase separation into islands-in-sea structure or may be sufficiently dissolved or miscible with other components such as a binder in the layers.

The content of the plasticizer in the toner-image-receiving layer is preferably from 0.001% by mass to 90% by mass, more preferably from 0.1% by mass to 60% by mass, and further preferably from 1% by mass to 40% by mass.

The plasticizers can be used to control the slipping property leading to the improvement in the transport performance due to friction reduction, improve the anti-offset property during fixing (detachment of toner or layers onto the fixing means) or control the curling property and the charging property for a desirable latent toner image formation.

The releasing agent is incorporated into the toner-image-receiving layer so as to prevent offset of the toner-image-receiving layer. Such releasing agents are not specifically limited and can be appropriately selected, as long as they are melted or fused by heating at an image-fixing temperature, are deposited on the surface of the toner-image-receiving layer and form a layer of the releasing agent on the surface by cooling and solidifying.

The releasing agent can be at least one of silicone compounds, fluorine compounds, waxes, and matting agents. Among them, at least one selected from silicone oils, polyethylene waxes, carnauba waxes, silicone particles, and polyethylene wax particles is preferably used.

As the releasing agents, the compounds mentioned for example in "Properties and Applications of Waxes", Revised Edition, published by Saiwai Shobo, or The Silicon Handbook published by THE NIKKAN KOGYO SHIMBUN, may be used. Further, the silicon compounds, fluorine compounds or waxes used for the toners mentioned in JP-B Nos. 59-38581, 04-32380, Japanese Patents Nos. 2838498, 2949558, JP-A Nos. 50-117433, 52-52640, 57-148755, 61-62056, 61-62057, 61-118760, 02-42451, 03-41465, 04-212175, 04-214570, 04-263267, 05-34966, 05-119514, 06-59502, 06-161150, 06-175396, 06-219040, 06-230600, 06-295093, 07-36210, 07-43940, 07-56387, 07-56390, 07-64335, 07-199681, 07-223362, 07-287413, 08-184992, 08-227180, 08-248671, 08-248799, 08-248801, 08-278663, 09-152739, 09-160278, 09-185181, 09-319139, 09-319143, 10-20549, 10-48889, 10-198069, 10-207116, 11-2917, 11-44969, 11-65156, 11-73049 and 11-194542 can also be used. Moreover, two or more sets of these compounds can be used.

Examples of silicone compounds are non-modified silicone oils (specifically, dimethyl siloxane oil, methyl hydrogen silicone oil, phenyl methyl-silicone oil; or products such as KF-96, KF-96L, KF-96H, KF-99, KF-50, KF-54, KF-56, KF-965, KF-968, KF-994, KF-995 and HIVAC F-4, F-5 from Shin-Etsu Chemical Co., Ltd.; SH200, SH203, SH490, SH510, SH550, SH710, SH704, SH705, SH7028A, SH7036, SM7060, SM7001, SM7706, SH7036, SH8710, SH1107 and SH8627 from Dow Corning Toray Silicone Co., Ltd.; and TSF400, TSF401, TSF404, TSF405, TSF431, TSF433, TSF434, TSF437, TSF450 Series, TSF451 series, TSF456, TSF458 Series, TSF483, TSF484, TSF4045, TSF4300, TSF4600, YF33 Series, YF-3057, YF-3800, YF-3802, YF-3804, YF-3807, YF-3897, XF-3905, XS69-A1753, TEX100, TEX101, TEX102, TEX103, TEX104, TSW831, from Toshiba Silicones), amino-modified silicone oils (e.g., KF-857, KF-858, KF-859, KF-861, KF-864 and KF-880 from Shin-Etsu Chemical Co., Ltd., SF8417 and SM8709 from Dow Corning Toray Silicone Co., Ltd., and TSF4700, TSF4701, TSF4702, TSF4703, TSF4704, TSF4705, TSF4706, TEX150, TEX151 and TEX154 from Toshiba Silicones), carboxy-modified silicone oils (e.g., BY16-880 from Dow Corning Toray Silicone Co., Ltd., TSF4770 and XF42-A9248 from Toshiba Silicones), carbinol-modified silicone oils (e.g., XF42-B0970 from Toshiba Silicones), vinyl-modified silicone oils (e.g., XF40-A1987 from Toshiba Silicones), epoxy -modified silicone oils (e.g., SF8411 and SF8413 from Dow Corning Toray Silicone Co., Ltd.; TSF3965, TSF4730, TSF4732, XF42-A4439, XF42-A4438, XF42-A5041, XC96-A4462, XC96-A4463, XC96-A4464 and TEX170 from Toshiba Silicones), polyether-modified silicone oils (e.g., KF-351 (A), KF-352 (A), KF-353 (A), KF-354 (A), KF-355 (A), KF-615(A), KF-618 and KF-945 (A) from Shin-Etsu Chemical Co., Ltd.; SH3746, SH3771, SF8421, SF8419, SH8400 and SF8410 from Dow Corning Toray Silicone Co., Ltd.; TSF4440, TSF4441, TSF4445, TSF4446, TSF4450, TSF4452, TSF4453 and TSF4460 from Toshiba Silicones), silanol-modified silicone oils, methacryl-modified silicone oils, mercapto-modified silicone oils, alcohol-modified silicone oils (e.g., SF8427 and SF8428 from Dow Corning Toray Silicone Co., Ltd., TSF4750, TSF4751 and XF42-B0970 from Toshiba Silicones), alkyl-modified silicone oils (e.g., SF8416 from Dow Corning Toray Silicone Co., Ltd., TSF410, TSF411, TSF4420, TSF4421, TSF4422, TSF4450, XF42-334, XF42-A3160 and XF42-A3161 from Toshiba Silicones), fluorine-modified silicone oils (e.g., FS1265 from Dow Corning Toray Silicone Co., Ltd., and FQF501 from Toshiba Silicones), silicone rubbers and silicone particulates (e.g., SH851, SH745U, SH55UA, SE4705U, SH502 UA&B, SRX539U, SE6770 U-P, DY 38-038, DY38-047, Trefil F-201, F-202, F-250, R-900, R-902A, E-500, E-600, E-601, E-506, BY29-119 from Dow Corning Toray Silicone Co., Ltd.; Tospal 105, 120, 130, 145, 240 and 3120 from Toshiba Silicones), silicone-modified resins (specifically, olefin resins or polyester resins, vinyl resins, polyamide resins, cellulosic resins, phenoxy resins, vinyl chloride-vinyl acetate resins, urethane resins, acrylate resins, styrene-acrylate resins and their copolymerization resins modified by silicone, e.g., Diaroma SP203V, SP712, SP2105 and SP3023 from Dainichiseika Color & Chemicals Mfg. Co., Ltd.; Modepa FS700, FS710, FS720, FS730 and FS770 from NOF CORPORATION; Simac US-270, US-350, US-352, US-380, US-413, US-450, Reseda GP-705, GS-30, GF-150 and GF-300 from TOAGOSEI CO,. LTD.; SH997, SR2114, SH2104, SR2115, SR2202, DCI-2577, SR2317, SE4001U, SRX625B, SRX643, SRX439U, SRX488U, SH804, SH840, SR2107 and SR2115 from Dow Corning Toray Silicone Co., Ltd., YR3370, TSR1122, TSR102, TSR108, TSR116, TSR117, TSR125A, TSR127B, TSR144, TSR180, TSR187, YR47, YR3187, YR3224, YR3232, YR3270, YR3286, YR3340, YR3365, TEX152, TEX153, TEX171 and TEX172 from Toshiba Silicones), and reactive silicone compounds (specifically, addition reaction type, peroxide-curing type and ultraviolet radiation curing type, e.g., TSR1500, TSR1510, TSR1511, TSR1515, TSR1520, YR3286, YR3340, PSA6574, TPR6500, TPR6501, TPR6600, TPR6702, TPR6604, TPR6700, TPR6701, TPR6705, TPR6707, TPR6708, TPR6710, TPR6712, TPR6721, TPR6722, UV9300, UV9315, UV9425, UV9430, XS56-A2775, XS56-A2982, XS56-A3075, XS56-A3969, XS56-A5730, XS56-A8012, XS56-B1794, SL6100, SM3000, SM3030, SM3200 and YSR3022 from Toshiba Silicones).

Examples of fluorine compounds are fluorine oils (e.g., Daifluoryl #1, #3, #10, #20, #50, #100, Unidyne TG440, TG-452, TG-490, TG-560, TG-561, TG-590, TG-652, TG-670U, TG-991, TG-999, TG-3010, TG-3020 and TG-3510 from Daikin Industries, Ltd.; MF-100, MF-110, MF-120, MF-130, MF-160 and MF-160E from Torchem Products; S-111, S-112, S-113, S-121, S-131, S-132, S-141 and S-145 from Asahi Glass Co., Ltd.; and, FC-430 and FC-431 from DU PONT-MITSUI FLUOROCHEMICALS COMPANY,LTD), fluororubbers (e.g., LS63U from Dow Corning Toray Silicone Co., Ltd.), fluorine-modified resins (e.g., Modepa F220, F600, F2020, FF203, FF204 and F3035 from Nippon Oils and Fats; Diaroma FF203 and FF204 from Dai Nichi Pure Chemicals; Saflon S-381, S-383, S-393, SC-101, SC-105, KH-40 and SA-100 from Asahi Glass Co., Ltd.; E-351, EF-352, EF-801, EF-802, EF-601, TFEA, TFEMA and PDFOH from Torchem Products; and THV-200P from Sumitomo 3M), fluorine sulfonic acid compound (e.g., EF-101, EF-102, EF-103, EF-104, EF-105, EF-112, EF-121, EF-122A, EF-122B, EF-122C, EF-123A, EF-123B, EF-125M, EF-132, EF-135M, EF-305, FBSA, KFBS and LFBS from Torchem Products), fluorosulfonic acid, and fluorine acid compounds or salts (specifically, anhydrous fluoric acid, dilute fluoric acid, fluoroboric acid, zinc fluoroborate, nickel fluoroborate, tin fluoroborate, lead fluoroborate, copper fluoroborate, fluorosilicic acid, fluorinated potassium titanate, perfluorocaprylic acid and ammonium perfluorooctanoate), inorganic fluorides (specifically, aluminum fluoride, potassium fluoride, fluorinated potassium zirconate, fluorinated zinc tetrahydrate, calcium fluoride, lithium fluoride, barium fluoride, tin fluoride, potassium fluoride, acid potassium fluoride, magnesium fluoride, fluorinated titanic acid, fluorinated zirconic acid, ammonium hexafluorinated phosphoric acid and potassium hexafluorinated phosphoric acid).

The waxes include, but are not limited to, synthetic hydrocarbons, modified waxes, hydrogenated waxes, and naturally occurring waxes.

Examples of synthetic hydrocarbons are polyethylene waxes (e.g., Polylon A, 393 and H481 from Chukyo Oils and Fats, and Sanwax E-310, E-330, E-250P, LEL-250, LEL-800 and LEL400P from Sanyo Chemical Industries, Ltd. ), polypropylene waxes (e.g., Biscol 330-P, 550-P and 660-P from Sanyo Chemical Industries, Ltd. ), Fischertrops wax (e.g., FT100 and FT-0070 from Japan wax), and acid amide compounds or acid imide compounds (specifically, stearic acid amides and anhydrous phthalic imides such as Cellosol 920, B495, high micron G-270, G-110 and hydrin D-757 from Chukyo Oils and Fats).

Examples of modified waxes are amine-modified polypropylenes (e.g., QN-7700 from Sanyo Chemical Industries, Ltd.), acrylic acid-modified, fluorine-modified or olefin-modified waxes, urethane waxes (e.g., NPS-6010 and HAD-5090 from Japan Wax), and alcohol waxes (e.g., NPS-9210, NPS-9215, OX-1949 and XO-020T from Japan Wax).

Examples of hydrogenated waxes are castor oil (e.g., castor wax from Itoh Oil Chemicals Co., Ltd., castor oil derivatives (e.g., dehydrated castor oil DCO, DCO Z-1, DCO Z-3, castor oil fatty acid CO-FA, ricinoleic acid, dehydrated castor oil fatty acid DCO-FA, dehydrated castor oil fatty acid epoxy ester 4 ester, castor oil urethane acrylate CA-10, CA-20, CA-30, castor oil derivative MINERASOL S-74, S-80, S-203, S-42X, S-321, special castor oil condensation fatty acid MINERASOL RC-2, RC-17, RC-55, RC-335, special castor oil condensation fatty acid ester MINERASOL LB-601, LB-603, LB-604, LB-702, LB-703, #11 and L-164 from Itoh Oil Chemicals Co., Ltd.), stearic acid (e.g., 12-hydroxystearic acid from Itoh Oil Chemicals Co., Ltd.), lauric acid, myristic acid, palmitic acid, behenic acid, sebacic acid (e.g., sebacic acid from Itoh Oil Chemicals Co., Ltd.), undecylenic acid (e.g., undecylenic acid from Itoh Oil Chemicals Co., Ltd.), heptyl acids (heptyl acids from Itoh Oil Chemicals Co., Ltd.), maleic acid, high grade maleic oils (e.g., HIMALEIN DC-15, LN-10, 00-15, DF-20 and SF-20 from Itoh Oil Chemicals Co., Ltd.), blown oils (e.g., selbonol #10, #30, #60, R-40 and S-7 from Itoh Oil Chemicals Co., Ltd.) and synthetic waxes such as cyclopentadieneic oils (CP oil and CP oil-S from Itoh Oil Chemicals Co., Ltd.).

Preferred examples of the naturally occurring waxes are vegetable waxes, animal waxes, mineral waxes, and petroleum waxes, of which vegetable waxes are typically preferred. When an aqueous thermoplastic resin is used as the thermoplastic resin in the toner-image-receiving layer, water-dispersible waxes are specifically preferred for their higher miscibility with the aqueous thermoplastic resin.

Examples of vegetable waxes are carnauba waxes (e.g., EMUSTAR AR-0413 from Japan Wax, and Cellosol 524 from Chukyo Oils and Fats), castor oil (purified castor oil from Itoh Oil Chemicals Co., Ltd.), rape oil, soybean oil, Japan tallow, cotton wax, rice wax, sugarcane wax, candelilla wax, Japan wax and jojoba oil. Among them; carnauba waxes having a melting, point of 70° C. to 95° C. are preferred, since the resulting image-receiving sheet has excellent anti-offset properties and adhesion resistance, can pass through a machine smoothly, has good glossiness, invites less cracking and can form high-quality images.

The animal waxes include, but are not limited to, beeswaxes, lanolin, spermaceti waxes, whale oils, and wool waxes.

Examples of mineral waxes are natural waxes such as montan wax, montan ester wax, ozokerite and ceresin, or fatty acid esters (Sansosizer-DOA, AN-800, DINA, DIDA, DOZ, DOS, TOTM, TITM, E-PS, nE-PS, E-PO, E4030, E-6000, E-2000H, E-9000H, TCP and C-1100, New Japan Chemical Co., Ltd.). Among them, montan waxes having a melting point of 70° C. to 95° C. are preferred, since the resulting image-receiving sheet has excellent anti-offset properties and adhesion resistance, can pass through a machine smoothly, has good glossiness, invites less cracking and can form high-quality images.

Preferred examples of petroleum waxes may for example be a paraffin wax (e.g., Paraffin wax 155, 150, 140, 135, 130, 125, 120, 115, HNP-3, HNP-5, HNP-9, HNP-10, HNP-11, HNP-12, HNP-14G, SP-0160, SP-0145, SP-1040, SP-1035, SP-3040, SP-3035, NPS-8070, NPS-L-70, OX-2151, OX-2251, EMUSTAR-0384 and EMUSTAR-0136 from Japan Wax; Cellosol 686, 428, 651-A, A, H-803, B-460, E-172, 866, K-133, hydrin D-337 and E-139 from Chukyo Oils and Fats; 125 paraffin, 125° FD, 130° paraffin, 135° paraffin, 135° H, 140° paraffin, 14° N, 145° paraffin and paraffin wax M from Nisseki Mitsubishi Petroleum), or a microcrystalline wax (e.g., Hi-Mic-2095, Hi-Mic-3090, Hi-Mic-1080, Hi-Mic-1070, Hi-Mic-2065, Hi-Mic-1045, Hi-Mic-2045, EMUSTAR-0001 and EMUSTAR-042X from Japan Wax; Cellosol 967, M, from Chukyo Oils and Fats; 55 Microwax and 180 Microwax from Nisseki Mitsubishi Petroleum), and petrolatum (e.g., OX-1749, OX-0450, OX-0650B, OX-0153, OX-261BN, OX-0851, OX-0550, OX-0750B, JP-1500, JP-056R and JP-011P from Japan Wax).

The content of the naturally occurring wax in the toner-image-receiving layer (surface layer) is preferably from 0.1 $g/m^2$ to 4 $g/m^2$, and more preferably from 0.2 $g/m^2$ to 2 $g/m^2$.

If the content is less than 0.1 $g/m^2$, sufficient anti-offset properties and adhesion resistance may not be obtained. If it exceeds 4 $g/m^2$, the resulting images may decreased quality due to excessive wax.

To obtain satisfactory anti-offset properties and to allow the sheet to pass through a machine smoothly, the melting point of the naturally occurring wax is preferably from 70° C. to 95° C., and more preferably from 75° C. to 90° C.

The matting agents include various conventional matting agents. Solid particles for use in the matting agents can be classified as inorganic particles (inorganic matting agents) and organic particles (organic matting agents).

Specifically, inorganic matting agents may be oxides (for example, silicon dioxide, titanium oxide, magnesium oxide, aluminum oxide), alkaline earth metal salts (for example, barium sulfate, calcium carbonate, magnesium sulfate), silver halides (for example, silver chloride or silver bromide), and glass.

Examples of inorganic matting agents are given for example in West German Patent No. 2529321, UK Patents Nos. 760775, 1260772, and U.S. Pat. Nos. 1,201,905, 2,192, 241, 3,053,662, 3,062,649, 3,257,206, 3,322,555, 3,353,958, 3,370,951, 3,411,907, 3,437,484, 3,523,022, 3,615,554, 3,635,714, 3,769,020, 4,021,245 and 4,029,504.

The above organic matting agent contains starch, cellulose ester (for example, cellulose-acetate propionate), cellulose ether (for example, ethyl cellulose) and a synthetic resin. It is preferred that the synthetic resin is insoluble or difficultly soluble. Examples of insoluble or difficultly soluble synthetic resins include poly(meth)acrylic esters, e.g., polyalkyl(meth)acrylate and polyalkoxyalkyl(meth)acrylate, polyglycidyl(meth)acrylate), poly(meth) acrylamide, polyvinyl esters (e.g., polyvinyl acetate), polyacrylonitrile, polyolefins (e.g., polyethylene), polystyrene, benzoguanamine resin, formaldehyde condensation polymer, epoxy resins, polyamides, polycarbonates, phenolic resins, polyvinyl carbazole and polyvinylidene chloride. Copolymers which combine the monomers used in the above polymers, may also be used.

In the case of the above copolymers, a small amount of hydrophilic repeating units may be included. Examples of monomers which form a hydrophilic repeating unit are acrylic acid, methacrylic acid, α,β-unsaturated dicarboxylic acid, hydroxyalkyl(meth)acrylate, sulfoalkyl (meth)acrylate and styrene sulfonic acid.

Examples of organic matting agents are for example given in UK Patent No. 1055713, U.S. Pat. Nos. 1,939,213, 2,221,873, 2,268,662, 2,322,037, 2,376,005, 2,391,181, 2,701,245, 2,992,101, 3,079,257, 3,262,782, 3,443,946, 3,516,832, 3,539,344, 3,591,379, 3,754,924 and 3,767,448, and JP-A Nos. 49-106821, 57-14835.

Also, two or more types of solid particles may be used in conjunction as matting agents. The average particle size of the solid particles may conveniently be, for example, 1 μm to 100 μm, but is preferably 4 μm to 30 μm. The usage amount of the solid particles may conveniently be 0.01 $g/m^2$ to 0.5 $g/m^2$, but is preferably 0.02 $g/m^2$ to 0.3 $g/m^2$.

The releasing agents for use in the toner-image-receiving layer can also be derivatives, oxides, purified products, and mixtures of the aforementioned substances. These releasing agents may each have a reactive substituent.

To obtain satisfactory anti-offset properties and to allow the sheet to pass through a machine smoothly, the melting point of the releasing agent is preferably from 70° C. to 95° C., and more preferably from 75° C. to 90° C.

When an aqueous thermoplastic resin is used as the thermoplastic resin in the toner-image-receiving layer, water-dispersible releasing agents are specifically preferred for higher miscibility with the aqueous thermoplastic resin.

The content of the releasing agent in the toner-image-receiving layer is preferably from 0.1% by mass to 10% by mass, more preferably from 0.3% by mass to 8.0% by mass, and further preferably from 0.5% by mass to 5.0% by mass.

Examples of colorants are optical whitening agents, white pigments, colored pigments and dyes.

The above optical whitening agent has absorption in the near-ultraviolet region, and is a compound which emits fluorescence at from 400 nm to 500 nm. The various optical whitening agents known in the art may be used without any particular limitation. As this optical whitening agent, the compounds described in "The Chemistry of Synthetic Dyes" Volume V, Chapter 8 edited by KVeenRataraman can conveniently be mentioned. Specific examples are stilbene compounds, coumarin compounds, biphenyl compounds, benzo-oxazoline compounds, naphthalimide compounds, pyrazoline compounds and carbostyryl compounds. Examples of these are white furfar-PSN, PHR, HCS, PCS, B from Sumitomo Chemicals, and UVITEX-OB from Ciba-Geigy.

Examples of white pigments are the inorganic pigments (e.g., titanium oxide, calcium carbonate, etc.).

Examples of organic pigments are various pigments and azo pigments described in JP-A No. 63-44653, (e.g., azo lakes such as carmine 6B and red 2B, insoluble azo compounds such as mono-azo yellow, pyrazolo orange and Balkan orange, and condensed azo compounds such as chromophthal yellow and chromophthal red), polycyclic pigments (e.g., phthalocyanines such as copper phthalocyanine blue and copper phthalocyanine green), thioxadines such as thioxadine violet, isoindolinones such as isoindolinone yellow, surenes such as perylene, perinon, hulavanthoron and thioindigo, lake pigments (e.g., Malachite Green, Rhodamine B, Rhodamine G and Victoria Blue B), and inorganic pigments (e.g., oxides, titanium dioxide and red ocher, sulfates such as precipitated barium sulfate, carbonates such as precipitated calcium carbonates, silicates such as water-containing silicates and anhydrous silicates, metal powders such as aluminum powder, bronze powder and zinc dust, carbon black, chrome yellow and Berlin blue).

One of these may be used alone, or two or more may be used in conjunction. Of these, titanium oxide is particularly preferred as the pigment.

There is no particular limitation on the form of the pigment, but hollow particles are preferred from the viewpoint that they have excellent heat conduction properties (low heat conduction properties) during image fixing.

The various dyes known in the art may be used as the above dye.

Examples of oil-soluble dyes are anthraquinone compounds and azo compounds.

Examples of water-insoluble dyes are vat dyes such as C.I.Vat violet 1, C.I.Vat violet 2, C.I.Vat violet 9, C.I.Vat violet 13, C.I.Vat violet 21, C.I.Vat blue 1, C.I.Vat blue 3, C.I.Vat blue 4, C.I.Vat blue 6, C.I.Vat blue 14, C.I.Vat blue 20 and C.I.Vat blue 35, disperse dyes such as C.I. disperse violet 1, C.I. disperse violet 4, C.I. disperse violet 10, C.I. disperse blue 3, C.I. disperse blue 7 and C.I. disperse blue 58, and oil-soluble dyes such as C. I. solvent violet 13, C.I. solvent violet 14, C.I. solvent violet 21, C.I. solvent violet 27, C.I. solvent blue 11, C.I. solvent blue 12, C.I. solvent blue 25 and C.I. solvent blue 55.

Colored couplers used in silver halide photography may also be used to advantage.

The amount of colorant in the above toner-image-receiving layer (surface) is preferably 0.1 $g/m^2$ to 8 $g/m^2$, but more preferably 0.5 $g/m^2$ to 5 $g/m^2$.

If the amount of colorant is less than 0.1 $g/m^2$, the light transmittance in the toner-image-receiving layer is high, and if the amount of the above colorant exceeds 8 $g/m^2$, handling becomes more difficult due to cracks, and adhesion resistance.

Among these coloring agents, the amount of the pigment is preferably less than 40% by mass, more preferably less than 30% by mass, and further preferably less than 20% by mass based on the mass of the thermoplastic resin constituting the toner-image-receiving layer.

The filler may be an organic or inorganic filler, and reinforcers for binder resins, bulking agents and reinforcements known in the art may be used.

This filler may be selected by referring to "Handbook of Rubber and Plastics Additives" (ed. Rubber Digest Co.), "Plastics Blending Agents—Basics and Applications" (New Edition) (Taisei Co.) and "The Filler Handbook" (Taisei Co.).

As the filler, various inorganic fillers (or pigments) can be used. Examples of inorganic pigments are silica, alumina, titanium dioxide, zinc oxide, zirconium oxide, micaceous iron oxide, white lead, lead oxide, cobalt oxide, strontium chromate, molybdenum pigments, smectite, magnesium oxide, calcium oxide, calcium carbonate and mullite. Silica and alumina are particularly preferred. One of these fillers may be used alone, or two or more may be used in conjunction. It is preferred that the filler has a small particle diameter. If the particle diameter is large, the surface of the toner-image-receiving layer tends to become rough.

Silica includes spherical silica and amorphous silica. The silica may be synthesized by the dry process, wet process or aerogel process. The surface of the hydrophobic silica particles may also be treated by trimethylsilyl groups or silicone. Colloidal silica is preferred. The average mean particle diameter of the silica is preferably 4 nm to 120 nm, but more preferably 4 nm to 90 nm.

The silica is preferably porous. The average pore size of porous silica is preferably 50 nm to 500 nm. Also, the average pore volume per mass of porous silica is preferably 0.5 ml/g to 3 ml/g, for example.

Alumina includes anhydrous alumina and hydrated alumina. Examples of crystallized anhydrous aluminas which may be used are $\alpha$, $\beta$, $\gamma$, $\delta$, $\xi$, $\eta$, $\theta$, $\kappa$, $\rho$ or $\chi$. Hydrated alumina is preferred to anhydrous alumina. The hydrated alumina may be a monohydrate or trihydrate. Monohydrates include pseudo-boehmite, boehmite and diaspore. Trihydrates include gypsite and bayerite. The average particle diameter of alumina is preferably 4 nm to 300 nm, but more preferably 4 nm to 200 nm. Porous alumina is preferred. The average pore size of porous alumina is preferably 50 nm to 500 nm. The average pore volume per mass of porous alumina is of the order of 0.3 ml/g to 3 ml/g.

The alumina hydrate can be synthesized by the sol-gel process wherein ammonia is added to an aluminum salt solution to precipitate alumina, or by hydrolysis of an alkali aluminate. Anhydrous alumina can be obtained by dehydrating alumina hydrate by the action of heat.

It is preferred that the filler is 5 parts by mass to 2000 parts by mass, relative to the dry mass of the binder in the toner image-receiving layer where the filler is to be added.

A crosslinking agent can be added in order to adjust the storage stability or thermoplastic properties of the toner-image-receiving layer. Examples of this crosslinking agent are compounds containing two or more reactive groups in the molecule such as epoxy, isocyanate, aldehyde, active halogen, active methylene, acetylene and other reactive groups known in the art.

The crosslinking agent may also be a compound having two or more groups able to form bonds such as hydrogen bonds, ionic bonds or coordination bonds.

The crosslinking agent may be a compound known in the art such as a resin coupling agent, curing agent, polymerizing agent, polymerization promoter, coagulant, film-forming agent or film-forming assistant. Examples of coupling agents are chlorosilanes, vinylsilanes, epoxisilanes, aminosilanes, alkoxyaluminum chelates, titanate coupling agents or other agents known in the art such as those mentioned in "Handbook of Rubber and Plastics Additives" (ed. Rubber Digest Co.).

The charge control agents can be used for controlling transfer and attachment of the toner, and for preventing adhesion of the image-receiving sheet due to charging.

The charge control agent may be any charge control agent known in the art, i.e., surfactants such as cationic surfactants, anionic surfactants, amphoteric surfactants, non-ionic surfactants, and polymer electrolytes or electroconducting metal oxides.

Examples of the surfactants are cationic charge inhibitors such as quarternary ammonium salts, polyamine derivatives, cation-modified polymethylmethacrylate, cation-modified polystyrene, anionic charge inhibitors such as alkyl phosphates and anionic polymers, or non-ionic charge inhibitors such as polyethylene oxide. When the toner has a negative charge, cationic charge inhibitors and non-ionic charge inhibitors are preferred.

Examples of electroconducting metal oxides are ZnO, $TiO_2$, $SnO_2$, $Al_2O_3$, $In_2O_3$, MgO, BaO and $MoO_3$. These electroconducting metal oxides may be used alone, or they may be used in the form of a complex oxide.

Also, the electroconducting metal oxide may contain other elements, for example ZnO may contain Al or In, $TiO_2$ may contain Nb or Ta, and $SnO_2$ may contain Sb, Nb or halogen elements (doping).

The materials used to obtain the toner-image-receiving layer of the present invention may also contain various additives to improve stability of the output image or improve stability of the toner-image-receiving layer itself. Examples of additives are antioxidants, age resistors, degradation inhibitors, anti-ozone degradation inhibitors, ultraviolet light absorbers, metal complexes, light stabilizers or preservatives.

Examples of antioxidants are chroman compounds, coumarane compounds, phenol compounds (e.g., hindered phenols), hydroquinone derivatives, hindered amine derivatives and spiroindan compounds. Antioxidants are given for example in JP-A No. 61-159644.

Examples of age resistors are given in "Handbook of Rubber and Plastics Additives" Second Edition (1993, Rubber Digest Co.), p76–121.

Examples of ultraviolet light absorbers are benzotriazo compounds (U.S. Pat. No. 3,533,794), 4-thiazolidone compounds (U.S. Pat. No. 3,352,681), benzophenone compounds (JP-A No. 46-2784) and ultaviolet light absorbing polymers (JP-A No. 62-260152).

Examples of metal complexes are given in U.S. Pat. Nos. 4,241,155, 4,245,018, 4,254,195, and JP-A Nos. 61-88256, 62-174741, 63-199248, 01-75568, 01-74272.

Photographic additives known in the art may also be added to the material used to obtain the toner-image-receiving layer as described above. Examples of photographic additives are given in the Journal of Research Disclosure (hereafter referred to as RD) No. 17643 (December 1978), No. 18716 (November 1979) and No. 307105 (November 1989), the relevant sections being summarised below.

|  | Type of additive | | |
| --- | --- | --- | --- |
|  | RD17643 | RD18716 | RD307105 |
| 1. Whitener | p24 | p648, right-hand column | p868 |
| 2. Stabilizer | pp. 24–25 | p649, right-hand column | pp. 868–870 |
| 3. Light absorbers (ultraviolet ray absorbers) | pp. 25–26 | p649, right-hand column | p873 |
| 4. Pigment image stabilizers | p25 | p650, right-hand column | p872 |
| 5. Film-hardening agents | p26 | p651, left-hand column | pp. 874–875 |
| 6. Binders | p26 | p651, left-hand column | pp. 873–874 |
| 7. Plasticizers, lubricants | p27 | p650, right-hand column | p876 |
| 8. Coating assistants (surfactants) | pp. 26–27 | p650, right-hand column | pp. 875–876 |
| 9. Antistatic agents | p27 | p650, right-hand column | pp. 867–877 |
| 10. Matting agents |  |  | pp. 878–879 |

[Physical Properties of Toner-image-receiving Layer]

The 180-degree peel strength of the toner-image-receiving layer with a fixing member is preferably 0.1 N/25-mm or less, and more preferably 0.041 N/25-mm or less at an image-fixing temperature. The 180-degree peel strength can be determined according to a process specified in JIS K 6887 using a surface material of the fixing member.

It is preferred that the toner-image-receiving layer has a high degree of whiteness. This whiteness is measured by the process specified in JIS P 8123, and is preferably 85% or more. It is preferred that the spectral reflectance is 85% or more in the wavelength region of from 440 nm to 640 nm, and that the difference between the maximum spectral reflectance and minimum spectral reflectance in this wavelength range is within 5%. Further, it is preferred that the spectral reflectance is 85% or more in the wavelength region of from 400 nm to 700 nm, and that the difference between the maximum spectral reflectance and minimum spectral reflectance in this wavelength range is within 5%.

Specifically, regarding the whiteness, the L* value is preferably 80 or higher, preferably 85 or higher and still more preferably 90 or higher in a CIE 1976 (L*a*b*) color space. The tone of the white color should preferably be as neutral as possible. Regarding the whiteness tone, the value of $(a^*)^2+(b^*)^2$ is preferably 50 or less, more preferably 18 or less and still more preferably 5 or less in a (L*a*b*) space.

It is preferred that the toner-image-receiving layer has high gloss. The gloss is 45, preferably 60 or higher, more preferably 75 or higher and still more preferably 90 or higher over the whole range from white where there is no toner, to black where there is maximum density.

However, the gloss is preferably less than 110. If it exceeds 110, the image has a metallic appearance which is undesirable.

Gloss may be measured based on JIS Z 8741.

It is preferred that the toner-image-receiving layer has a high smoothness. The arithmetic mean roughness (Ra) is preferably 3 μm or less, more preferably 1 μm or less and still more preferably 0.5 μm or less over the whole range from white where there is no toner, to black where there is maximum density.

Arithmetic mean roughness may be measured based on JIS B 0601, JIS B 0651 and JIS B 0652.

It is preferred that the toner-image-receiving layer has one of the following physical properties, more preferred that it has several of the following physical properties, and most preferred that it has all of the following physical properties.

(1) The melting temperature Tm of the toner-image-receiving layer is preferably 30° C. or higher and [(Tm of the toner)+20° C.] or lower.

(2) The temperature at which the viscosity of the toner-image-receiving layer is $1\times10^5$ cp is 40° C. or higher and lower than that of the toner.

(3) The storage modulus G' of the toner-image-receiving layer is preferably from $1\times10^2$ Pa to $1\times10^5$ Pa and the loss modulus G") thereof is preferably from $1\times10^2$ Pa to $1\times10^5$ Pa at an image-fixing temperature.

(4) The loss tangent G"/G' as the ratio of the loss modulus G" to the storage modulus G' of the toner-image-receiving layer at an image-fixing temperature is preferably from 0.01 to 10.

(5) The storage modulus G' of the toner-image-receiving layer at an image-fixing temperature preferably falls in a range of −50 to +2500 of the storage modulus G" of the toner at the image-fixing temperature.

(6) A melted toner forms an inclination with the toner-image-receiving layer of preferably 50 degrees or less and more preferably 40 degrees or less.

The toner-image-receiving layer preferably also satisfies the physical properties given in Japanese Patent No. 2788358, and JP-A Nos. 07-248637, 08-305067 and 10-239889.

It is preferred that the surface electrical resistance of the toner-image-receiving layer is within the range of $1\times10^6$ $\Omega/cm^2$ to $1\times10^{15}$ $\Omega/cm^2$ (under conditions of 25° C., 65% RH)

If the surface electrical resistance is less than $1\times10^6$ $\Omega/cm^2$, the toner amount transferred to the toner-image-receiving layer is insufficient, and the density of the toner image obtained may be too low. On the other hand, if the surface electrical resistance exceeds $1\times10^{15}$ $\Omega/cm^2$, more charge than necessary is produced during transfer, toner is transferred insufficiently, image density is low and static electricity develops causing dust to adhere during handling of the image-receiving sheet for electrophotography, or misfeed, overfeed, discharge marks or toner transfer dropout may occur.

Also, the surface electrical resistance of the surface on the opposite side of the carrier to the toner-image-receiving layer is preferably $5\times10^8$ $\Omega/cm^2$ to $3.2\times10^{10}$ $\Omega/cm^2$, and more preferably $1\times10^9$ $\Omega/cm^2$ to $1\times10^{10}$ $\Omega/cm^2$ The above surface electrical resistances were measured based on JIS K 6911. The sample was left with air-conditioning for 8 hours or more at a temperature of 20° C. and humidity 65%. Measurements were made using an Advantest Ltd. R8340 under the same environmental conditions after passing a current for 1 minute at an applied voltage of 100V.

[Additional Layers]

Other layers may for example include a surface protective layer, back layer, interlayer, contact improving layer, undercoat layer, cushioning layer, charge-control or antistatic layer, reflective layer, color-control layer, storage-stability improving layer, adhesion prevention layer, anticurling layer, and smoothing layer. These layers may be used alone, or two or more may be used in combination.

The surface protective layer may be arranged on the surface of the toner-image-receiving layer in order to protect the surface, to improve the storage stability, to improve the handleability, to impart writability to the sheet, to enable the sheet to pass through an apparatus more smoothly, and/or to impart anti-offset properties to the sheet. The surface protective layer can be a single layer or a multilayer. The surface protective layer may comprise, as a binder, any of thermoplastic resins, thermosetting resins, and water-soluble polymers and preferably comprises a resin or polymer of the same type with that in the toner-image-receiving layer. The thermodynamic properties, electrostatic properties, and other properties of the surface protective layer are not necessary to be the same with those of the toner-image-receiving layer and can be optimized, respectively.

The surface protective layer may comprise any of additives which can be used in the toner-image-receiving layer. In particular, the surface protective layer preferably comprises, in addition to the releasing agent, other additives such as a matting agent. Such matting agents can be those conventionally used.

The outermost surface (e.g., the surface protective layer, if any) of the electrophotographic image-receiving sheet is preferably satisfactorily miscible or compatible with the toner for better image-fixing properties. More specifically, the contact angle between the outermost surface and a fused toner is preferably 40 degrees or less and 0 degree or more.

The back layer is arranged on the back side (an opposite side to the toner-image-receiving layer) of the electrophotographic image-receiving sheet in order to enable the back side to receive images, to improve the quality of the images formed on the back side, to improve curling balance, and/or to enable the sheet to pass through an apparatus more smoothly.

The color of the back layer is not specifically limited. When the electrophotographic image-receiving sheet is an image receiving sheet capable of receiving images on both sides, the back layer is preferably white. The back layer preferably has whiteness and spectroscopic reflectance of 85% or more as in the front side (the toner-image-receiving layer side).

The back layer may have the same configuration as the toner-image-receiving layer in order to enable the both sides to receive or form images more satisfactorily. The back layer may further comprise the aforementioned additives, of which matting agents, and charge control agents are preferably used. The back layer can be a single layer or a multilayer.

When a releasing oil is used in a fixing roller and other members to prevent offset during image-fixing, the back layer is preferably capable of absorbing oils.

The adhesion improving layer is preferably arranged in the electrophotographic image-receiving sheet to improve adhesion between the support and the toner-image-receiving layer. The adhesion improving layer may comprise any of the aforementioned additives, of which crosslinking agents are preferably used. The electrophotographic image-receiving sheet may have a cushioning layer between the adhesion improving layer and the toner-image-receiving layer to enable the sheet to receive the toner more satisfactorily.

The interlayer may be arranged, for example, between the support and adhesion improving layer, between the adhesion improving layer and the cushioning layer, between the cushioning layer and the toner-image-receiving layer, and/or between the toner-image-receiving layer and the storage stability improving layer. When the electrophotographic image-receiving sheet comprises the support, the toner-image-receiving layer, and the interlayer, the interlayer can be arranged, for example, between the support and the toner-image-receiving layer.

[Physical Properties of the Electrophotographic Image-receiving Sheet]

The electrophotographic image-receiving sheet has a weight of, for example, 100 g/m$^2$ or more and preferably from 200 g/m$^2$ to 250 g/m$^2$, and a thickness of, for example, 100 μm or more, preferably 150 μm or more, and more preferably from 190 μm to 250 μm.

If the weight of the electrophotographic image-receiving sheet is less than 100 g/m$^2$, a satisfactory texture on hand as a photographic print may not be obtained.

If the thickness of the electrophotographic image-receiving sheet is less than 100 μm, a satisfactory texture on hand as a photographic print may not be obtained.

The electrophotographic image-receiving sheet has a rate of hygroscopic swelling of preferably 1% or less, and more preferably 0.2% or less.

The rate of hygroscopic swelling can be determined by measuring the length of the sheet when stored at humidity of 85% and that when stored at humidity of 50%, and comparing the both lengths.

<Postprocessing Process>

The postprocessing process in the image forming process for the color electrophotographic print according to the present invention is for smoothing and glossing toner images formed on the electrophotographic image-receiving sheet.

The image-fixing and glossing process in the image forming process is for fixing a toner image on the electrophotographic image-receiving sheet, and smoothing and glossing the fixed toner image.

In a first embodiment of the image-fixing and glossing process, a toner image is formed on the electrophotographic image-receiving sheet, and the toner image bearing surface of the electrophotographic image-receiving sheet is hot-pressed with a fixing belt and a fixing roller, is cooled, and is removed from the fixing belt.

In a second embodiment of the image-fixing and glossing process, a toner image is formed on the electrophotographic image-receiving sheet, is fixed (primarily fixed) with a heat roller, and the toner image bearing surface of the electrophotographic image-receiving sheet is hot-pressed (secondarily fixed) with a fixing belt and a fixing roller, is cooled, and is removed from the fixing belt.

Hot-pressing is preferably performed in the postprocessing process and the image-fixing and glossing process. The procedure for hot-pressing is not specifically limited, may be selected according to the purpose but is preferably the application of a nip pressure. The nip pressure is preferably from 1 kgf/cm² to 100 kgf/cm², and more preferably from 5 kgf/cm² to 30 kgf/cm² for efficiently producing highly glossy images.

The belt member is not specifically limited, can be appropriately selected according to the purpose and is preferably a belt for use in a belt-fixing processing machine of cooling-releasing type. The belt-fixing processing machine of cooling-releasing type for use herein is not specifically limited, may be selected according to the purpose and is, for example, those shown in FIGS. 3 to 6. These machines have a cooling device for the belt member in the latter half part of the image-fixing procedure and can perform postprocessing of cooling and releasing type in which the temperature in the releasing procedure can be controlled at low. The cooling temperature in the cooling device is preferably from 20° C. to 80° C.

To perform the postprocessing or other process continuously and efficiently, the belt member is preferably an endless belt.

Examples of the belt fixing process are a process described in JP-A No. 11-352819 wherein an oilless type belt is used and a process described in JP-A No. 11-231671 and JP-A No. 05-341666 wherein the secondary image transfer and the fixing are performed at the same time. An example of electrophotographic apparatus using the fixing belt for use in the present invention is an electrophotographic apparatus having a toner image-fixing unit of belt type, which includes at least a hot-press unit, a fixing belt, and a cooling unit. The hot press unit is capable of fusing and pressurizing a toner. The fixing belt is capable of conveying an image-receiving material bearing the toner while being in contact with a toner-image-receiving layer. The cooling unit is capable of freely cooling the heated image-receiving material while being attached to the fixing belt. By using the electrophotographic image-receiving sheet having the toner-image-receiving layer in the electrophotographic apparatus having the fixing belt, the toner attached to the toner-image-receiving layer can be fixed at a precise position without broadening in the image-receiving sheet. In addition, the fused toner is cooled and solidified while being in intimate contact with the fixing belt, and the toner-image-receiving layer receives the toner while the toner is completely embedded therein. Accordingly, the resulting toner image has no step and is glossy and smooth.

The electrophotographic image-receiving sheet of the present invention is suitable for an image forming process of belt fixing type using an oilless belt, for significantly improve anti-offset properties. However, it can also be used other image forming process satisfactorily.

For example, by using the electrophotographic image-receiving sheet, a full color image can be satisfactorily formed while improving the image quality and avoiding cracking. The color image can be formed using an electrophotographic apparatus capable of forming full color images. A regular electrophotographic apparatus comprises a conveying section for an image-receiving sheet, a latent electrostatic image forming section, a development section arranged in the vicinity of the latent electrostatic image forming section, and an image-fixing section. Some of these apparatus further comprise an intermediate image transfer section at a center part thereof in the vicinity of the latent electrostatic image forming section and the conveying section.

For further improving the image quality, an adhesive transfer system or a heat-aided transfer system instead of, or in combination with, electrostatic transfer or bias roller transfer has been known. Specific configurations of these systems can be found in, for example, JP-A No. 63-113576 and JP-A No. 05-341666. A process using an intermediate image transfer belt according to the heat-aided transfer system is preferred. The intermediate image transfer belt can be, for example, an endless belt made of an electrocast nickel. The intermediate image transfer belt preferably has a cooling device in a portion after image transfer procedure or in a latter half of image transfer procedure of the toner to the electrophotographic image-receiving sheet. By action of the cooling device, the toner for electrophotography can be cooled to a temperature equal to or lower than [(the softening point or glass transition point of the binder used therein)+10° C.] and can be efficiently peeled off from the intermediate image transfer belt and transferred to the electrophotographic image-receiving sheet.

The fixing is an important step for the gloss and smoothness of the final image. For the fixing, a process wherein a hot-press roller is used and another process wherein a belt is used are known. From the viewpoints of the image qualities such as gloss and smoothness, the belt fixing process is preferred. Examples of the belt fixing process are a process described in JP-A No. 11-352819 wherein an oilless type belt is used and a process described in JP-A No. 11-231671 and JP-A No. 05-341666 wherein the secondary image transfer and the fixing are performed at the same time. Before hot pressing using a fixing belt and a fixing roller, primary fixing with a heat roller may be performed.

The surface of the fixing belt is preferably treated with a surface-treating agent containing silicon, fluorine or a combination of them for preventing the peeling of the toner or the offset of the toner component. In the latter half of the fixing process, a cooling device for the belt is preferably provided to facilitate the release of the electrophotographic image-receiving sheet. The cooling temperature is preferably equal to or lower than the softening point or equal to or lower than [(the glass transition point)+10° C.] of the toner binder and/or the polymer in the toner image-receiving layer of the electrophotographic image-receiving sheet. On the other hand, in early stages of the fixing, the temperature must be elevated to a point at which the toner image-receiving layer of the electrophotographic image-receiving sheet or the toner is sufficiently softened. The cooling temperature is practically preferably from 30° C. to 70° C., and the temperature in the early stages of the fixing is from 100° C. to 180° C.

Typical examples of image forming apparatus having a fixing belt of cooling-releasing type are image forming apparatus having configurations shown in FIGS. 3 to 6. Detailed descriptions of these apparatus can be found in, for example, JP-A No. 2001-75409, JP-A No. 04-344680, JP-A No. 04-199171, and JP-A No. 2000-56602.

The image forming apparatus having the fixing belt of cooling-releasing type according to the present invention are not limited to configurations shown in FIGS. 3 to 6.

Herein, it is convenient if the fixing belt used in the imaging apparatus is an endless belt formed from a material such as for example polyimide, electroplated nickel or aluminum.

It is preferred to form a thin film comprising at least one material selected from silicone rubber, fluorinated rubber, silicone resin or fluorinated resin on the surface of the fixing belt. Of these, it is preferred to provide a layer of fluorocarbon siloxane rubber of uniform thickness on the surface of the fixing belt, or provide a layer of silicone rubber of uniform thickness on the surface of the fixing belt and then provide a layer of fluorocarbon siloxane rubber on the surface of the silicone rubber.

It is preferred that the fluorocarbon siloxane rubber has a perfluoroalkyl ether group and/or a perfluoroalkyl group in the main chain.

As the fluorocarbon siloxane rubber, a curing material comprising a fluorocarbon siloxane rubber composition containing the components (A) to (D) below are preferred.

(A) a fluorocarbon polymer having a fluorocarbon siloxane of the following general formula 1 below as its main component, and containing aliphatic unsaturated groups, (B) an organopolysiloxane and/or fluorocarbon siloxane containing two or more ≡SiH groups in the molecule, and 1 to 4 times the molar amount of ≡SiH groups more than the amount of aliphatic unsaturated groups in the above fluorocarbon siloxane rubber; (C) a filler, and (D) an effective amount of catalyst.

The fluorocarbon polymer of component (A) comprises a fluorocarbon siloxane containing a repeating unit represented by the following general formula 1 as its main component, and contains aliphatic unsaturated groups.

In component (B), one example of the organopolysiloxane comprising ≡SiH groups is an organohydrogenpolysiloxane having at least two hydrogen atoms bonded to silicon atoms in the molecule.

In the fluorocarbon siloxane rubber composition, when the organocarbon polymer of component (A) comprises an aliphatic unsaturated group, the above organohydrogenpolysiloxane may be used as a curing agent. Specifically, in this case, the cured product is formed by an addition reaction between aliphatic unsaturated groups in the fluorocarbon siloxane, and hydrogen atoms bonded to silicon atoms in the organohydrogenpolysiloxane.

Examples of the organohydrogenpolysiloxanes are the various organohydrogenpolysiloxanes used in addition curing silicone rubber compositions.

It is generally preferred that the organohydrogenpolysiloxane is blended in such a proportion that the number of ≡SiH groups therein is at least one, and particularly 1 to 5, relative to one aliphatic unsaturated hydrocarbon group in the fluorocarbon siloxane of component (A).

It is preferred that in the fluorocarbon containing ≡SiH groups, one unit of Formula 1 or $R^{10}$ in Formula 1 is a dialkylhydrogensiloxane, the terminal group is a ≡SiH group

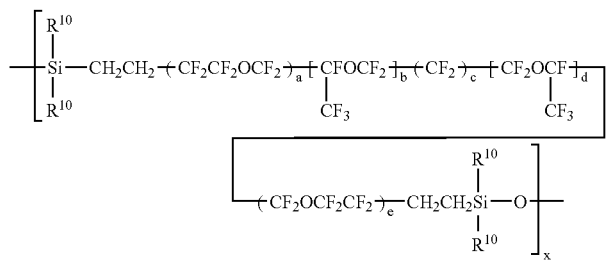

Formula 1

In the general formula 1, $R^{10}$ is an unsubstituted or substituted monovalent hydrocarbon group preferably having 1 to 8 carbon atoms. The monovalent hydrocarbon group is preferably an alkyl group having 1 to 8 carbon atoms or an alkenyl group having 2 or 3 carbon atoms, of which a methyl group is typically preferred. The repetition numbers a and e are each an integer of 0 or 1, b and d are each an integer of 1 to 4, c is an integer of 0 to 8, and x is an integer of 1 or more, and is preferably an integer of 10 to 30.

An example of the above component (A) is the substance shown by the following formula 2:

such as dialkylhydrogensiloxane or silyl, and it can be represented by the following formula 3.

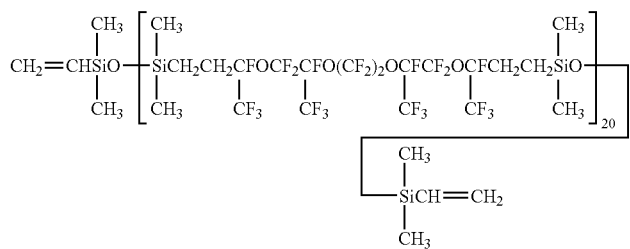

Formula 2

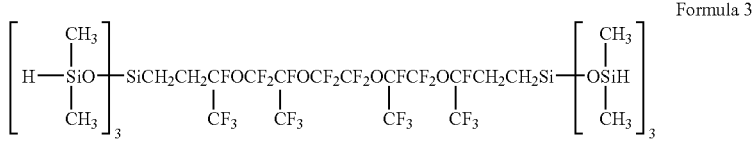

Formula 3

The filler which is component (C) may be various fillers used in ordinary silicone rubber compositions. Examples are reinforcing fillers such as for example mist silica, precipitated silica, carbon powder, titanium dioxide, aluminum oxide, quartz powder, talc, sericite and bentonite, or fiber fillers such as asbestos, glass fiber and organic fibers or the like.

Examples of the catalyst which is component (D) are chloroplatinic acid which is known in the art as an addition reaction catalyst, alcohol-modified chloroplatinic acid, complexes of chloroplatinic acid and olefins, platinum black or palladium supported on a carrier such as alumina, silica or carbon, and Group VIII elements of the Periodic Table or their compounds such as complexes of rhodium and olefins, chlorotris(triphenylphosphine) rhodium (Wilkinson catalyst) and rhodium (III) acetyl acetonate, and it is preferred to dissolve these complexes in an alcohol, ether or a hydrocarbon solvent.

Various blending agents may be added to the fluorocarbon siloxane rubber composition to the extent that they do not interfere with the purpose of the invention which is to improve solvent resistance. For example, dispersing agents such as diphenylsilane diol, low polymer chain end hydroxyl group-blocked dimethylpolysiloxane and hexamethyl disilazane, heat resistance improvers such as ferrous oxide, ferric oxide, cerium oxide and octyl acid iron, and colorants such as pigments or the like, may be added as necessary.

The belt member is obtained by covering the surface of a heat resistant resin or metal belt with the above fluorocarbon siloxane rubber composition, and heat curing it, but the composition may be diluted to form a coating solution with a solvent such as m-xylene hexafluoride or benzotrifluoride which is then applied by an ordinary coating process such as spin coating, dip coating or knife coating. The heat curing temperature and time can be conveniently selected, but the selection is generally made, according to the belt type and manufacturing process, within the ranges of 100° C. to 500° C. and 5 seconds to 5 hours.

The thickness of the fluorocarbonsiloxane rubber layer arranged on the surface of the belt member is not specifically limited, can be appropriately set depending on an intended purpose and is preferably from 20 µm to 500 µm, and more preferably from 40 µm to 200 µm.

To effectively yield an image-receiving sheet having high surface smoothness and satisfactory glossiness, the surface roughness [arithmetic average roughness Ra] of the belt member is preferably 20 µm or less, more preferably 5 µm or less, and further preferably 1 µm or less. The surface roughness Ra can be determined according to JIS B 0601, JIS B 0651, and JIS B 0652.

The process used for forming an image on the image-receiving sheet for electrophotography of the present invention is not specifically limited by the process described in FIGS. 3 to 6 provided that it is an electrophotographic process using a fixing belt. An ordinary electrophotography may be applied.

For example, a color image may conveniently be formed on the image-receiving sheet for electrophotography of the present invention. A color image can be formed using an electrophotographic apparatus which permits a full color image to be formed. An ordinary electrophotographic apparatus comprises an image-receiving sheet transport part, latent image-forming part, and developing part disposed in the vicinity of the latent image forming part. Depending on the type, it may also comprise a latent image-forming part in the center of the apparatus, and a toner image intermediate transfer part in the vicinity of the image-receiving sheet transport part.

To improve image quality, adhesive transfer or heat assistance transfer processes may be used instead of electrostatic transfer or bias roller transfer, or in conjunction therewith. The detailed construction is described for example in JP-A Nos. 63-113576 and 05-341666. The intermediate transfer belt in the heat assistance transfer process is particularly preferred when small particle diameter toner is used.

<Image Forming Apparatus>

The image forming apparatus of the present invention is an image forming apparatus for performing the image forming process for a color electrophotographic print of the present invention and comprises a charging device for billing users by the usage.

The image forming apparatus preferably further comprises digital image processing and output control means, rendering and developing means, toner image-fixing means, and postprocessing means, and may further comprise other means according to necessity.

The digital image processing and output control means captures digital image data and subjects the digital image data to image processing and image output control to thereby form a digital image.

The rendering and developing means renders and develops a toner image from the digital image using color toners of four or more colors including at least a yellow (Y) toner, a magenta (M) toner, a cyan (C) toner, and a black (K) toner, each of the toners having an average particle diameter of 7 µm or less and an average of shape factors represented by the following equation of from 1 to 1.5;

Shape factor=$(\pi \times L^2)/(4 \times S)$ wherein L is a maximum length of a toner particle; and S is a projection area of the toner particle.

The toner image-fixing means fixes the toner image on an electrophotographic image-receiving sheet to thereby form a toner image, which electrophotographic image-receiving sheet comprises a support and a toner-image-receiving layer comprising at least a thermoplastic resin and being arranged on the support.

The postprocessing means smoothes and glosses the toner image formed on the electrophotographic image-receiving sheet.

Each of these means is the same as in the image forming process, and detailed descriptions thereof will be omitted.

The charging device can be, for example, a "coin kit" or a bill receiving machine.

The image forming apparatus is preferably configured so that it is capable of connecting to and communicating with a mobile data terminal.

FIG. 2 is a schematic diagram of a tandem color copying machine (image forming apparatus) 1 according to the present embodiment. The copying machine 1 comprises a main body 100 and an image reader (document read means) 102. The main body 100 includes an image output section and a second image-fixing device (second image-fixing means) 101 inside thereof. The image output section comprises a first image-fixing device (first image-fixing means) 15 and an image forming unit (image forming means).

The image forming unit comprises an endless intermediate image transfer belt 9 which is spanned over plural tension rollers and is rotated, electrophotographic image forming units 1Y, 1M, 1C, and 1K, a belt cleaner 14 facing the intermediate image transfer belt 9, a secondary image transfer roller 12 facing the intermediate image transfer belt 9, sheet tray 17 for housing sheets of plain paper (recording sheets) 18(S) and sheets of dedicated glossy paper (recording sheets) 18(P) separately, pickup rollers 17a, pairs of conveyor rollers 19 and 24, a pair of resist rollers 20, a pair of first ejection rollers 22, a first paper output tray 25, a pair of second ejection rollers 27, and a second paper output tray 26. The electrophotographic image forming units 1Y, 1M, 1C, and 1K are arranged from upstream to downstream of a rotation direction of the intermediate image transfer belt 9 and serve to form yellow, magenta, cyan, and black color toner images, respectively.

Each of the electrophotographic image forming units 1Y, 1M, 1C, and 1K comprises, for example, a photoconductive drum 2, an electrostatic charger roller, a development device 5, a primary image transfer roller 6, a drum cleaner 7, and a charge eliminating roller 8.

Figure 7:
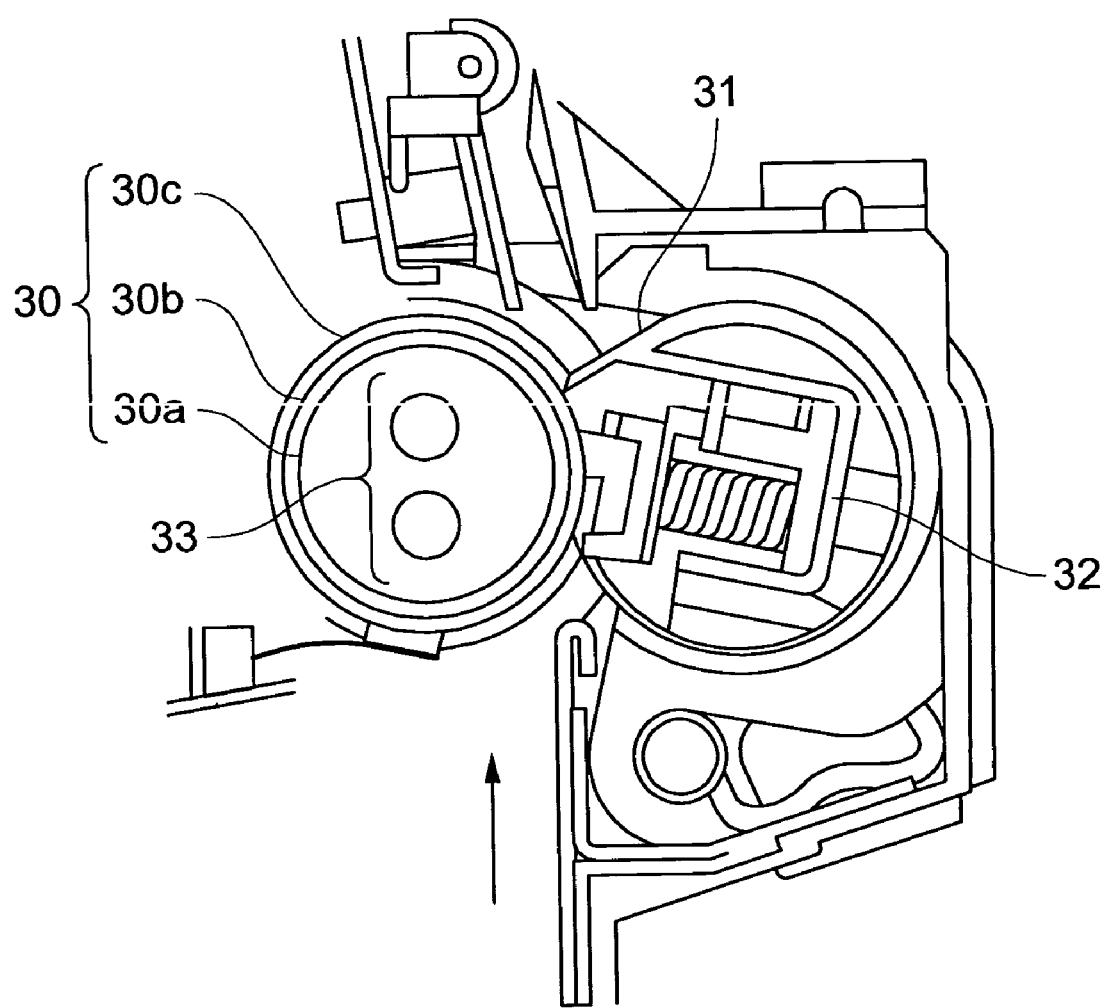
FIG. 7 is a schematic sectional view of a first image-fixing device in the image forming apparatus of FIG. 2.

FIG. 7 illustrates a configuration of the first image-fixing device 15. The first image-fixing device 15 is an image-fixing device using a pressure belt and comprises, for example, a fixing roller 30 of low heat capacity, a pressure belt 31, and a pressure pad 32. The fixing roller 30 comprises a core 30a, an elastic layer 30b, and a releasing layer 30c. The core 30a is made of aluminum and has a thickness of 1.5 mm, an outer diameter of 25 mm, and a length of 380 mm. The elastic layer 30b is arranged on the surface of the core 30a, comprises a silicone rubber having a rubber hardness (JIS-A) of 33 degrees and has a thickness of 0.5 mm and a length of 320 mm. The releasing layer 30c is arranged on the surface of the elastic layer 30b and comprises a perfluoroalkoxyfluoro resin (PFA) tube having a thickness of 30 µm. A halogen lamp 33 of 650 W serving as a heat source is arranged inside the fixing roller 30 and serves to heat the fixing roller 30 from inside so as to have a predetermined surface temperature (e.g., 170° C.).

The pressure belt 31 comprises a polyimide belt having a thickness of 75 µm, an outer diameter of 30 mm, and a length of 330 mm, and a releasing layer arranged on the polyimide belt and comprising a PFA tube having a thickness of 30 µm. Inside the pressure belt 31 is arranged the pressure pad 32 for pressing the pressure belt 31 to the fixing roller 30 to thereby form a nip. The pressure pad 32 presses at a load of 33 kg with a nip width of 6.5 mm. The first image-fixing device 15 does not have a heat source in a portion including the pressure belt 31 and the pressure pad 32.

Figure 8:
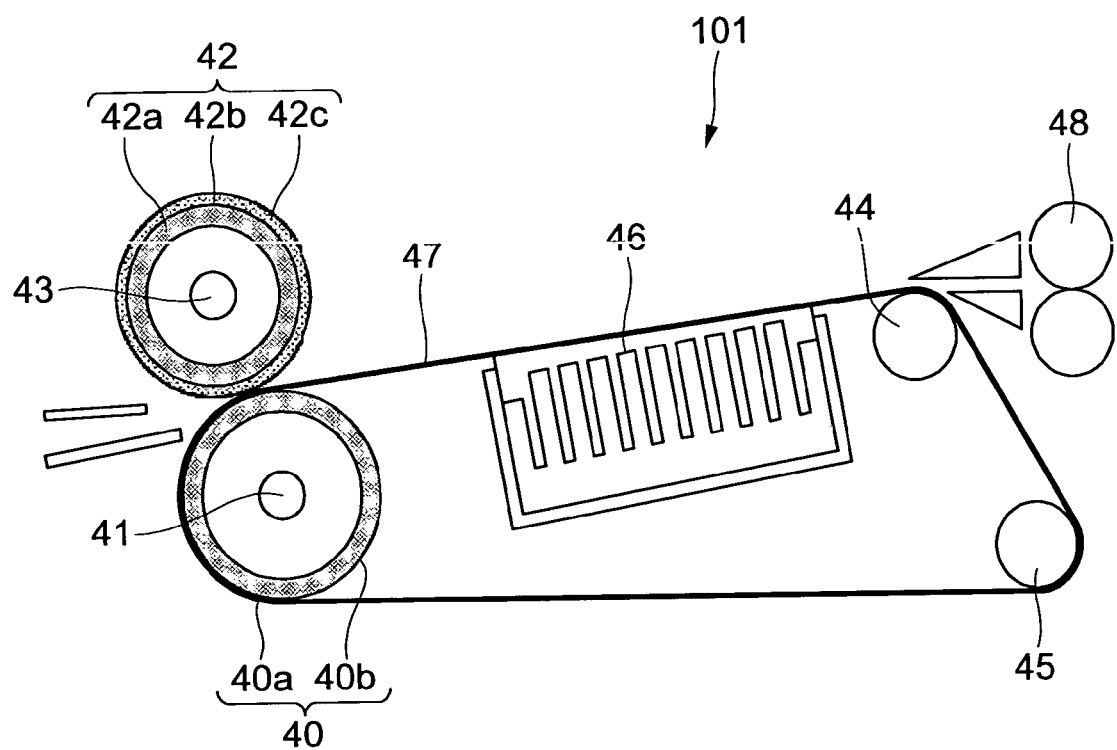
FIG. 8 is a schematic sectional view of a second image-fixing device in the image forming apparatus of FIG. 2.

FIG. 8 illustrates a configuration of the second image-fixing device 101. The second image-fixing device 101 is a belt fixing device which comprises a heating and fixing roller (heating roller) 40 having a heat source, a releasing roller (tension roller) 44, a steering roller (tension roller) 45, a fixing belt (endless belt) 47 spanned among the heating and fixing roller 40, the releasing roller 44, and the steering roller 45, a pressure roller 42 for pressing the heating and fixing roller 40 via the fixing belt 47 to thereby form a nip, and a cooling device (cooling unit) 46 arranged downstream the nip of the rotation direction of the fixing belt 47 and cools the fixing belt 47. A recording sheet 18 bearing a toner is conveyed to the nip so as to bring the toner image into contact with the fixing belt 47, is heated and fixed therein. The cooling device 46 then cools the fixing belt 47 and the recording sheet 18, and the recording sheet 18 is removed from the fixing belt 47.

The heating and fixing roller 40 comprises a core 40a and a releasing layer 40b arranged on the surface of the core 40a. The core 40a is made of a metal having high thermal conductivity. The releasing layer 40b is made of a fluorocarbon resin layer such as a PFA tube. A heat source 41 such as a halogen lamp is arranged inside the core 40a and serves to heat the heating and fixing roller 40 so as to have a predetermined surface temperature to thereby heat the fixing belt 47 and the recording sheet 18 bearing the toner image. The pressure roller 42 comprises a core 42a, an elastic layer 42b arranged around the core 42a, and a releasing layer 42c arranged on the surface of the elastic layer 42b. The core 42a is made of a metal having high thermal conductivity. The elastic layer 42b is made of, for example, a silicone rubber having a rubber hardness (JIS-A) of about 40 degrees. The releasing layer 42c is a fluorocarbon resin layer such as a PFA tube. A heat source 43 such as a halogen lamp is arranged inside the core 42a and serves to heat the pressure roller 42 so as to have a predetermined surface temperature. The pressure roller 42 thus serves to apply pressure to the recording sheet 18 during image-fixing procedure and to heat the recording sheet from its back side. The configurations of the heating and fixing roller 40 and the pressure roller 42 are not limited to those mentioned above, as long as a toner image formed on the recording sheet 18 can be fixed onto the recording sheet 18 by the aid of the fixing belt 47.

The releasing roller 44 serves to remove the recording sheet 18 from the fixing belt 47 by action of the rigidity of the recording sheet 18 itself. The outer shape (outer dimensions) of the releasing roller 44 is determined depending on the adhesion between the fixing belt 47 and the recording sheet 18, and the winding angle of the fixing belt 47 to the releasing roller 44. The steering roller 45 is for correcting and regulating any wandering of the fixing belt 47 caused by rotation of the fixing belt 47 and for avoiding damage of the edge of the belt due to wandering. This steering roller 45 is supported at one axial end thereof and can be tilted to a desired angle with respect to the heating and fixing roller 40. Thus, is the fixing belt 47 wanders, the steering roller serves to change the direction of the belt travel to an opposite direction.

The cooling device 46 serves to cool the fixing belt 47 and the recording sheet 18 in intimate contact with the fixing belt 47 and is arranged on an inner radius of the fixing belt 47 downstream from the heating and fixing roller 40 and upstream from the releasing roller 44. The cooling device 46 is capable of cooling a transparent resin layer 18a and the toner image on the surface of the recording sheet 18 fused by action of the heating and fixing roller 40 and the pressure roller 42 and of solidifying the entire surface of the image smoothly along the surface of the fixing belt 47.

The fixing belt 47 can be prepared, for example, in the following manner. A silicone rubber primer DY39-115 (trade name, available from Dow Corning Toray Silicone Co., Ltd., Japan) is applied to an endless film made of a thermosetting polyimide and is air-dried for 30 minutes. The resulting article is dipped in a coating liquid comprising 100 parts by mass of a silicone rubber precursor DY35-796AB (trade name, available from Dow Corning Toray Silicone Co., Ltd., Japan) and 30 parts by mass of n-hexane to thereby form a coated film, is subjected to primary curing at 120° C. for 10 minutes and thereby yield a silicone rubber layer 40 μm thick thereon.

The silicone rubber layer is then dipped in a coating liquid comprising 100 parts by mass of a fluorocarbon siloxane rubber precursor SIFEL 610 (trade name, available from Shin-Etsu Chemical Co., Ltd., Japan) and 20 parts by mass of a fluorine-containing solvent (a mixture of m-xylene hexafluoride, perfluoroalkanes, and perfluoro(2-butyltetrahydrofuran)) to form a coated film, is subjected to primary curing at 120° C. for 10 minutes and to secondary curing at 180° C. for 4 hours to yield a fluorocarbon siloxane rubber layer 20 μm thick thereon and thereby yields the fixing belt.

The second image-fixing device 101 is arranged below the image reader 102, above the image forming unit (e.g., at secondary image transfer position) and above the first image-fixing device 15. the second image-fixing device 101 is positioned directly above the image forming unit (e.g., the intermediate image transfer belt 9) and directly under the image reader 102. The entire conveying path for the recording sheet 18 extending from the first image-fixing device 15 to the second image-fixing device 101 is arranged directly above the image forming unit (e.g., the intermediate image transfer belt 9). A primary image-fixing line connecting between the secondary image transfer position and the primary image transfer position has a vertical component substantially vertical. A secondary image-fixing line connecting between the primary image-fixing position and the secondary image-fixing position has a vertical component less than a horizontal component thereof. The recording sheet 18 is ejected from the second image-fixing device 101 to an area directly above the image forming unit (e.g., the intermediate image transfer belt 9).

Figure 9:
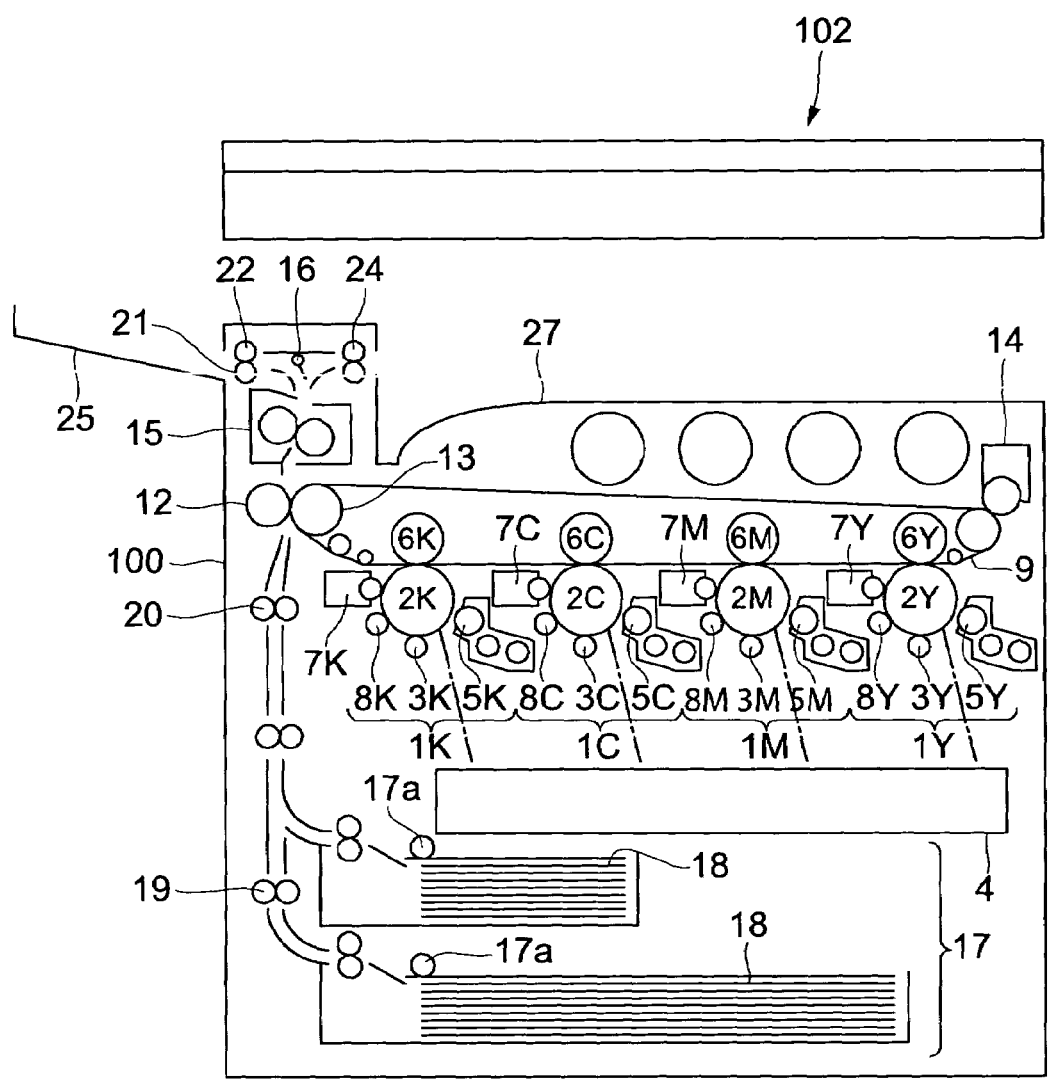
FIG. 9 is a schematic sectional view of a conventional image forming apparatus.

The configuration as above can yield the following advantages. Firstly, the entire apparatus 1 occupies as little space (in particular, as little footprint) as possible even though it comprises the second image-fixing device 101. Secondly, the recording sheet 18 is ejected at a relatively high position, and the apparatus can be operated easily. FIG. 9 shows a conventional color copying machine (comparative example) having almost the same configuration as the color copying machine 1 according to the present embodiment. The same components between the two machines have the same reference numerals, and descriptions thereof will be omitted. By comparing these two machines, the color copying machine 1 according to this embodiment has substantially the same size as the conventional color copying machine according to the comparative example.

Image forming operations in a regular pint mode (first image-fixing mode) and a highly glossy print mode (second image-fixing mode) of the color multi-function machine 1 will be illustrated, respectively.

Figure 10:
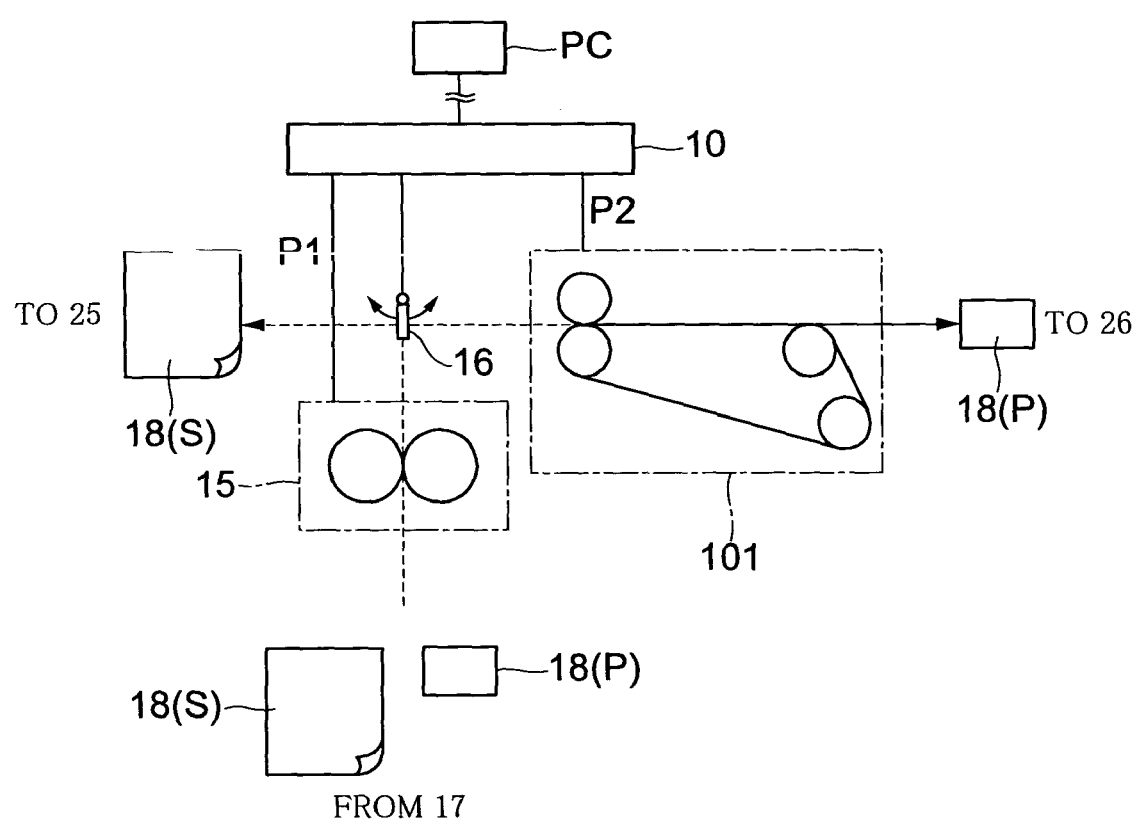
FIG. 10 is a block diagram of an example of a control system in an image forming apparatus according to an embodiment of the present invention.

FIG. 10 is a block diagram of a control system for controlling the print modes. The control system mainly comprises a control unit 10 of the color copying machine (color multiple function machine) 1 measures, for example, temperature signals form a personal computer PC connected to the color copying machine 1 or from a temperature sensor (not shown) of the first image-fixing device 15, and temperature signals from a temperature sensor (not shown) of the second image-fixing device 101. The control unit 10 controls, for example, control instruction signals of a conveying direction switching gate 16, a power P1 supplied to the heat source of the first image-fixing device 15, and a power P2 supplied to the heat source of the second image-fixing device 101.

—Regular Print Mode—

Initially, image output in the regular print mode will be described. For example, color image information from, for example, the personal computer PC or color image information of a color document read from the image reader 102 is inputted, and the inputted image information is subjected to image processing.

By taking the electrophotographic image forming unit 1Y as an example, the operation for a single color toner image to the intermediate image-transfer belt 9 will be illustrated. The photoconductive drum 2Y is negatively electrified uniformly on its surface by an electrostatic charger roller 3Y. An exposure device 4 applies light to the photoconductive drum 2Y imagewise with respect to a yellow image based on the processed image formation. Thus, a latent electrostatic image corresponding to the yellow image is formed on the surface of the photoconductive drum 2Y. The latent electrostatic image corresponding to the yellow image is developed into a yellow toner image by a development device 5Y. The yellow toner image is then transferred to the intermediate image-transfer belt 9 by action of the contact pressure from m a primary image-transfer roller 6 constituting a part of the primary image transfer means and by action of electrostatic attraction. A residual yellow toner on the photoconductive drum 2Y after transfer is scraped out by a drum cleaner 7Y. The charge on the surface of the photoconductive drum 2Y is eliminated by a charge eliminating roller 8Y and is then again electrified for another image forming cycle.

In the color copying machine 1 for multicolor image formation, the aforementioned image forming process is repeated in the electrophotographic image forming units 1M, 1C, and 1K at timings in consideration of relative registrations of the electrophotographic image forming units 1Y, 1M, 1C, and 1K, and thereby full color toner images are formed on the intermediate image transfer belt 9.

The full color images formed on the intermediate image transfer belt 9 are transferred at a predetermined timing onto the recording sheet 18 conveyed to the second image transfer position by action of pressing force and electrostatic attraction. The pressing force is generated between the backup roller 13 supporting the intermediate image transfer belt 9 and the secondary image transfer roller 12. The secondary image transfer roller 12 is in contact with the backup roller 13 by pressing and constitutes a part of the secondary image transfer means.

The recording sheet 18 of a predetermined size is fed from the sheet tray 17 by a feed roller 17a. The sheet tray 17 is arranged at the bottom of the color multiple function machine 1 and serves as a recording media holder. The fed recording sheet 18 is conveyed to the secondary image transfer position on the intermediate image transfer belt 9 at a predetermined timing by action of plural conveyer rollers 19 and resist rollers 20. Then, the full color toner images are transferred at a time from the intermediate image transfer belt 9 to the recording sheet 18 by the pickup roller 13 and the secondary image transfer roller 12 serving as the secondary image transfer means.

The recording sheet 18 bearing the transferred full color toner images is separated from the intermediate image transfer belt 9, is then conveyed to the first image-fixing device 15 arranged above the secondary image transfer means. The first image-fixing device 15 primarily fixes the toner images onto the recording sheet 18 by heat and pressure. The residual toners on the intermediate image transfer belt 9 which have not been transferred to the recording sheet 18 are conveyed as intact to the belt cleaner 14 and are removed from the intermediate image transfer belt 9 by action of the belt cleaner 14.

In the regular print mode, the control unit 10 controls the conveying direction switching gate 16 and switches the conveying direction toward a first recording medium output port 21. Thus, the recording sheet 18 bearing the full color images is ejected onto a regular print mode paper output tray 25 by action of an ejection roller 22 so that the image bearing surface is upside.

—Photo Print Mode—

The image output in the photo print mode (highly glossy print mode) will be illustrated focussing differences from the regular print mode. Input of the image information, image processing, and the formation of full color toner images on the intermediate image transfer belt 9 are performed as in the regular print mode. In the photo print mode, the dedicated glossy paper 18(P) of a predetermined size as the recording sheet 18 is fed from the sheet tray 17 by action of the feed roller 17*a*. The dedicated glossy paper 18(P) comprises a paper support 18*b* and a transparent image-receiving layer (transparent resin layers) 18*a* arranged on one side (front side) of the paper support. The image-receiving layer 18*a* mainly comprises a thermoplastic resin such as a polyester and has a thickness of from 5 μm to 20 μm. In this embodiment, the thickness of the image-receiving layer 18*a* is about 10 μm.

Onto the fed recording sheet 18, the full color toner images are secondarily transferred at a time and are primarily fixed. In the photo print mode, the control unit 10 controls the conveying direction switching gate 16 and switches the conveying direction toward the secondary image-fixing device 101. Thus, the recording sheet 18 bearing the full color toner images is conveyed to the secondary image-fixing device 101 by the conveying roller 24 (FIG. 10).

Figure 11:
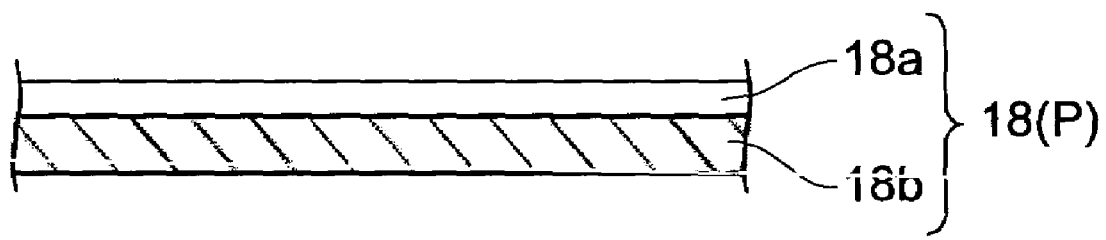
FIG. 11 is a schematic sectional view of a dedicated glossy paper for use in a glossy print mode.
Figure 12:
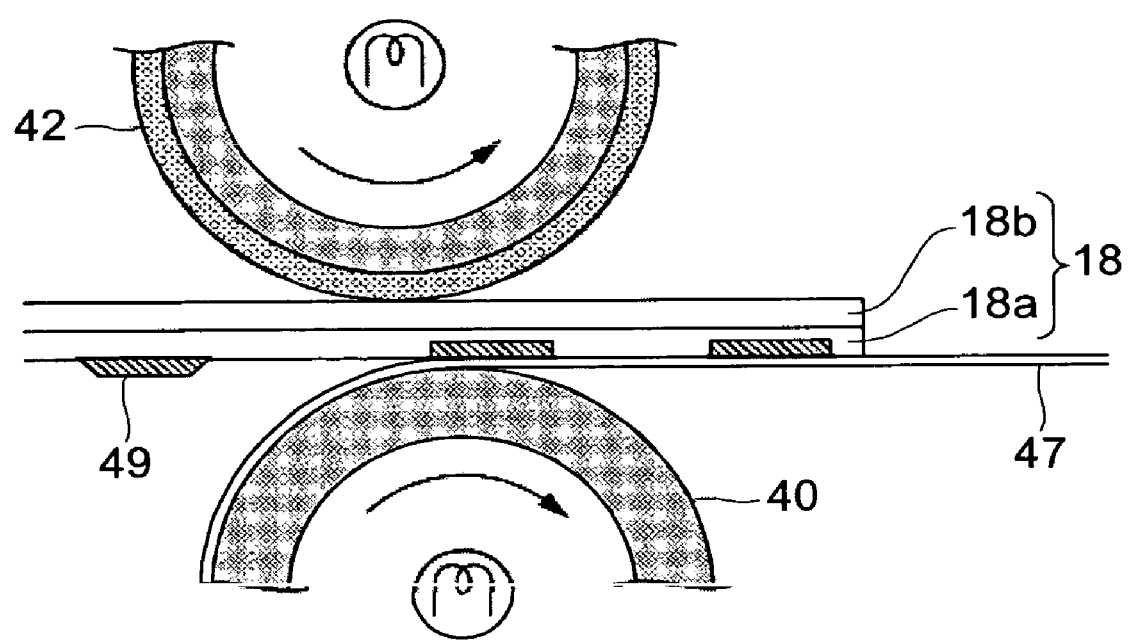
FIG. 12 is an illustration of the operation of secondary image-fixing in a secondary image-fixing device.

FIG. 11 is a sectional view of a sheet of dedicated glossy paper for use in a glossy print mode. FIG. 12 illustrates the operation of secondary image-fixing by the second image-fixing device 101. With reference to FIGS. 11 and 12, the toner 49 on the dedicated glossy paper (recording sheet) 18(P) is embedded into the transparent resin layer 18*a* on the surface of the dedicated glossy paper 18(P) by action of the pressure roller 42 and the fixing belt 47 spanned around the heating and fixing roller 40 of the second image-fixing device 101. The toner 49 is then conveyed while being in intimate contact with the fixing belt 47 and is cooled to a predetermined temperature by the cooling device 46. The recording sheet 18(P) bearing the toner image is removed from the fixing belt 47 by the releasing roller 44 and is ejected onto a photo print mode paper output tray 26 by the ejection roller 48 so that the image bearing surface is downside.

The toner 49 on the recording sheet 18 conveyed to the second image-fixing device 101 has been subjected to primary image-fixing by the first image-fixing device 15 arranged in the main body 100. Thus, even the image bearing surface comes into contact with, for example, a conveyer support member when the conveying direction switching gate 16 switches the conveying direction, image defects such as disturbance in images do not occur.

The color copying machine (image forming apparatus) 1 can perform both the regular print mode for outputting images of low glossiness by the primary image-fixing procedure alone, and the highly glossy print (photo print) mode for outputting images of high glossiness by the primary and secondary image-fixing procedures. It can occupy as little space as possible when compared with the case in which plural image forming apparatus are provided for the two modes, respectively.

<Color Electrophotographic Print>

The color electrophotographic print of the present invention is produced by the image forming process of the present invention and has a black density of 2.0 or more, a black color satisfying the following condition in the CIE 1976 (L*a*b*) color space: $(a^*)^2+(b^*)^2 \leq 9$, and a 20-degree minimum glossiness of 60 or more.

The black density should be 2.0 or more and is preferably from 2.1 to 3.0. The black color should satisfy the condition: $(a^*)^2+(b^*)^2 \leq 9$ and preferably $(a^*)^2+(b^*)^2 < 4$. The 20-degree minimum glossiness should be 60 or more, is preferably 70 or more, and more preferably 80 or more. However, a 20-degree minimum glossiness exceeding 100 may impart a plastic-like texture to the print and is not desirable as a photographic print.

The color electrophotographic print satisfying the above requirements has a sufficient density in its dark area, has gloss, has a high glossiness over the entire densities covering bright areas (a white area and a highlight area), areas at intermediate densities, and dark areas (a black area and a shadow area) and can achieve high image quality equivalent to silver halide photographs.

The white color in the color electrophotographic print of the present invention preferably satisfies the following conditions in the CIE 1976 (L*a*b*) color space: $-2<a^*<2$, and $-5<b^*<1$, and more preferably $-1<a^*<1$, and $-3<b^*<0$.

The color electrophotographic print is preferably a borderless print without a white background around an image.

The color electrophotographic print of the present invention having the above properties has a sufficient density in its dark area, has gloss, has a high glossiness over the entire densities covering bright areas (a white area and a highlight area), areas at intermediate densities, and dark areas (a black area and a shadow area) and can achieve high image quality equivalent to silver halide photographs.

The present invention will now be described in further detail with reference to specific examples, but the present invention is not limited thereto.

—Preparation of Support—

Broad-leaved (hardwood) bleached kraft pulp (LBKP) was beaten to a Canadian standard freeness (CSF) of 300 ml using a disk refiner and thereby yielded a pulp stock having a fiber length of 0.58 mm. The following additives were added to the pulp stock in proportions shown below based on the mass of the pulp.

| Additive | Amount (mass %) |
| --- | --- |
| Cationic starch | 1.2 |
| Alkyl ketene dimer (AKD) | 0.5 |
| Anionic polyacrylamide | 0.3 |

-continued

| Additive | Amount (mass %) |
|---|---|
| Epoxidized fatty acid amide (EFA) | 0.2 |
| Polyamide-polyamine-epichlorohydrin | 0.3 |

In the alkyl ketene dimer (AKD), the alkyl moiety is derived from fatty acids mainly containing behenic acid. In the epoxidized fatty acid amide (EFA), the fatty acid moiety is derived from fatty acids mainly containing behenic acid.

A raw paper of weighting 160 g/m$^2$ was produced from the obtained pulp by a fortlinear paper machine. 1.0 g/m$^2$ PVA and 0.8 g/m$^2$ CaCl$_2$ were made to adhere thereto by a size press device in the middle of the drying zone of the fortlinear paper machine.

In the last step of the paper-making process, the density was adjusted to 1.01 g/cm$^3$ using a soft calender. The paper was passed through so that the side (surface) of the raw paper whereon the toner-image-receiving layer is provided, came into contact with the metal roller. The surface temperature of the metal roller was 140° C. The resulting raw paper had a whiteness of 91%, an Oken type smoothness of 235 seconds, and a Stockigt sizing degree of 119 seconds.

The above-prepared raw paper was subjected to corona discharge at a power of 17 kW. A single layer of a polyethylene resin having a composition shown in Table 3 was extruded and laminated onto the back side of the raw paper at a temperature of discharged fused film of 320° C. and at a line speed of 250 m/minute using a cooling roll with a surface matte roughness of 10 μm and thereby yielded a back side polyethylene resin layer 22 μm thick.

TABLE 3

| Composition | MFR (g/10-min) | Density (g/cm$^3$) | Content (mass %) |
|---|---|---|---|
| HDPE | 12 | 0.967 | 70 |
| LDPE | 3.5 | 0.923 | 30 |

Next, a single layer of a mixture of master batches was extruded and laminated onto the front side of the raw paper, on which the toner-image-receiving layer would be formed, at a line speed of 250 m/minute using a cooling roll with a surface matte roughness of 0.7 μm and thereby yielded a front side polyethylene resin layer 29 μm thick. The mixture of master batches had a final composition shown in Table 5, contained first master batch pellets containing the LDPE as in Table 3 and titanium dioxide (TiO$_2$) in a composition shown in Table 4, and second master batch pellets containing 5% by mass of ultramarine blue. The front side polyethylene resin layer and the backside polyethylene resin layer were subjected to corona discharge at a power of 18 kW and 12 kW, respectively. A gelatin-containing undercoat layer was formed on the front side polyethylene resin layer and thereby yielded a support.

TABLE 4

| Composition | Content (mass %) |
|---|---|
| LDPE (ρ = 0.921 g/cm$^3$) | 37.98 |
| Anatase-type titanium dioxide | 60 |
| Zinc stearate | 2 |
| Antioxidant | 0.02 |

TABLE 5

| Composition | Content (mass %) |
|---|---|
| LDPE (ρ = 0.921 g/cm$^3$) | 67.7 |
| Anatase-type titanium dioxide | 30 |
| Zinc stearate | 2 |
| Ultramarine blue | 0.3 |

—Production of Electrophotographic Image-receiving Sheet—

To the front side of the above-prepared support, a coating liquid was applied to coated amounts shown in Table 6 using a bar coater to yield an image-receiving layer and thereby yielded an electrophotographic image-receiving sheet. The coating liquid contained an aqueous dispersion of a self-dispersible polyester resin, an aqueous dispersion of a carnauba wax, a poly(vinyl alcohol) (PVA) dispersion of titanium dioxide, a polyethylene oxide having a molecular weight of about 100000, and an anionic surfactant. It had a viscosity of 70 mPa·s, a surface tension of 30 mN/m, and pH of 7.8.

The electrophotographic image-receiving sheet had a weight of 209 g/m$^2$, a thickness of 196 μm, a whiteness of 88 and an opacity of 94.

TABLE 6

| Composition | Coated amount (g/m$^2$) |
|---|---|
| Polyester resin | 11.0 |
| Carnauba wax | 1.2 |
| Anatase-type titanium dioxide | 1.1 |
| PVA-205 | 0.15 |
| Polyethylene oxide | 2.9 |
| Anionic surfactant | 0.3 |

EXAMPLE 1

Figure 13:
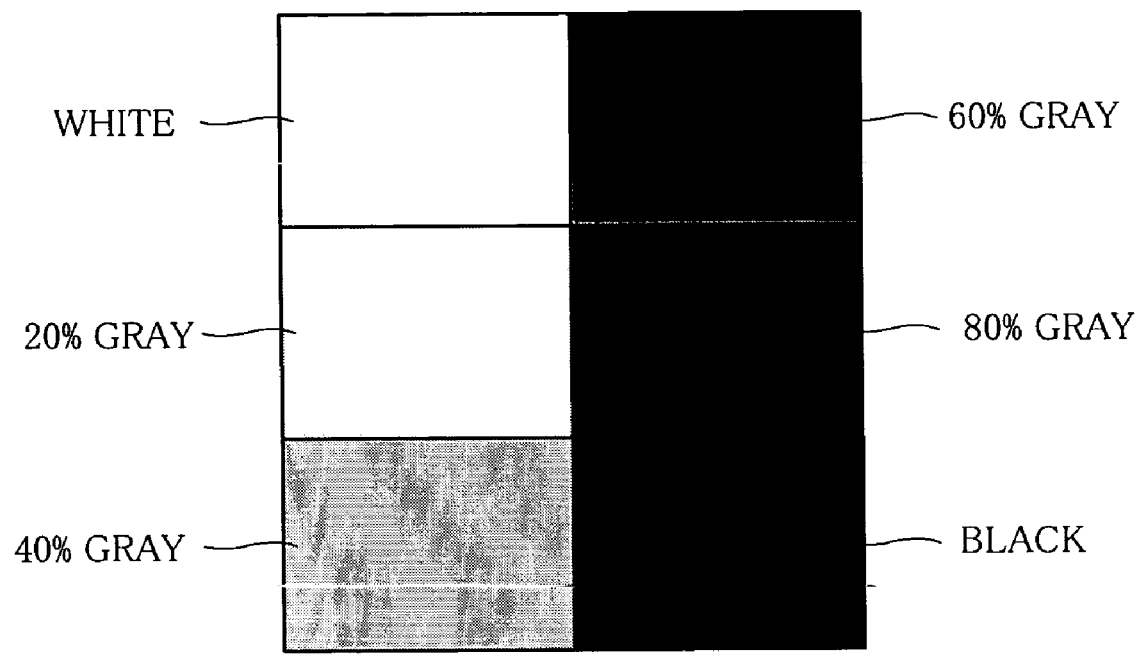
FIG. 13 is an illustration of a digitally synthesized ⅙ gray solid image with a 6-step gray gradation from white background to black which is used in the examples below.

The above-prepared electrophotographic image-receiving sheet was cut to A6 sized sheets. Using a tandem color printer shown in FIG. 2, (1) a standard portrait image taken with a DSC, (2) a digitally synthesized entirely solid black image, and (3) a digitally synthesized ⅙ gray solid image having a six-step gray gradation from white background to black (FIG. 13) were produced on the electrophotographic image-receiving sheets, respectively.

Toners obtained by the aggregation process used in a DocuCentre Color 400 (trade name, available from Fuji Xerox Co., Ltd., Japan) were used herein. The volume-average particle diameters and shape factors of these toners are shown in Table 7.

TABLE 7

| | Average particle diameter (μm) | Shape factor |
|---|---|---|
| K (black) toner | 5.5 | 1.35 |
| Y (yellow) toner | 5.9 | 1.39 |
| M (magenta) toner | 5.3 | 1.33 |
| C (cyan) toner | 5.7 | 1.37 |

The temperatures of the heating roller 40 and the pressure roller 42 in the second image-fixing device 101 as shown in FIG. 8 were set at 135° C. Separately, the temperature of a thermoplastic resin layer of the electrophotographic image-receiving sheet was measured and was found to be up to 98° C. when the temperatures just mentioned above were set at 135° C. The temperature of an electrophotographic print when it was removed from the fixing belt 47 was 65° C.

The fixing belt used herein was prepared in the following manner. A silicone rubber primer DY39-115 (trade name, available from Dow Corning Toray Silicone Co. Ltd., Japan) was applied to a base layer made of a polyimide and was air-dried for 30 minutes. The resulting article was dipped in a coating liquid comprising 100 parts by mass of a silicone rubber precursor DY35-796AB (trade name, available from Dow Corning Toray Silicone Co., Ltd., Japan) and 30 parts by mass of n-hexane to thereby form a coated film, was subjected to primary curing at 120° C. for 10 minutes and thereby yield a silicone rubber layer 40 μm thick thereon. The silicone rubber layer was then dipped in a coating liquid comprising 100 parts by mass of a fluorocarbon siloxane rubber precursor SIFEL 610 (trade name, available from Shin-Etsu Chemical Co., Ltd., Japan) and 20 parts by mass of a fluorine-containing solvent (a mixture of m-xylene hexafluoride, perfluoroalkanes, and perfluoro(2-butyltetrahydrofuran)) to form a coated film, was subjected to primary curing at 120° C. for 10 minutes and to secondary curing at 180° C. for 4 hours to yield a fluorocarbon siloxane rubber layer 20 μm thick thereon and thereby yielded the fixing belt.

The black density, black color, minimum glossiness, black glossiness, sensory photographic image quality, and sensory quality of the electrophotographic print according to Example 1 were determined in the following manner. The results are shown in Table 10.

<Black Density>

The black density was determined with an X-Rite 404A densitometer (trade name, a product of X-Rite, MI).

<Black Color>

The black color was determined with an X-Rite SP60 portable sphere spectrophotometer (trade name, a product of X-Rite, MI).

<Glossiness>

The glossiness was determined with a portable three-degrees glossimeter Micro-TRI-Gloss (trade name, available from BYK-Gardner USA) at a measuring angle of 20 degrees.

In the following sensory tests, rating was performed according to the following criteria and was expressed as an average of 20 persons' rating, who are relatively excellently capable of rating image quality of photographs.

<Sensory Photographic Image Quality>

5: The image quality of the print is equivalent to silver halide photographs.

4: The image quality of the print is near to silver halide photographs and is acceptable as a photograph.

3: The image quality of the print is different from silver halide photographs but is acceptable as a photograph to some extent.

2: The image quality of the print is clearly inferior to silver halide photographs and is not acceptable as a photograph.

1: The image quality of the print is not acceptable.

<Sensory Quality (Texture on Hand)>

5: The texture on hand of the print is equivalent to silver halide photographs.

4: The texture on hand of the print is near to silver halide photographs and the print gives a natural feeling as a photograph when handled.

3: The texture on hand of the print is different from silver halide photographs but is acceptable as a photograph to some extent.

2: The texture on hand of the print is significantly inferior to silver halide photographs and is not acceptable as a photograph.

1: The texture on hand of the print is not acceptable as a print.

The texture on hand is not acceptable as a photographic print when the print has low stiffness as thin paper (plain paper) or when the print has excessively high stiffness as a plastic film.

COMPARATIVE EXAMPLE 1

An electrophotographic print according to Comparative Example 1 was prepared and evaluated by the procedure of Example 1, except that the toners were developed under conditions such that the toner development amount was reduced and the black density became about 1.9. The results are shown in Table 10.

EXAMPLE 2

An electrophotographic print according to Example 2 was prepared and evaluated by the procedure of Example 1, except that the toners having the following properties in Table 8 were used and that the development conditions were changed so that the black density became about 2.1. The results are shown in Table 10.

TABLE 8

| | Average particle diameter (μm) | Shape factor |
|---|---|---|
| K (black) toner | 7.3 | 1.39 |
| Y (yellow) toner | 7.2 | 1.41 |
| M (magenta) toner | 7.8 | 1.33 |
| C (cyan) toner | 7.7 | 1.44 |

EXAMPLE 3

An electrophotographic print according to Example 3 was prepared and evaluated by the procedure of Example 1, except that the toners having the following properties in Table 9 were used and that the development conditions were changed so that the black density became about 2.1. The results are shown in Table 10.

TABLE 9

| | Average particle diameter (μm) | Shape factor |
|---|---|---|
| K (black) toner | 5.7 | 1.58 |
| Y (yellow) toner | 5.3 | 1.61 |
| M (magenta) toner | 5.5 | 1.63 |
| C (cyan) toner | 5.6 | 1.66 |

EXAMPLE 4

An electrophotographic image-receiving sheet according to Example 4 was prepared by the procedure of Example 1, except that a raw paper having a basis weight of 145 g/m² was used as the raw paper in the electrophotographic image-receiving sheet. The resulting electrophotographic image-receiving sheet had a weight of 195 g/m² and a thickness of 184 μm. Using this electrophotographic image-receiving sheet, an electrophotographic print was prepared and evaluated by the procedure of Example 1. The results are shown in Table 10.

COMPARATIVE EXAMPLE 2

An electrophotographic print according to Comparative Example 2 was prepared and evaluated by the procedure of Example 1, except that the proportions of Y, M, C, and K toners in a black area were changed. The results are shown in Table 10.

COMPARATIVE EXAMPLE 3

An electrophotographic print according to Comparative Example 3 was prepared and evaluated by the procedure of Example 1, except that the cooling operation in the second image-fixing device was not performed and the print had a temperature of 90° C. or higher when it was removed from the fixing belt. The results are shown in Table 10.

COMPARATIVE EXAMPLE 4

An electrophotographic print according to Comparative Example 4 was prepared and evaluated by the procedure of Example 1, except that the hot pressing and cooling operations were not performed and only the conveying operation was performed in the second image-fixing device. The results are shown in Table 10.

TABLE 10

| | Black density | Color $(a^*)^2 + (b^*)^2$ | Minimum glossiness | Black area glossiness | Sensory image quality | Sensory texture |
|---|---|---|---|---|---|---|
| Ex. 1 | 2.08 | 2.8 | 76 | 84 | 4.1 | 4.6 |
| Com. Ex. 1 | 1.88 | 5.3 | 80 | 85 | 3.2 | 4.4 |
| Ex. 2 | 2.05 | 4.2 | 79 | 83 | 3.9 | 4.5 |
| Ex. 3 | 2.06 | 3.5 | 77 | 84 | 3.8 | 4.5 |
| Ex. 4 | 2.11 | 6.6 | 81 | 86 | 3.6 | 3.6 |
| Com. Ex. 2 | 2.17 | 9.9 | 78 | 84 | 3.0 | 4.5 |
| Com. Ex. 3 | 2.23 | 7.1 | 33 | 63 | 2.8 | 4.2 |
| Com. Ex. 4 | 2.28 | 7.3 | 12 | 34 | 2.7 | 4.1 |

EXAMPLE 5

—Preparation of Raw Paper—

Broad-leaved (hardwood) bleached kraft pulp (LBKP) was beaten to a Canadian standard freeness (CSF) of 300 ml using a disk refiner and thereby yielded a pulp stock having a fiber length of 0.58 mm. The following additives were added to the pulp stock in proportions shown below based on the mass of the pulp.

| Additive | Amount (mass %) |
|---|---|
| Cationic starch | 1.2 |
| Alkyl ketene dimer (AKD) | 0.5 |
| Anionic polyacrylamide | 0.3 |
| Epoxidized fatty acid amide (EFA) | 0.2 |
| Polyamide-polyamine-epichlorohydrin | 0.3 |

In the alkyl ketene dimer (AKD), the alkyl moiety is derived from fatty acids mainly containing behenic acid. In the epoxidized fatty acid amide (EFA), the fatty acid moiety is derived from fatty acids mainly containing behenic acid.

A raw paper of weighting 150 g/m² was produced from the obtained pulp by a fortlinear paper machine. 1.0 g/m² PVA and 0.8 g/m² $CaCl_2$ were made to adhere thereto by a size press device in the middle of the drying zone of the fortlinear paper machine.

At the last of the paper making process, the raw paper was adjusted to have a density of 1.01 g/cm³ using a soft calendering machine. The raw paper was allowed to pass through a metal roll at a surface temperature of 140° C. so that the toner-image-receiving layer came in contact with the metal roll. The resulting raw paper had a whiteness of 91%, an Oken type smoothness of 265 seconds, and a Stockigt sizing degree of 127 seconds.

—Preparation of Support—

The above-prepared raw paper was subjected to corona discharge at a power of 17 kW. A single layer of a polyethylene resin having a composition shown in Table 11 was extruded and laminated onto the back side of the raw paper at a temperature of discharged fused film of 320° C. and at a line speed of 250 m/minute using a cooling roll with a surface matte roughness of 10 μm and thereby yielded a back side polyethylene resin layer 22 μm thick.

TABLE 11

| Composition | MFR (g/10-min) | Density (g/cm³) | Content (mass %) |
|---|---|---|---|
| HDPE | 12 | 0.967 | 70 |
| LDPE | 3.5 | 0.923 | 30 |

Next, a single layer of a mixture of master batches was extruded and laminated onto the front side of the raw paper, on which the toner-image-receiving layer would be formed, using a cooling roll with a surface matte roughness of 0.7 μm at a line speed of 250 m/minute and thereby yielded a front side polyethylene resin layer 29 μm thick. The mixture of master batches had a final composition shown in Table 13 and contained first master batch pellet containing the LDPE as in Table 11 and titanium dioxide ($TiO_2$) in a composition shown in Table 12, and second master batch pellets containing 5% by mass of ultramarine blue. The front side polyethylene resin layer and the back side polyethylene resin layer were subjected to corona discharge at power of 18 kW and 12 kW, respectively. A gelatin-containing undercoat layer was formed on the front side polyethylene resin layer and thereby yielded a support.

TABLE 12

| Composition | Content (mass %) |
|---|---|
| LDPE (ρ = 0.921 g/cm³) | 37.98 |
| Anatase-type titanium dioxide | 60 |
| Zinc stearate | 2 |
| Antioxidant | 0.02 |

TABLE 13

| Composition | Content (mass %) |
|---|---|
| LDPE (ρ = 0.921 g/cm³) | 67.7 |
| Anatase-type titanium dioxide | 30 |
| Zinc stearate | 2 |
| Ultramarine blue | 0.3 |

—Production of Electrophotographic Image-receiving Sheet—

To the front side of the support, a coating liquid for an image-receiving layer was applied to coated amounts shown in Table 14 using a bar coater to yield an image-receiving layer and thereby yielded an electrophotographic image-receiving sheet. The coating liquid contained an aqueous dispersion of a self-dispersible polyester resin, an aqueous dispersion of a carnauba wax, a poly(vinyl alcohol) (PVA) dispersion of titanium dioxide, a polyethylene oxide having a molecular weight of about 100000, and an anionic surfactant. It had a viscosity of 70 mPa·s, a surface tension of 30 mN/m, and pH of 7.8.

The electrophotographic image-receiving sheet had a whiteness of 87, an opacity of 93, and a 20-degree glossiness of 45 on its front and a whiteness of 74, a 20-degree glossiness of 3 on its back side.

TABLE 14

| Composition | Coated amount (g/m$^2$) |
| --- | --- |
| Polyester resin | 11.0 |
| Carnauba wax | 1.2 |
| Anatase-type titanium dioxide | 1.1 |
| PVA-205 | 0.15 |
| Polyethylene oxide | 2.9 |
| Anionic surfactant | 0.3 |

Evaluation

A logo was printed on the entire back side of the electrophotographic image-receiving sheet. The electrophotographic image-receiving sheet bearing the logo was cut to A4 sized sheets and was placed in a first tray of an electrophotographic printer DCC 400 (trade name, available from Fuji Xerox Co., Ltd., Japan) at 28° C. and a relative humidity (RH) of 85%. Then an image comprising a scenic image with white background of 85% in area was produced on the sheets.

The fixing belt used in the printer was prepared in the following manner. A silicone rubber primer DY39-115 (trade name, available from Dow Corning Toray Silicone Co. Ltd., Japan) was applied to a base layer made of a polyimide and was air-dried for 30 minutes. The resulting article was dipped in a coating liquid comprising 100 parts by mass of a silicone rubber precursor DY35-796AB (trade name, available from Dow Corning Toray Silicone Co., Ltd., Japan) and 30 parts by mass of n-hexane to thereby form a coated film, was subjected to primary curing at 120° C. for 10 minutes and thereby yield a silicone rubber layer 40 µm thick thereon.

The silicone rubber layer was then dipped in a coating liquid comprising 100 parts by mass of a fluorocarbon siloxane rubber precursor SIFEL 610 (trade name, available from Shin-Etsu Chemical Co., Ltd., Japan) and 20 parts by mass of a fluorine-containing solvent (a mixture of m-xylene hexafluoride, perfluoroalkanes, and perfluoro(2-butyltetrahydrofuran)) to form a coated film, was subjected to primary curing at 120° C. for 10 minutes and to secondary curing at 180° C. for 4 hours to yield a fluorocarbon siloxane rubber layer 20 µm thick thereon and thereby yielded the fixing belt.

The printer was operated at a printing speed of 30 mm/sec, a temperature of a heating roller of 155° C., and a temperature of a pressure roller of 130° C.

Printing was then conducted when the electrophotographic image-receiving sheet was loaded in a normal position (front side) and when it was loaded in an opposite position (back side), and the rates of failure in passing of the sheet in the image-fixing section of the printer were evaluated. The results are shown in Table 15.

TABLE 15

| Loaded direction | Rate of failure in passing | Note |
| --- | --- | --- |
| Normal | 0 sheet/100 sheets | no problem |
| Opposite | 6 sheets/100 sheets | * |

*The electrophotographic image-receiving sheet stooped in the image-fixing section adhered probably in its resin portion of the back side to the fixing roller and the resin could not be removed. The adhered resin was attached to an image-bearing surface of another print to thereby deteriorate its image quality. The adhesion of the resin to the prints was continued for one to three sheets.

EXAMPLE 6

An electrophotographic image-receiving sheet (I) having no print on both sides and an electrophotographic image-receiving sheet (II) having a logo on the entire back side available from the electrophotographic image-receiving sheet obtained in Example 1 were used. Twenty subjects tried to load these sheets into a sheet tray of an electrophotographic printer DCC 400 so that the front side be upside. As a result, three subjects misloaded the electrophotographic image-receiving sheet (I), but no subject misloaded the electrophotographic image-receiving sheet (II).

EXAMPLE 7

An electrophotographic image-receiving sheet (I) having no print on both sides and an electrophotographic image-receiving sheet (II) having a logo on the entire back side available from the electrophotographic image-receiving sheet obtained in Example 1 were used. A plurality of the image were printed out on the two sheets using the same apparatus under the same conditions. However, images were printed on one side or both sides of the electrophotographic image-receiving sheet (I).

Ordinary twenty subjects rated the resulting photographic prints on the desirability as a photographic image in seven levels from 1 to 7 (7 is the most desirable). The results are shown in Table 16.

TABLE 16

| | Average rating |
| --- | --- |
| Electrophotographic image-receiving sheet (I) printed on the front side alone | 3.6 |
| Electrophotographic image-receiving sheet (I) printed on both sides | 2.1 |
| Electrophotographic image-receiving sheet (II) printed on the front side alone | 3.9 |

The present invention can provide a color electrophotograph print that has a sufficient density in its dark area, has gloss, has a high glossiness over the entire densities covering bright areas (a white area and a highlight area), areas at intermediate densities, and dark areas (a black area and a shadow area) and can achieve high image quality equivalent to silver halide photographs.

The front side and the back side of the electrophotographic image-receiving sheet of the present invention can be easily distinguished to thereby avoid misleading of the sheet on a sheet tray in an apparatus. Thus, troubles in apparatus such as defective conveying of the sheet, offset, and dust can be avoided and adverse effects on other prints can be prevented. Thus, high-quality images having excellent gloss and smoothness and being rich in photographic taste can be obtained.

What is claimed is:

1. An image forming process comprising the step of:
   producing an electrophotographic print comprising:
   a black density of 2.0 or more,
   a black color satisfying the following condition in the CIE 1976 (L*a*b*) color space: $(a^*)^2+(b^*)^2 \leq 9$, and
   a 20-degree minimum glossiness of 60 or more.

2. An image forming process according to claim 1, further comprising:
   capturing a digital image data and subjecting the digital image data to image processing and image output control to thereby form a digital image;
   rendering and developing a toner image from the digital image using four or more color toners including at least a yellow (Y) toner, a magenta (M) toner, a cyan (C) toner, and a black (K) toner, each of the toners having a volume-average particle diameter of 7 µm or less and an average of shape factors represented by the following equation of from 1 to 1.5:

Shape factor=$(\pi \times L^2)/(4 \times S)$ wherein L is a maximum length of a toner particle; and S is a projection area of the toner particle;
   fixing the toner image on an electrophotographic image-receiving sheet to thereby form a toner image,
   the electrophotographic image-receiving sheet comprising:
   a support, and
   a toner-image-receiving layer containing at least a thermoplastic resin and being arranged on the support; and
   smoothing and glossing the toner image formed on the electrophotographic image-receiving sheet.

3. An image forming process according to claim 2, wherein the step of fixing the toner image and the step of smoothing and glossing the toner image comprise a primarily fixing the toner image onto the electrophotographic image-receiving sheet, and further subjecting the toner image on the electrophotographic image-receiving sheet to secondary fixing, smoothing and glossing.

4. An image forming process according to claim 2, wherein the digital image data is at least one selected from (1) photographed data, (2) data obtained by additionally processing photographed data, (3) data photographed with a digital still camera (DSC), and (4) data captured from a digital video (DV) camera or recorder.

5. An image forming process according to claim 2, further comprising using, to perform the image processing and output control step, at least one selected from (1) an apparatus capable of capturing any image data from a portable memory on which image data are recorded, (2) an apparatus capable of accessing a network and capable of capturing accumulated image data from a server connected to the network, (3) an apparatus capable of scanning an analogue image and capturing the image as a digital image, (4) an apparatus capable of connecting to a mobile data terminal and capable of capturing image data in the mobile data terminal, (5) an apparatus capable of selectively performing any additional image processing, (6) an apparatus capable of distinguishing between characters and images and capable of performing a specific image processing, and (7) an apparatus using a three-dimensional look-up table (LUT).

6. An image forming process according to claim 2, wherein the toners comprise at least a binder resin and a coloring agent, have a volume-average particle diameter distribution coefficient (GSDv) of 1.3 or less, and a ratio (GSDv/GSDn) of the volume-average particle diameter distribution coefficient (GSDv) to a number-average particle diameter distribution coefficient (GSDn) of 0.95 or more.

7. An image forming process according to claim 2, wherein the toners further contain a releasing agent.

8. An image forming process according to claim 7, wherein the releasing agent is contained in an amount of 2% by mass to 20% by mass relative to the binder resin.

9. An image forming process according to claim 2, wherein the toners are six or more color toners containing at least a yellow (Y) toner, a magenta (M) toner, a cyan (C) toner, a black (K) toner, a light magenta (LM) toner, and a light cyan (LC) toner.

10. An image forming process according to claim 2, wherein the toners are produced by a process for producing a toner, comprising the steps of:
    (i) forming aggregated particles in a dispersion containing dispersed resin particles to thereby prepare an aggregated particle dispersion;
    (ii) adding a fine particle dispersion containing dispersed fine particles to the aggregated particle dispersion to apply the fine particles to the aggregated particles to thereby form attached particles; and
    (iii) heating the attached particles to fuse and unite the particles to thereby form toner particles.

11. An image forming process according to claim 2, wherein the image is rendered at a resolution of 1200 dpi or higher.

12. An image forming process according to claim 2, further comprising using, to perform the step of rendering and developing an image, one of (1) a multiple tandem development and image transfer device, and (2) an apparatus capable of rendering plural images and capable of automatically cutting a sheet.

13. An image forming process according to claim 2, further comprising performing oilless image-fixing without the use of a releasing oil as the image-fixing.

14. An image forming process according to claim 2, using, to perform the smoothing and shining process, a belt processor of cooling and releasing type, the belt processor comprising:
    hot-pressing means,
    a belt member, and
    cooling means.

15. An image forming process according to claim 14, wherein a heating temperature in the hot-pressing means is from 100° C. to 180° C.

16. An image forming process according to claims 14, wherein a surface of the belt member has one of a layer of fluorocarbon siloxane rubber, and a layer of silicone rubber and fluorocarbon siloxane rubber in which the silicone rubber and the fluorocarbon siloxane rubber are disposed in this order.

17. An image forming process according to claims 16, wherein the fluorocarbon siloxane rubber has at least one of a perfluoroalkylether group and a perfluoroalkyl group in a main chain thereof.

18. An image forming process according to claim 2, further comprising using, as the electrophotographic image-receiving sheet, an electrophotographic image-receiving sheet having an indicator on its back side.

19. An image forming process according to claim 18, wherein the indicator indicates at least one selected from a logo, a price, performance, a catch phrase, a company name, a trade name, a trade mark, a diagram, a picture, a pattern, information (exchangeable image file format information; EXIF information) on the image, information on the copyright of the image, names of a photographic machine used and a photographer, and information on image processing.

20. An image forming process according to claim 2, further comprising using an electrophotographic image-receiving sheet having a weight of 100 g/m² or more and a thickness of 100 µm or more.

21. An image forming process according to claim 2, further comprising using an electrophotographic image-receiving sheet having a rate of hygroscopic swelling of 1% or less.

22. An image forming process according to claim 2, wherein the support in the electrophotographic image-receiving sheet is one selected from raw paper, synthetic paper, a synthetic resin sheet, coated paper, and laminated paper.

23. An electrophotographic image-receiving sheet comprising:
   a support; and
   a toner-image-receiving layer containing at least a thermoplastic resin and being arranged at least on one side of the support, and
   having an indicator which is a printed character or image on its back side.

24. An electrophotographic image-receiving sheet according to claim 23, wherein the indicator indicates at least one selected from a logo, a price, performance, a catch phrase, a company name, a trade name, a trade mark, a diagram, a picture, a pattern, information (exchangeable image file format information; EXIF information) on the image, information on the copyright of the image, names of a photographic machine used and a photographer, and information on image processing.

25. An electrophotographic image-receiving sheet according to claim 23, wherein the indicator is arranged on the entire back side of the electrophotographic image-receiving sheet.

26. An image forming apparatus for use in a process for forming an image by producing an electrophotographic print,
   the electrophotographic print comprising:
      a black density of 2.0 or more,
      a black color in the CIE 1976 (L*a*b*) color space satisfying the following condition: $(a^*)^2+(b^*)^2 \leq 9$, and
      a 20-degree minimum glossiness of 60 or more,
   the image forming apparatus comprising a charging device for billing users by the usage.

27. An image forming apparatus according to claim 26, comprising:
   digital image processing and output control means for capturing a digital image data and subjecting the digital image data to image processing and image output control to thereby form the digital image;
   rendering and developing means for rendering and developing a toner image from the digital image using four or more color toners including at least a yellow (Y) toner, a magenta (M) toner, a cyan (C) toner, and a black (K) toner, each of the toners having a volume-average particle diameter of 7 µm or less and an average of shape factors represented by the following equation of from 1 to 1.5:

$$\text{Shape factor} = (\pi \times L^2)/(4 \times S)$$

wherein L is a maximum length of a toner particle; and S is a projection area of the toner particles;
   toner image-fixing means for fixing the toner image on an electrophotographic image-receiving sheet to thereby form the toner image,
      the electrophotographic image-receiving sheet comprising:
         a support, and
         a toner-image-receiving layer containing at least a thermoplastic resin and being arranged on the support; and
   postprocessing means for smoothing and glossing the toner image formed on the electrophotographic image-receiving sheet.

28. An image forming apparatus according to claim 26, which is configured so as to be capable of connecting to a mobile data terminal and communicating with the mobile data terminal.

29. An electrophotographic print comprising:
   a black density of 2.0 more;
   a black color satisfying the following condition in the CIE 1976 (L*a*b*) color space: $(a^*)^2+(b^*)^2 \leq 9$; and
   a 20-degree minimum glossiness of 60 or more.

30. An electrophotographic print according to claim 29, which is produced by an image forming process comprising the step of:
   capturing a digital image data and subjecting the digital image data to image processing and image output control to thereby form the digital image;
   rendering and developing a toner image from the digital image using four or more color toners including at least a yellow (Y) toner, a magenta (M) toner, a cyan (C) toner, and a black (K) toner, each of the toners having an average particle diameter of 7 µm or less and an average of shape factors represented by the following equation of from 1 to 1.5:

$$\text{Shape factor} = (\pi \times L^2)/(4 \times S)$$

wherein L is a maximum length of a toner particle; and S is a projection area of the toner particles;
   fixing the toner image on an electrophotographic image-receiving sheet to thereby form the toner image,
      the electrophotographic image-receiving sheet comprising:
         a substrate, and
         a toner-image-receiving layer containing at least a thermoplastic resin and being arranged on the substrate; and
   smoothing and glossing the toner image formed on the electrophotographic image-receiving sheet.

31. A electrophotographic print according to claim 29, comprising a white color satisfying the following conditions in the CIE 1976 (L*a*b*) color space: $-2<a^*<2$, and $-5<b^*<1$.

32. An electrophotographic print according to claim 29, which is a borderless print wherein an image is printed over the entire surface of the print.

* * * * *